United States Patent
Conrad et al.

(10) Patent No.: US 10,952,583 B2
(45) Date of Patent: Mar. 23, 2021

(54) HAND VACUUM CLEANER

(71) Applicant: Omachron Intellectual Property Inc., Hampton (CA)

(72) Inventors: Wayne Ernest Conrad, Hampton (CA); Nina Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 230 days.

(21) Appl. No.: 15/923,984

(22) Filed: Mar. 16, 2018

(65) Prior Publication Data

US 2019/0282056 A1    Sep. 19, 2019

(51) Int. Cl.
| | | |
|---|---|---|
| *A47L 9/28* | (2006.01) | |
| *A47L 5/24* | (2006.01) | |
| *B25G 1/10* | (2006.01) | |
| *H01M 2/10* | (2006.01) | |

(52) U.S. Cl.
CPC .............. *A47L 9/2884* (2013.01); *A47L 5/24* (2013.01); *B25G 1/102* (2013.01); *H01M 2/1055* (2013.01)

(58) Field of Classification Search
CPC . A47L 5/24; A47L 9/2884; A46B 5/02; A46B 5/021; A46B 5/023; A46B 5/025; A63B 60/12; A61B 2017/00424; B26B 21/522; H01M 2/1055; B25G 1/10; B25G 1/102; B25G 1/105
USPC .............. 16/430, 110.1, 111.1, 423
See application file for complete search history.

(56) References Cited

U.S. PATENT DOCUMENTS

| | | | |
|---|---|---|---|
| 3,543,325 A | | 12/1970 | Hamrick |
| 3,835,626 A | | 9/1974 | Miyake et al. |
| 4,734,017 A | * | 3/1988 | Levin .................. A47L 5/24 417/366 |
| 4,821,366 A | | 4/1989 | Levine |
| 4,956,892 A | * | 9/1990 | Fawkes .............. A47L 5/24 15/339 |
| 5,135,552 A | | 8/1992 | Weistra |
| D384,031 S | * | 9/1997 | Lui ...................... D13/103 |
| 6,065,181 A | * | 5/2000 | Cleveland ............ A47L 5/26 15/344 |
| 6,976,313 B2 | * | 12/2005 | Wong ............ A22C 17/0013 30/369 |
| D528,975 S | * | 9/2006 | Chi ..................... D13/103 |
| 7,247,181 B2 | | 7/2007 | Hansen et al. |

(Continued)

FOREIGN PATENT DOCUMENTS

| | | |
|---|---|---|
| CA | 978485 A1 | 11/1975 |
| CN | 1212095 C | 7/2005 |

(Continued)

OTHER PUBLICATIONS

English machine translation of the Abstract of CN1212095, published on Jul. 27, 2005.

*Primary Examiner* — Bryan R Muller
(74) *Attorney, Agent, or Firm* — Philip C. Mendes da Costa; Bereskin & Parr LLP/S.E.N.C.R.L.., s.r.l.

(57) ABSTRACT

A hand vacuum cleaner having a handle, the having a front end, a rear end, a sidewall extending between the front end and the rear end and a longitudinal axis extending between the front end and the rear end. The handle includes a battery compartment configured to house at least one battery having a battery axis, wherein at least a portion of the sidewall has a plurality of recesses extending in a direction of the battery axis.

17 Claims, 46 Drawing Sheets

(56) References Cited

U.S. PATENT DOCUMENTS

| | | | |
|---|---|---|---|
| 7,473,289 B2 | 1/2009 | Oh et al. | |
| 7,547,338 B2 | 6/2009 | Kim et al. | |
| 7,717,973 B2 | 5/2010 | Oh et al. | |
| 8,225,456 B2 | 7/2012 | Hakan et al. | |
| 8,353,364 B2 * | 1/2013 | Kondo | B25F 5/02 173/217 |
| 8,424,154 B2 * | 4/2013 | Beskow | A47L 9/20 15/352 |
| 8,695,159 B2 | 4/2014 | Van Der Kooi et al. | |
| 9,204,769 B2 | 12/2015 | Conrad | |
| D818,949 S * | 5/2018 | Dunkin | D13/103 |
| 10,433,698 B2 | 10/2019 | Conrad | |
| 10,506,904 B2 | 12/2019 | Conrad et al. | |
| 10,624,509 B2 | 4/2020 | Wang et al. | |
| 2004/0163201 A1 | 8/2004 | Murphy et al. | |
| 2004/0216264 A1 | 11/2004 | Shaver et al. | |
| 2004/0261382 A1 | 12/2004 | Baldinger et al. | |
| 2006/0090290 A1 | 5/2006 | Lau | |
| 2006/0156508 A1 | 7/2006 | Khalil | |
| 2008/0040883 A1 | 2/2008 | Beskow et al. | |
| 2008/0187822 A1 * | 8/2008 | Breitenbach | H01M 2/1055 429/100 |
| 2008/0196553 A1 * | 8/2008 | Hoffmann | H01M 2/105 81/54 |
| 2009/0208827 A1 * | 8/2009 | Kondo | H01M 2/1055 429/98 |
| 2009/0229842 A1 * | 9/2009 | Gray | G01R 1/0408 173/20 |
| 2010/0139033 A1 | 6/2010 | Makarov et al. | |
| 2011/0064978 A1 * | 3/2011 | McGahan | A61B 17/8875 429/61 |
| 2013/0113438 A1 * | 5/2013 | Aradachi | H01M 2/1055 320/162 |
| 2014/0014384 A1 * | 1/2014 | Horie | B25F 5/02 173/217 |
| 2017/0196419 A1 | 7/2017 | Brown et al. | |
| 2017/0290481 A1 | 10/2017 | Conrad | |
| 2018/0031318 A1 * | 2/2018 | Goldman | A45D 20/12 |
| 2018/0177356 A1 | 6/2018 | Conrad | |
| 2018/0263284 A1 * | 9/2018 | Chen | H01M 2/1094 |
| 2019/0090701 A1 * | 3/2019 | Tonderys | A47L 5/225 |
| 2020/0100633 A1 | 4/2020 | Han et al. | |

FOREIGN PATENT DOCUMENTS

| | | |
|---|---|---|
| EP | 1707094 B1 | 4/2012 |
| GB | 539973 A | 10/1941 |
| GB | 2522658 B | 4/2016 |

* cited by examiner

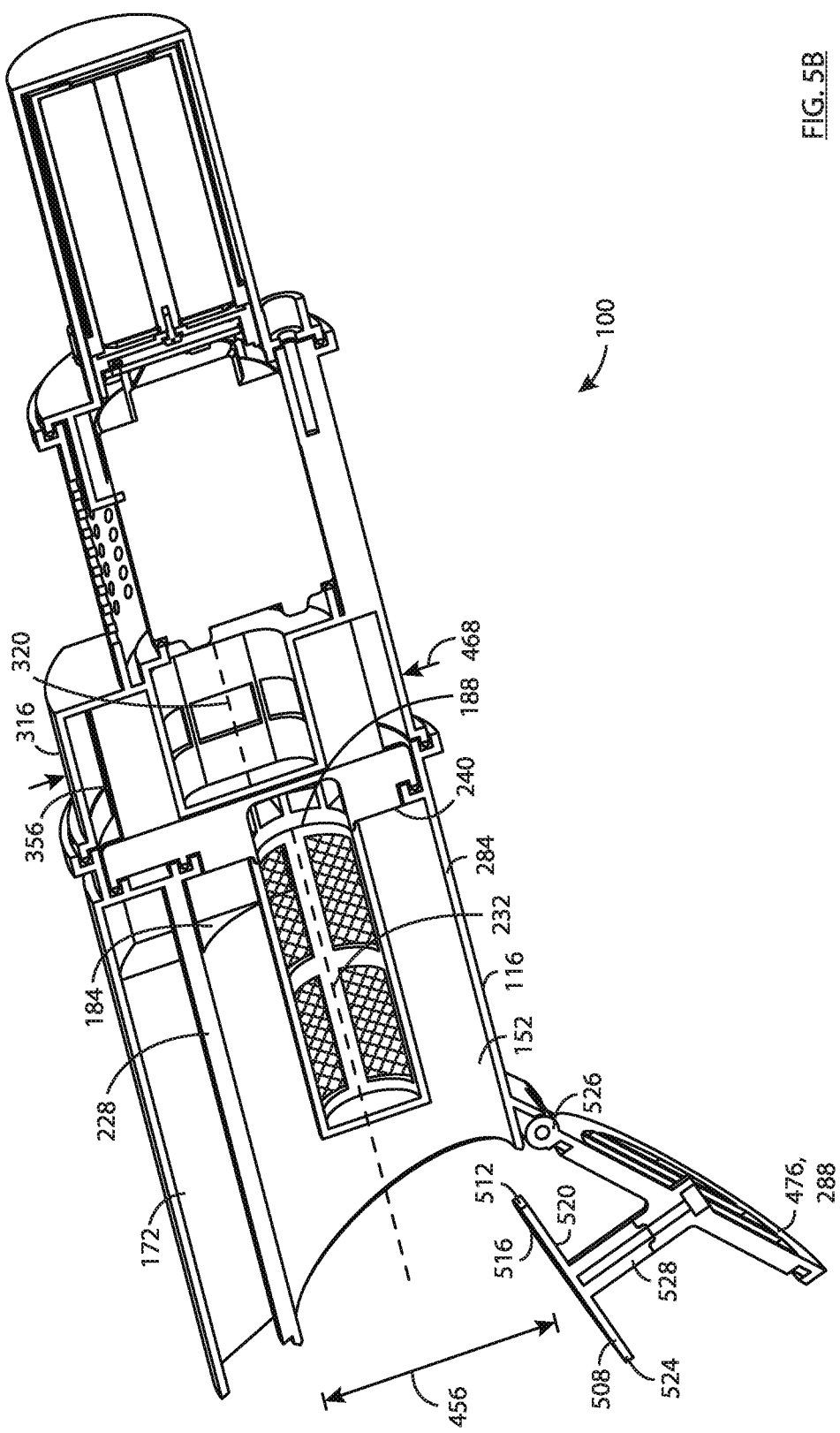

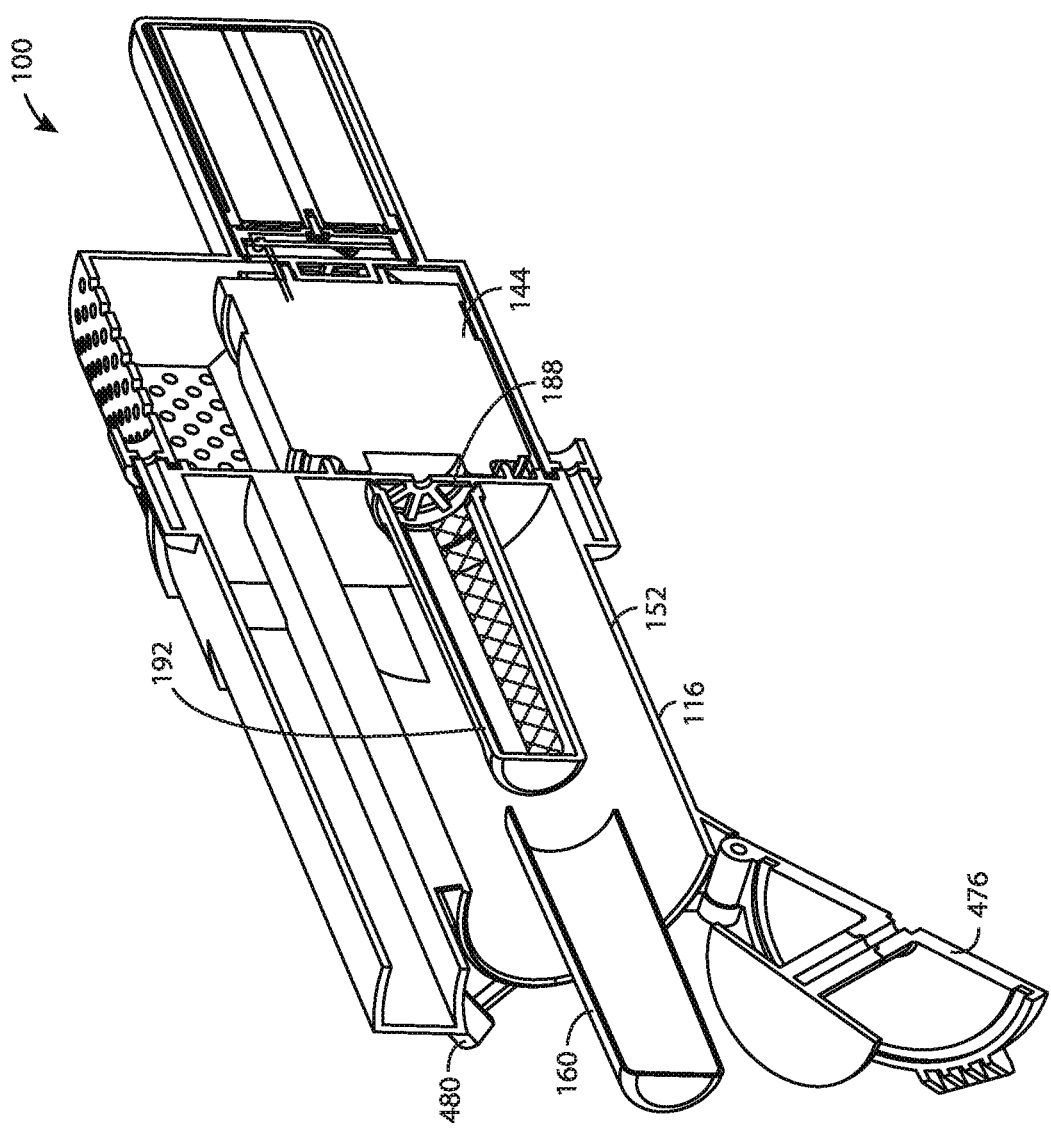

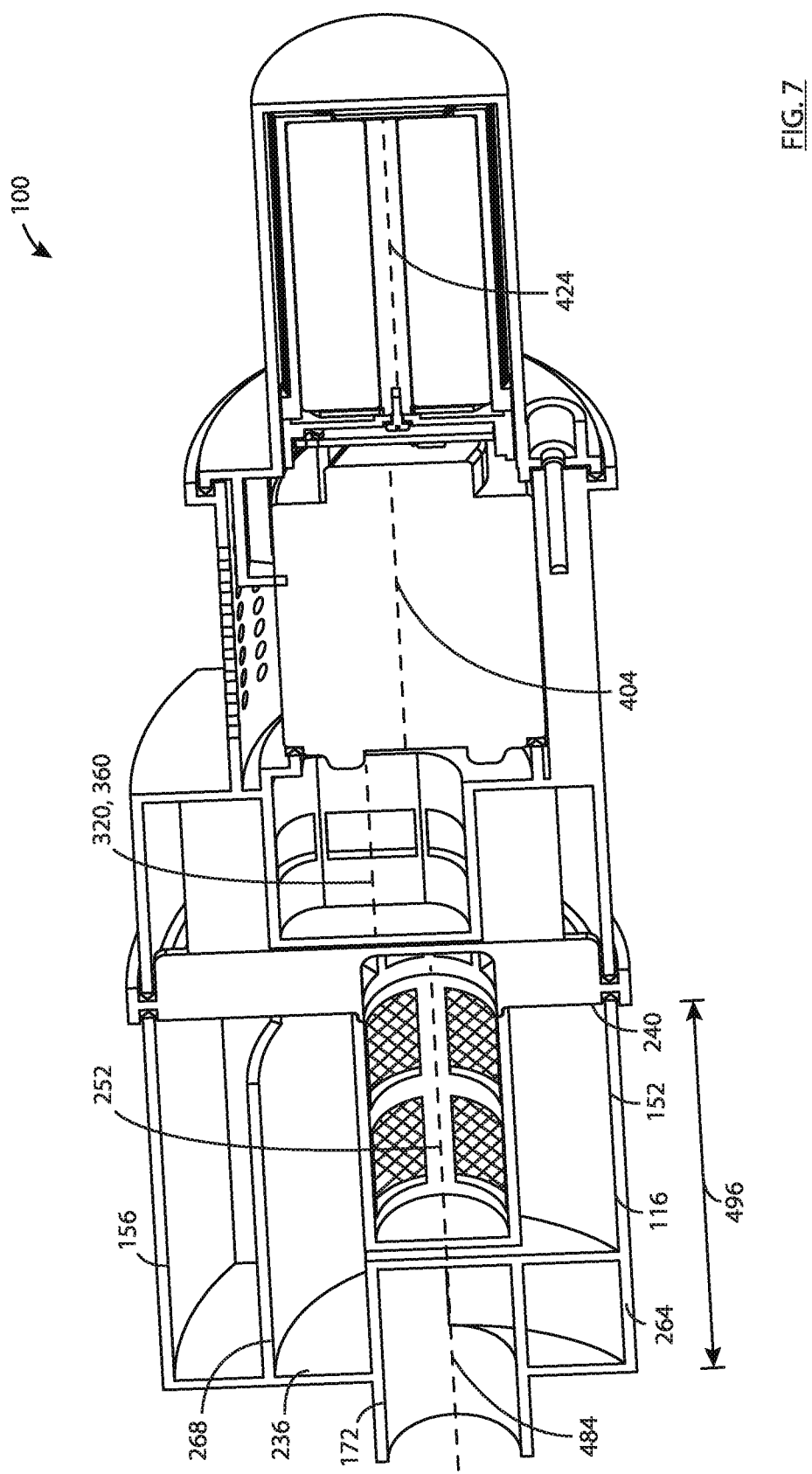

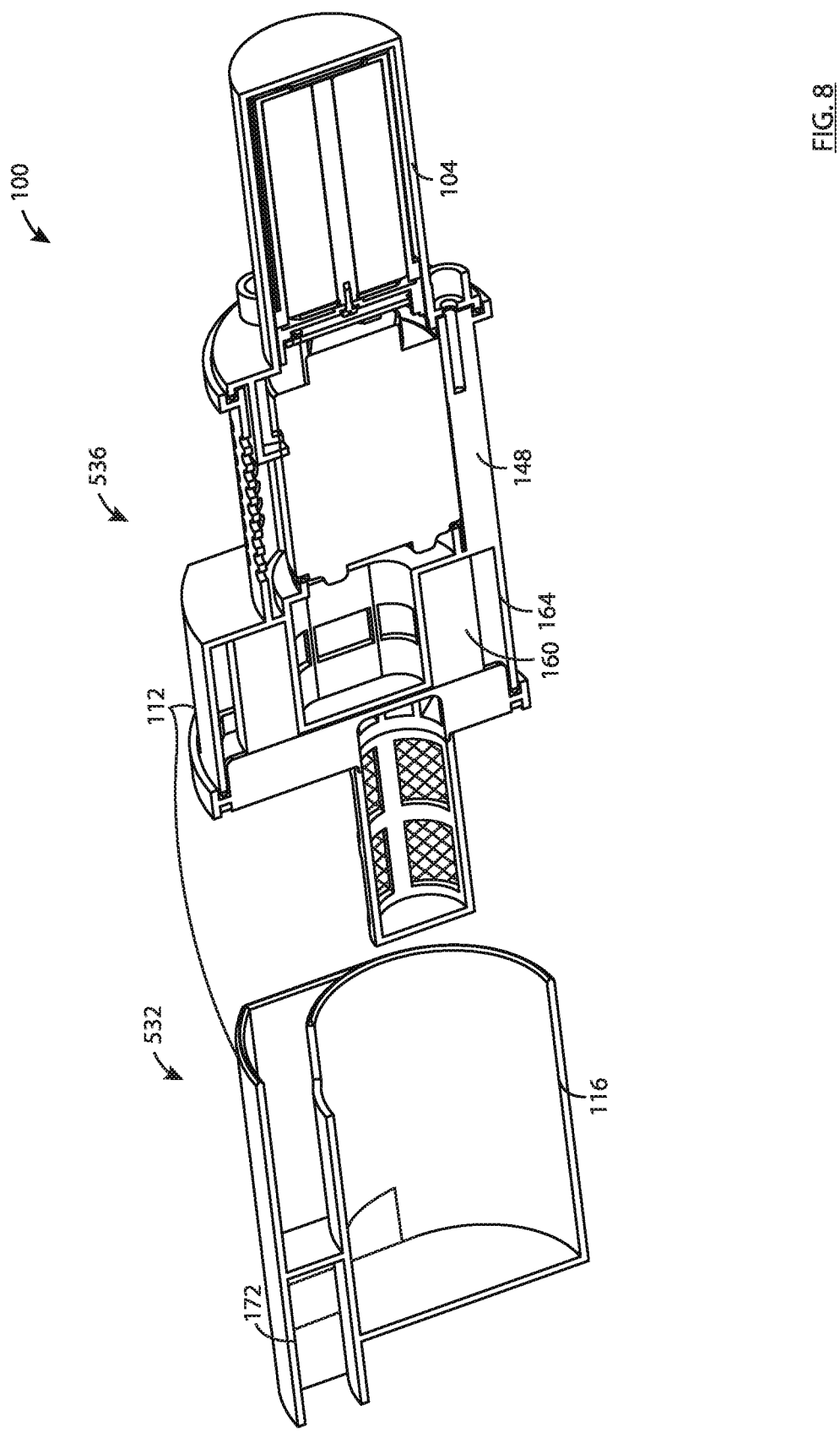

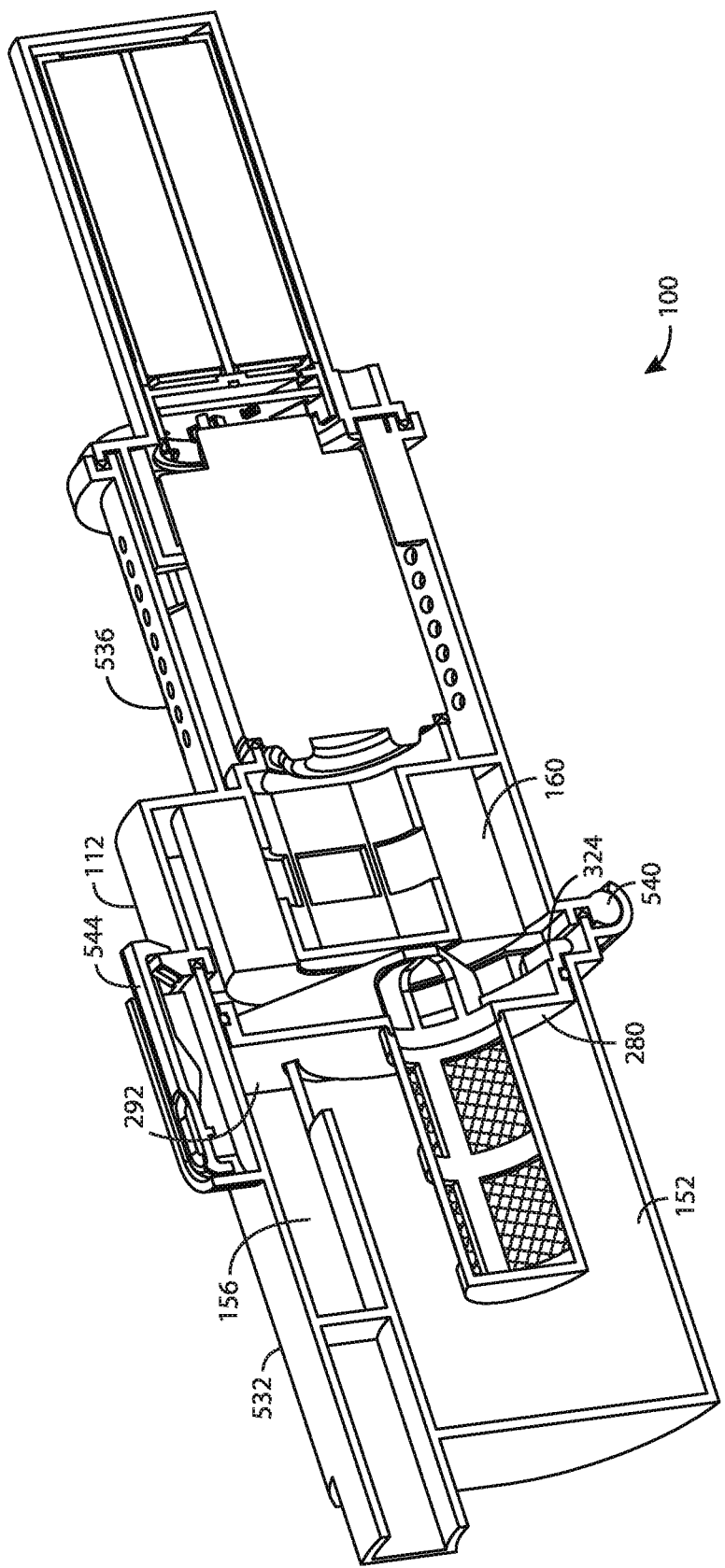

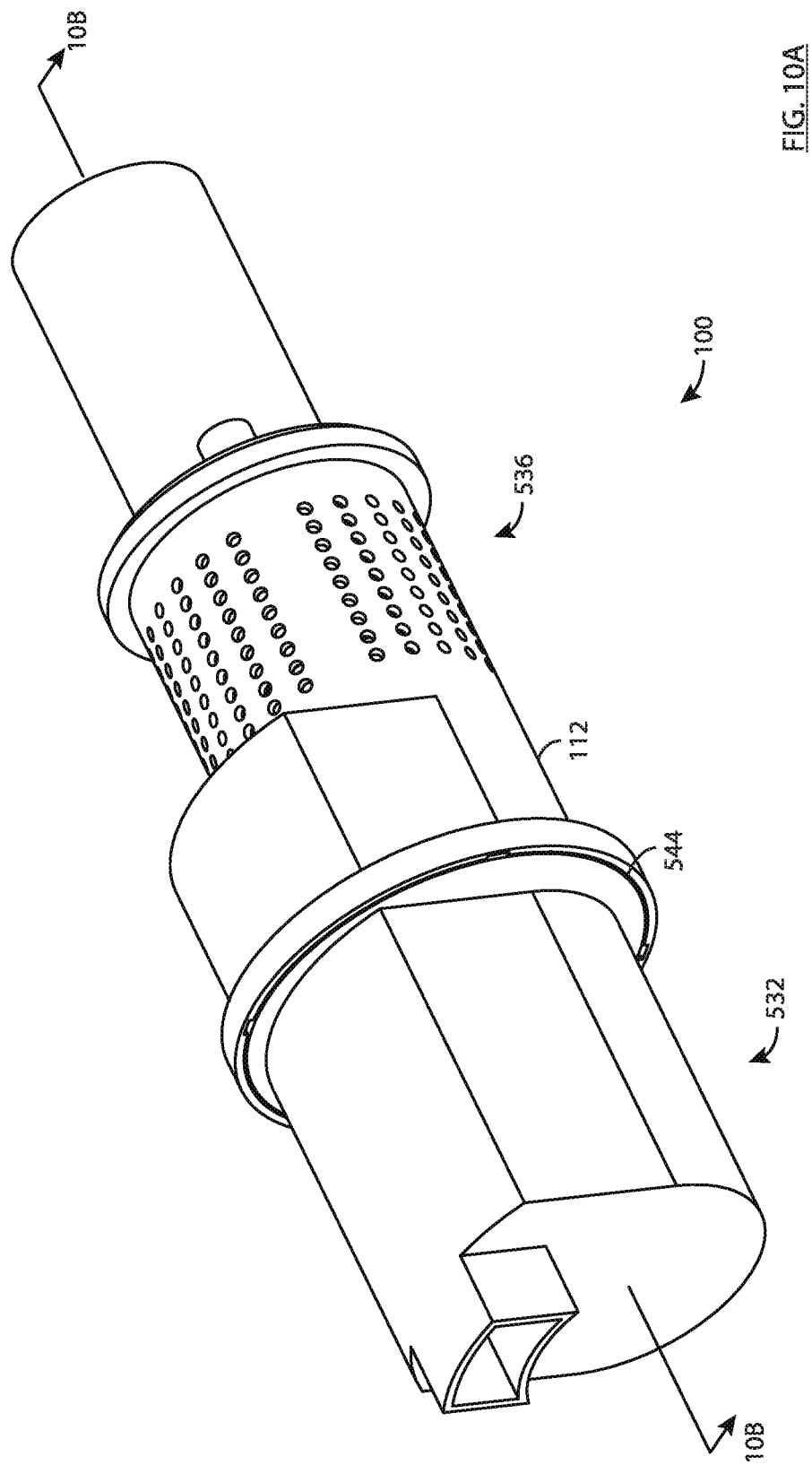

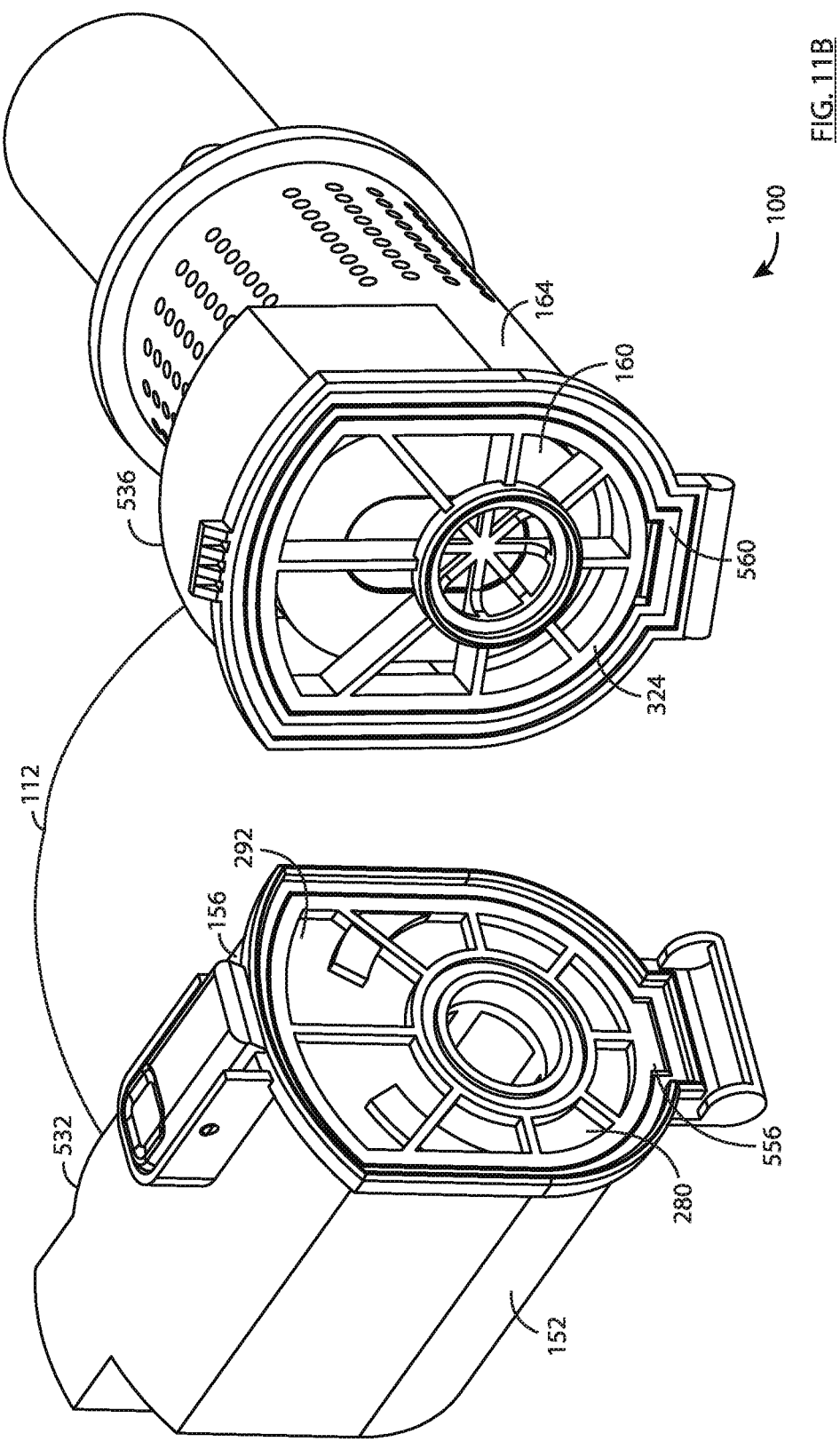

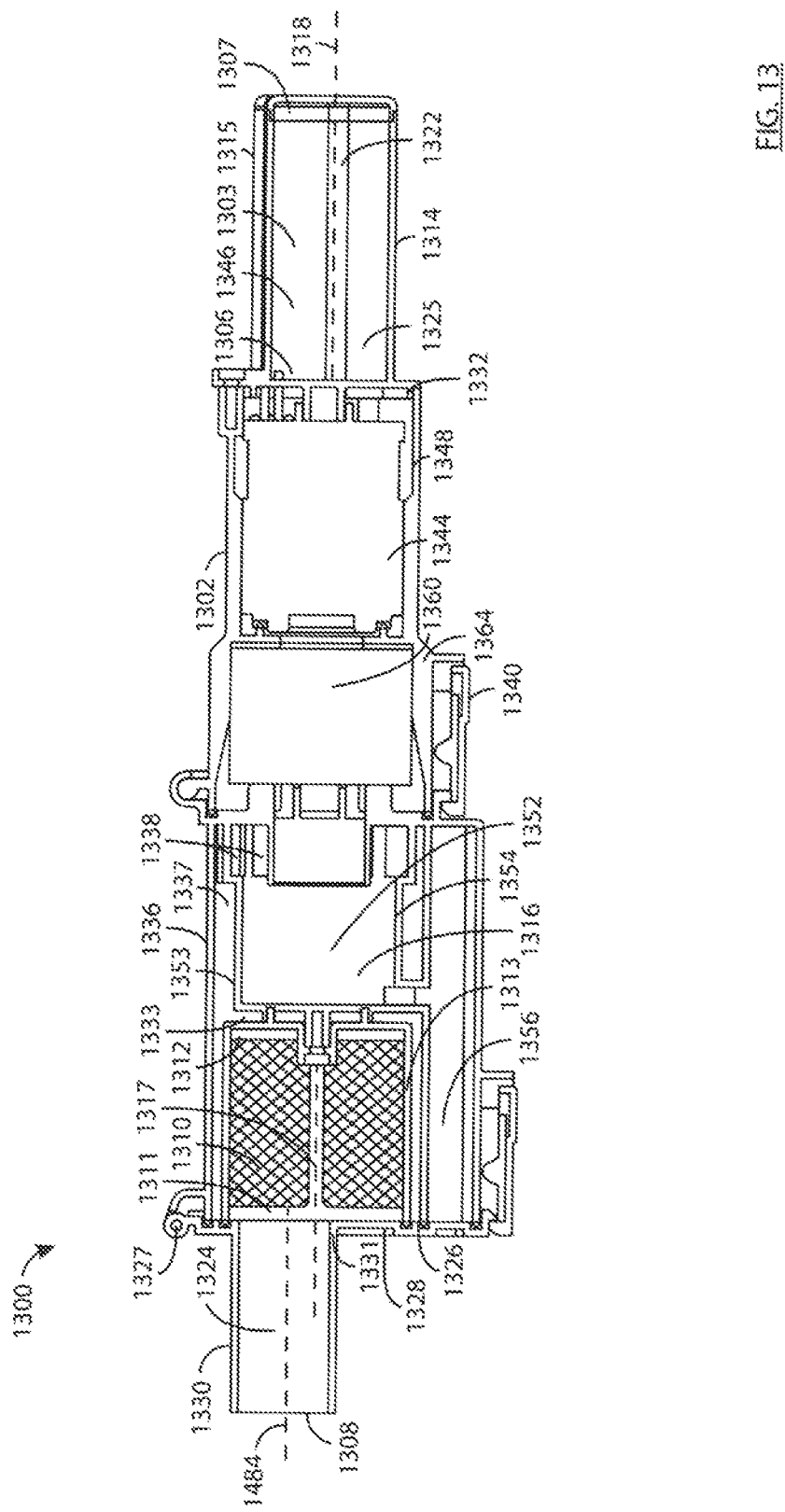

HAND VACUUM CLEANER

FIELD

This disclosure relates generally to surface cleaning apparatus. In a preferred embodiment, the surface cleaning apparatus comprises a portable surface cleaning apparatus, such as a hand vacuum cleaner.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners are known in the art.

U.S. Pat. No. 9,204,769 discloses a hand vacuum cleaner wherein filter extends perpendicular to the cyclone axis of rotation and the handle is provided on the upper portion of the main body of the hand vacuum cleaner.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

According to a first aspect of this disclosure, which may be used by itself or in combination with one or more other aspects of this disclosure, a hand vacuum cleaner utilizes a cyclone and a generally annular filter wherein the cyclone axis of rotation and a central axis of the generally annular filter member are generally parallel but offset in a direction perpendicular to the axis. A generally annular filter has an axially extending outer surface that is an upstream side of the filter and an interior conduit wherein the inner side of the filter defining the interior conduit is a downstream side of the filter. Accordingly air travels generally inwardly from the outer periphery or surface of the filter to the interior conduit. Air then travels through the interior conduit to flow downstream from the filter.

An advantage of this design is that the outer side of the filter may provide a relatively large upstream surface area utilizing a relatively small filter. The filter may be provided in a filter housing wherein the outer surface of the filter is recessed inwardly from an inner surface of the filter housing so as to define an upstream header. The diameter of the filter housing may be greater than a diameter of the upstream cyclone. Accordingly, by offsetting the axis of the cyclone and the filter in the perpendicular direction, a header having a more uniform thickness or width (in the perpendicular direction) may be obtained thereby enabling the air entering the upstream header to be distribute more uniformly across the upstream side of the filter.

It will be appreciated that the filter need not be round. Any longitudinally extending filter having an interior hollow area to define a flow conduit may be used.

In accordance with this aspect of this disclosure, there is provided a hand vacuum cleaner having an upper end and a lower end, the hand vacuum cleaner comprising:

(a) an air flow path extending from a dirty air inlet to a clean air outlet with an air treatment member, a pre-motor filter and a suction motor provided in the air flow path, the dirty air inlet is provided at a front end of the hand vacuum cleaner;

(b) the air treatment member has a front end, a rear end and a central longitudinal axis extending between the front and rear ends of the air treatment member;

(c) the pre-motor filter is positioned rearward of the air treatment member, the pre-motor filter is annular in shape and has a front end, a rear end and a central longitudinal axis extending between the front and rear ends of the pre-motor filter and through a central cavity of the pre-motor filter; and, (d) the suction motor is positioned rearward of the pre-motor filter, the suction motor has a suction motor axis of rotation, wherein, when the hand vacuum cleaner is oriented with the upper end of the hand vacuum cleaner above the lower end of the hand vacuum cleaner, the central longitudinal axis of the air treatment member, the pre-motor filter axis and the suction motor axis of rotation are generally horizontal and the pre-motor filter axis is vertically spaced from the central longitudinal axis of the air treatment member and from the suction motor axis of rotation.

In any embodiment, the hand vacuum cleaner may further comprise a pre-motor filter chamber having an upper end and a lower end, the pre-motor filter is positioned in the pre-motor filter chamber spaced from upper and lower inner surfaces of the pre-motor filter chamber, wherein an upper end of the pre-motor filter is spaced from the upper inner surface of the pre-motor filter chamber a distance which is generally the same as a distance from a lower end of the pre-motor filter to the lower inner surface of the pre-motor filter chamber.

In any embodiment, the lower end of the pre-motor filter chamber may be generally coplanar with the lower end of the air treatment member.

In any embodiment, the upper end of the pre-motor filter chamber may be generally coplanar with the upper end of the air treatment member.

In any embodiment, the air treatment member may comprise a cyclone chamber and a dirt collection chamber external thereto wherein the lower end of the pre-motor filter chamber may be generally coplanar with a lower end of the cyclone chamber and the upper end of the pre-motor filter chamber may be positioned above the cyclone chamber when the hand vacuum cleaner is oriented with the upper end of the hand vacuum cleaner above the lower end of the hand vacuum cleaner.

In any embodiment, the dirt collection chamber may be positioned above the cyclone chamber when the hand vacuum cleaner is oriented with the upper end of the hand vacuum cleaner above the lower end of the hand vacuum cleaner.

In any embodiment, when the hand vacuum cleaner is oriented with the upper end of the hand vacuum cleaner above the lower end of the hand vacuum cleaner, the pre-motor filter axis may be vertically spaced upwardly from the central longitudinal axis of the air treatment member and from the suction motor axis of rotation.

In any embodiment, the hand vacuum cleaner may further comprise a handle provided rearward of the suction motor.

In any embodiment, the handle may comprise a battery compartment.

In any embodiment, when the hand vacuum cleaner is oriented with the upper end of the hand vacuum cleaner above the lower end of the hand vacuum cleaner, the handle may be positioned between the upper and lower ends of the pre-motor filter chamber.

In any embodiment, when the hand vacuum cleaner is oriented with the upper end of the hand vacuum cleaner above the lower end of the hand vacuum cleaner, the handle may be positioned between upper and lower ends of a suction motor housing.

In accordance with this aspect, there is also provided a hand vacuum cleaner having an upper end and a lower end, the hand vacuum cleaner comprising:

(a) an air flow path extending from a dirty air inlet to a clean air outlet with an air treatment member, a pre-motor filter and a suction motor provided in the air flow path, the dirty air inlet is provided at a front end of the hand vacuum cleaner;
(b) the air treatment member comprises a cyclone chamber and a dirt collection chamber external thereto, the cyclone chamber has a front end, a rear end and a central longitudinal axis extending between the front and rear ends of the cyclone chamber, the cyclone chamber has a height extending between upper and lower ends of the cyclone chamber;
(c) the pre-motor filter is positioned in a pre-motor filter housing rearward of the air treatment member, the pre-motor filter has a front end, a rear end and a central longitudinal axis extending between the front and rear ends of the pre-motor filter and through a central cavity of the pre-motor filter, the pre-motor filter chamber has a height extending between upper and lower ends of the pre-motor filter chamber which is greater than the height of the cyclone chamber, wherein the pre-motor filter is positioned in the pre-motor filter chamber spaced from upper and lower inner surfaces of the pre-motor filter chamber, wherein an upper end of the pre-motor filter is spaced from the upper inner surface of the pre-motor filter chamber a distance which is generally the same as a distance from a lower end of the pre-motor filter to the lower inner surface of the pre-motor filter chamber; and,
(d) the suction motor is positioned rearward of the pre-motor filter, the suction motor has a suction motor axis of rotation, wherein, when the hand vacuum cleaner is oriented with the upper end of the hand vacuum cleaner above the lower end of the hand vacuum cleaner, the central longitudinal axis of the air treatment member and the pre-motor filter axis are generally horizontal.

In any embodiment, when the hand vacuum cleaner is oriented with the upper end of the hand vacuum cleaner above the lower end of the hand vacuum cleaner, the suction motor axis of rotation may be generally horizontal.

In any embodiment, when the hand vacuum cleaner is oriented with the upper end of the hand vacuum cleaner above the lower end of the hand vacuum cleaner, the pre-motor filter axis may be vertically spaced from the central longitudinal axis of the cyclone chamber and from the suction motor axis of rotation.

In any embodiment, when the hand vacuum cleaner is oriented with the upper end of the hand vacuum cleaner above the lower end of the hand vacuum cleaner, the pre-motor filter axis may be vertically spaced from the central longitudinal axis of the cyclone chamber.

In any embodiment, the lower end of the pre-motor filter chamber may be generally coplanar with the lower end of the air treatment member.

In any embodiment, the upper end of the pre-motor filter chamber may be generally coplanar with the upper end of the air treatment member.

In any embodiment, the lower end of the pre-motor filter chamber may be generally coplanar with a lower end of the cyclone chamber and the upper end of the pre-motor filter chamber may be positioned above the cyclone chamber when the hand vacuum cleaner is oriented with the upper end of the hand vacuum cleaner above the lower end of the hand vacuum cleaner.

In any embodiment, the dirt collection chamber may be positioned above the cyclone chamber when the hand vacuum cleaner is oriented with the upper end of the hand vacuum cleaner above the lower end of the hand vacuum cleaner.

In any embodiment, when the hand vacuum cleaner is oriented with the upper end of the hand vacuum cleaner above the lower end of the hand vacuum cleaner, the pre-motor filter axis may be vertically spaced upwardly from the central longitudinal axis of the air treatment member and from the suction motor axis of rotation.

According to a second aspect of this disclosure, which may be used by itself or in combination with one or more other aspects of this disclosure, a cyclone bin assembly, which may be used in a hand vacuum cleaner, has a dirt collection chamber external to the cyclone chamber wherein the dirt collection chamber is positioned above the cyclone chamber when the upper end of the hand vacuum cleaner is above the lower end of the hand vacuum cleaner and the cyclone axis of rotation extends generally horizontally.

In a hand vacuum cleaner, the hand vacuum cleaner may be oriented to have the front end extend downwardly when in use. The dirt collection chamber may be provided above the cyclone chamber and rearward of a dirty air inlet passage. This may enable the dirt collection chamber to be positioned within the outer dimensions of the hand vacuum cleaner (when the dirt collection chamber is excluded) without increasing the overall size of the hand vacuum cleaner. Alternately, or in addition, the inlet to the dirt collection chamber may be at a rearward end of the dirt collection chamber so that dirt will travel forwardly due to gravity when the hand vacuum cleaner is in use. This may enable the dirt collection chamber to fill to a "fill line" without the dirt collection chamber having to be emptied prematurely.

In accordance with this aspect, there is provided a hand vacuum cleaner having an upper end and a lower end, the hand vacuum cleaner comprising:

(a) an air flow path extending from a dirty air inlet to a clean air outlet with a cyclone chamber, a pre-motor filter and a suction motor provided in the air flow path, the dirty air inlet is provided at a front end of the hand vacuum cleaner;
(b) the cyclone chamber has a front end, a rear end and a central longitudinal axis extending between the front and rear ends of the cyclone chamber; and,
(c) a dirt collection chamber external to the cyclone chamber, wherein the dirt collection chamber is positioned above the cyclone chamber when the hand vacuum cleaner is oriented with the upper end of the hand vacuum cleaner above the lower end of the hand vacuum cleaner.

In any embodiment, the dirt collection chamber may overlie at least a portion of the cyclone chamber when the hand vacuum cleaner is oriented with the upper end of the hand vacuum cleaner above the lower end of the hand vacuum cleaner.

In any embodiment, the hand vacuum cleaner may further comprise an inlet passage extending between the dirty air inlet and the cyclone chamber, wherein a rear end of the inlet passage is positioned proximate a front end of the dirt collection chamber.

In any embodiment, the inlet passage may have an inlet axis that intersects the dirt collection chamber. Optionally, the inlet axis may extend through the dirt collection chamber.

In any embodiment, the cyclone chamber may have an air inlet at the front end of the cyclone chamber and/or an air outlet at the rear end of the cyclone chamber. In any such case, the cyclone chamber may have a dirt outlet at the rear end of the cyclone chamber.

In any embodiment, the dirt collection chamber may extend forwardly from the dirt outlet.

In any embodiment, the cyclone chamber may have a dirt outlet at the rear end of the cyclone chamber.

In any embodiment, the dirt collection chamber may extend forwardly from the dirt outlet.

In any embodiment, the hand vacuum cleaner may further comprise an inlet passage extending between the dirty air inlet and the cyclone chamber, wherein the dirt collection chamber extends rearwardly from the inlet passage to a pre-motor filter chamber.

In any embodiment, when the hand vacuum cleaner is oriented with the upper end of the hand vacuum cleaner above the lower end of the hand vacuum cleaner, the dirt collection chamber may have a length between a front end of the dirt collection chamber and a rear end of the dirt collection chamber that is greater than the height of the dirt collection chamber.

In any embodiment, a pre-motor filter may be positioned rearward of the air treatment member, the pre-motor filter may be annular in shape and have a front end, a rear end and a central longitudinal axis extending between the front and rear ends of the pre-motor filter and through a central cavity of the pre-motor filter, wherein, when the hand vacuum cleaner is oriented with the upper end of the hand vacuum cleaner above the lower end of the hand vacuum cleaner, the central longitudinal axis of the cyclone chamber and the pre-motor filter axis may be generally horizontal.

In any embodiment, the suction motor may be positioned rearward of the pre-motor filter, the suction motor may have a suction motor axis of rotation, wherein, when the hand vacuum cleaner is oriented with the upper end of the hand vacuum cleaner above the lower end of the hand vacuum cleaner, the suction motor axis of rotation is generally horizontal.

In any embodiment, a pre-motor filter may be positioned rearward of the air treatment member and the suction motor may be positioned rearward of the pre-motor filter, the suction motor has a suction motor axis of rotation, wherein, when the hand vacuum cleaner is oriented with the upper end of the hand vacuum cleaner above the lower end of the hand vacuum cleaner, the central longitudinal axis of the cyclone chamber and the suction motor axis of rotation maybe generally horizontal.

In any embodiment, when the hand vacuum cleaner is oriented with the upper end of the hand vacuum cleaner above the lower end of the hand vacuum cleaner, the central longitudinal axis of the cyclone chamber may be generally horizontal.

In any embodiment, the hand vacuum cleaner may further comprise a handle provided rearward of the suction motor and which extends generally rearwardly.

In any embodiment, when the hand vacuum cleaner is oriented with the upper end of the hand vacuum cleaner above the lower end of the hand vacuum cleaner, the handle may be positioned between the upper and lower ends of a pre-motor filter chamber.

In any embodiment, when the hand vacuum cleaner is oriented with the upper end of the hand vacuum cleaner above the lower end of the hand vacuum cleaner, the handle may be positioned between upper and lower ends of a suction motor housing.

In accordance with this aspect, there is also provided a hand vacuum cleaner having an upper end and a lower end, the hand vacuum cleaner comprising:
(a) an air flow path extending from a dirty air inlet to a clean air outlet with an air treatment member, a pre-motor filter and a suction motor provided in the air flow path, the dirty air inlet is provided at a front end of the hand vacuum cleaner;
(b) the air treatment member has a front end, a rear end and a central longitudinal axis extending between the front and rear ends of the air treatment member; and,
(c) a dirt collection chamber external to the air treatment member, wherein the dirt collection chamber is positioned above the air treatment member when the hand vacuum cleaner is oriented with the upper end of the hand vacuum cleaner above the lower end of the hand vacuum cleaner.

In any embodiment, the dirt collection chamber may overly at least a portion of the air treatment member when the hand vacuum cleaner is oriented with the upper end of the hand vacuum cleaner above the lower end of the hand vacuum cleaner.

In any embodiment, the hand vacuum cleaner may further comprise an inlet passage extending between the dirty air inlet and the air treatment member, wherein a rear end of the inlet passage is positioned proximate a front end of the dirt collection chamber.

In any embodiment, the inlet passage may have an inlet axis that intersects the dirt collection chamber.

In any embodiment, the inlet axis may extend through the dirt collection chamber.

According to a third aspect of this disclosure, which may be used by itself or in combination with one or more other aspects of this disclosure, a hand vacuum cleaner is provided which has a linear arrangement of two or more of the operating components, preferably three or more of the operating components, and the handle. An advantage of this design is that the hand vacuum cleaner may have a compact ergonomic design.

In accordance with this aspect, there is provided a hand vacuum cleaner having an upper end and a lower end, the hand vacuum cleaner comprising:
(a) an air flow path extending from a dirty air inlet to a clean air outlet with an air treatment member, a pre-motor filter and a suction motor provided in the air flow path, the dirty air inlet is provided at a front end of the hand vacuum cleaner;
(b) the air treatment member has a front end, a rear end and a central longitudinal axis extending between the front and rear ends of the air treatment member;
(c) the pre-motor filter is positioned rearward of the air treatment member, the pre-motor filter is annular in shape and has a front end, a rear end and a central longitudinal axis extending between the front and rear ends of the pre-motor filter and through a central cavity of the pre-motor filter;

(d) the suction motor is positioned rearward of the pre-motor filter, the suction motor has a suction motor axis of rotation; and,
(e) a handle provided rearward of the suction motor, the handle having a hand grip portion that extends axially, wherein the central longitudinal axis of the air treatment member, the central longitudinal axis of the pre-motor filter, the suction motor axis of rotation and the hand grip portion are generally parallel.

In any embodiment, when the hand vacuum cleaner is oriented with the upper end of the hand vacuum cleaner above the lower end of the hand vacuum cleaner, the central longitudinal axis of the air treatment member, the central longitudinal axis of the pre-motor filter, the suction motor axis of rotation and the hand grip portion may be generally horizontal.

In any embodiment, the hand grip portion may house at least one battery wherein the battery extends axially and the central longitudinal axis of the air treatment member and the battery are generally parallel.

In any embodiment, the hand vacuum cleaner may further comprise an inlet passage which has an inlet axis that is generally parallel to the central longitudinal axis of the air treatment member.

In any embodiment, when the hand vacuum cleaner is oriented with the upper end of the hand vacuum cleaner above the lower end of the hand vacuum cleaner, the inlet axis may be vertically spaced from the central longitudinal axis of the air treatment member.

In any embodiment, when the hand vacuum cleaner is oriented with the upper end of the hand vacuum cleaner above the lower end of the hand vacuum cleaner, the inlet axis may overlie the central longitudinal axis of the air treatment member.

In any embodiment, the inlet axis may be generally co-axial with the central longitudinal axis of the air treatment member.

In any embodiment, the hand vacuum cleaner may further comprise a battery compartment that houses at least one battery wherein the battery extends axially and the central longitudinal axis of the air treatment member and the battery are generally parallel.

In any embodiment, the air treatment member may comprise a cyclone chamber and a dirt collection chamber external thereto and the dirt collection chamber is positioned forward of the cyclone chamber.

In any embodiment, the air treatment member may comprise a cyclone chamber and a dirt collection chamber external thereto and the central longitudinal axis of the air treatment member is a central longitudinal axis of the cyclone chamber and, when the hand vacuum cleaner is oriented with the upper end of the hand vacuum cleaner above the lower end of the hand vacuum cleaner, the dirt collection chamber may be positioned above the central longitudinal axis of the cyclone chamber.

In accordance with this aspect, there is also provided a hand vacuum cleaner having an upper end and a lower end, the hand vacuum cleaner comprising:
(a) an air flow path extending from a dirty air inlet to a clean air outlet with an air treatment member and a suction motor provided in the air flow path, the dirty air inlet is provided at a front end of the hand vacuum cleaner;
(b) the air treatment member has a front end, a rear end and a central longitudinal axis extending between the front and rear ends of the air treatment member;
(c) the suction motor is positioned rearward of the air treatment member, the suction motor has a suction motor axis of rotation; and,
(d) a handle provided rearward of the suction motor, the handle housing at least one battery wherein the battery extends axially, wherein the central longitudinal axis of the air treatment member, the suction motor axis of rotation and the battery are generally parallel.

In any embodiment, when the hand vacuum cleaner is oriented with the upper end of the hand vacuum cleaner above the lower end of the hand vacuum cleaner, the central longitudinal axis of the air treatment member, the suction motor axis of rotation and the battery may be generally horizontal.

In any embodiment, the pre-motor filter may be annular in shape and may have a front end, a rear end and a central longitudinal axis extending between the front and rear ends of the pre-motor filter and through a central cavity of the pre-motor filter and the central longitudinal axis of the air treatment member and the central longitudinal axis of the pre-motor filter may be generally parallel.

In any embodiment, the hand vacuum cleaner may further comprise a pre-motor filter positioned in the air flow path rearward of the air treatment member.

In any embodiment, the handle may have a hand grip portion and the hand grip portion comprises the battery compartment.

In accordance with this aspect, there is also provided a hand vacuum cleaner having an upper end and a lower end, the hand vacuum cleaner comprising:
(a) an air flow path extending from a dirty air inlet to a clean air outlet with an air treatment member and a suction motor provided in the air flow path, the dirty air inlet is provided at a front end of the hand vacuum cleaner;
(b) the air treatment member has a front end, a rear end and a central longitudinal axis extending between the front and rear ends of the air treatment member;
(c) the suction motor is positioned rearward of the air treatment member, the suction motor has a suction motor axis of rotation; and,
(d) a handle provided rearward of the suction motor, the handle comprising a battery compartment hosing at least one battery wherein the battery extends axially, wherein the central longitudinal axis of the air treatment member and the battery are generally parallel and the central longitudinal axis of the air treatment member intersects the battery compartment.

In any embodiment, when the hand vacuum cleaner is oriented with the upper end of the hand vacuum cleaner above the lower end of the hand vacuum cleaner, the central longitudinal axis of the air treatment member may be generally horizontal.

In any embodiment, the handle may have a hand grip portion and the hand grip portion may comprise the battery compartment.

In any embodiment, the hand vacuum cleaner may further comprise a pre-motor filter positioned between the air treatment member and the suction motor, the pre-motor filter may have a front end facing a rear end of the air treatment member, a rear end facing a suction motor inlet and a central longitudinal axis extending between the front and rear ends of the pre-motor filter, and the central longitudinal axis of the pre-motor filter and the suction motor axis of rotation may be generally parallel.

According to a fourth aspect of this disclosure, which may be used by itself or in combination with one or more other aspects of this disclosure, a hand vacuum cleaner is provided with a first stage separation member which utilizes a porous member such as a screen to remove larger particulate matter and/or elongate matter (e.g., hair). The first stage separation member may be a chamber which does not have cyclonic flow therein (a non-cyclonic chamber). Instead, a screen, which may be a metal screen, a plastic shroud (e.g., a molded plastic member having a plurality of holes therein) or the like, is used as a physical filtration member to remove larger particulate matter and/or elongate matter. One or more additional air treatment stages may be provided downstream such as one or more cyclonic stages, each of which may use a single cyclone or a plurality of cyclones in parallel) and/or one or more pre-motor filters and/or one or more post-motor filters.

An advantage of this design is that cyclonic stage that is configured to remove larger particulate matter and/or elongate matter is not required. Therefore, the first or only cyclonic stage downstream of the non-cyclonic chamber may be configured to remove finer particular matter. Therefore, the cyclonic stage may be smaller, thereby reducing the size of the hand vacuum cleaner. Also, a cyclonic stage that may become clogged with hair may not be used.

In accordance with this aspect, there is provided a hand vacuum cleaner having an upper end and a lower end, the hand vacuum cleaner comprising:

(a) an air flow path extending from a dirty air inlet to a clean air outlet with a non-cyclonic chamber, an air treatment member, a pre-motor filter and a suction motor provided in the air flow path, the dirty air inlet is provided at a front end of the hand vacuum cleaner;
(b) the non-cyclonic chamber having an air inlet downstream from the dirty air inlet and an air outlet, the air outlet comprising a screen;
(c) the air treatment member is positioned rearward of the non-cyclonic chamber, the air treatment member has a front end, a rear end and a central longitudinal axis extending between the front and rear ends of the air treatment member; the pre-motor filter is positioned rearward of the air treatment member; and,
(d) the suction motor is positioned rearward of the pre-motor filter, the suction motor has a suction motor axis of rotation.

In any embodiment, the non-cyclonic chamber may have a front end, a rear end and a sidewall extending between the front and rear ends, and at least a portion of the rear end and at least a portion of the sidewall may be porous.

In any embodiment, the front end of the non-cyclonic chamber may be open.

In any embodiment, the non-cyclonic chamber may have a front end, a rear end and a sidewall extending between the front and rear ends, and at least a portion of the rear end and at least a portion of the sidewall may be made of a screen material. Optionally, the front end of the non-cyclonic chamber may be open.

In any embodiment, the non-cyclonic chamber may be in the form of a longitudinally extending basket.

In any embodiment, the air treatment member may comprise a treatment chamber and a dirt collection chamber external thereto and the hand vacuum cleaner may further comprise an openable door wherein, when the door is open, both the non-cyclonic chamber and the dirt collection chamber are opened.

In any embodiment, the treatment chamber may comprise a cyclone chamber.

In any embodiment, at least a first portion of the dirt collection chamber may be positioned below the treatment chamber when the hand vacuum cleaner is oriented with the upper end of the hand vacuum cleaner above the lower end of the hand vacuum cleaner.

In any embodiment, a second portion of the dirt collection chamber may be positioned below the non-cyclonic chamber when the hand vacuum cleaner is oriented with the upper end of the hand vacuum cleaner above the lower end of the hand vacuum cleaner.

In any embodiment, at least a first portion of the dirt collection chamber may be positioned below the non-cyclonic chamber when the hand vacuum cleaner is oriented with the upper end of the hand vacuum cleaner above the lower end of the hand vacuum cleaner.

In any embodiment, the hand vacuum cleaner may further comprise a handle provided rearward of the suction motor.

In any embodiment, the handle may comprise a battery compartment.

In any embodiment, when the hand vacuum cleaner is oriented with the upper end of the hand vacuum cleaner above the lower end of the hand vacuum cleaner, the handle may be positioned between the upper and lower ends of the air treatment chamber.

In any embodiment, when the hand vacuum cleaner is oriented with the upper end of the hand vacuum cleaner above the lower end of the hand vacuum cleaner, the handle may be positioned between upper and lower ends of a suction motor housing.

In any embodiment, the hand vacuum cleaner may further comprise an inlet passage extending between the dirty air inlet and the non-cyclonic chamber, wherein a rear end of the inlet passage is positioned proximate a front end of the non-cyclonic chamber.

In any embodiment, the inlet passage may have an inlet axis that intersects the non-cyclonic chamber.

In any embodiment, the hand vacuum cleaner may further comprise an inlet passage extending between the dirty air inlet and the non-cyclonic chamber wherein, when the hand vacuum cleaner is oriented with the upper end of the hand vacuum cleaner above the lower end of the hand vacuum cleaner, the inlet passage is positioned above the non-cyclonic chamber.

According to a fifth aspect of this disclosure, which may be used by itself or in combination with one or more other aspects of this disclosure, a vacuum cleaner is provided with a handle wherein the outer surface of the handle is provided with recesses so as to define axially extending recesses that provide a grip for a user. An axially extending handle may house a plurality of axially extending batteries and the hand recesses may be defined by spacing between adjacent batteries. For example, if the handle houses three axially extending batteries, the batteries may be arranged in a triangular shape. The handle may conform to the triangular shape of the batteries whereby recesses may be provided in the outer surface of the handle, which recesses extend in the same direction as the batteries. Therefore, in transverse election, the handle may have a lobed design.

In accordance with this aspect, there is provided a hand vacuum cleaner having an upper end and a lower end, the hand vacuum cleaner comprising:

(a) an air flow path extending from a dirty air inlet to a clean air outlet with an air treatment member and a suction motor provided in the air flow path; and,
(b) a handle having a front end, a rear end, a sidewall extending between the front end and the rear end and a longitudinal axis extending between the front end and the rear end, the handle defining a battery compartment configured to house at least one battery having a battery axis, wherein at least a portion of the sidewall has a plurality of recesses extending in a direction of the battery axis.

In any embodiment, the handle may further comprise a plurality of lobes extending in the direction of the battery axis and each recess is provided between two lobes.

In any embodiment, each lobe may define a portion of a compartment for a battery.

In any embodiment, each lobe may conform to an outer surface of a battery housed in the handle.

In any embodiment, the dirty air inlet may be provided at a front end of the hand vacuum cleaner, the suction motor may be positioned rearward of the air treatment member and the handle may be positioned rearward of the suction motor.

In any embodiment, the air treatment member may have a front end, a rear end and a central longitudinal axis extending between the front and rear ends of the air treatment member and the suction motor has a suction motor axis of rotation and the central longitudinal axis and the suction motor axis may extend through the handle.

In any embodiment, the central longitudinal axis and the suction motor axis may be generally parallel to the battery axis.

In any embodiment, the central longitudinal axis may extend through the suction motor.

In any embodiment, the air treatment member may have a front end, a rear end and a central longitudinal axis extending between the front and rear ends of the air treatment member and the suction motor has a suction motor axis of rotation and the central longitudinal axis may extend through the handle.

In any embodiment, the central longitudinal axis may be generally parallel to the battery axis.

In any embodiment, the air treatment member may have a front end, a rear end and a central longitudinal axis extending between the front and rear ends of the air treatment member and the suction motor has a suction motor axis of rotation and the suction motor axis may extend through the handle.

In any embodiment, the suction motor axis may be generally parallel to the battery axis.

In any embodiment, the suction motor axis may extend through the air treatment member.

In any embodiment, at least a portion of the sidewall may have a trefoil shape having three rounded lobes separated by three rounded cusps In any embodiment, the trefoil shape of the sidewall may extend from the front end of the handle to the rear end of the handle.

In any embodiment, when the hand vacuum cleaner is oriented with the upper end of the hand vacuum cleaner above the lower end of the hand vacuum cleaner, the handle may be positioned between the upper and lower ends of the air treatment chamber.

In any embodiment, when the hand vacuum cleaner is oriented with the upper end of the hand vacuum cleaner above the lower end of the hand vacuum cleaner, the handle may be positioned between upper and lower ends of a suction motor housing.

DRAWINGS

The drawings included herewith are for illustrating various examples of articles, methods, and apparatuses of the teaching of the present specification and are not intended to limit the scope of what is taught in any way.

In the drawings:

FIG. 5B is the cross-sectional view of FIG. 5A with the door in an open position;

FIG. 6B is a perspective view of the cross-section of FIG. 6A, with the door in an open position and a pre-motor filter being removed;

FIG. 7 is a cross-sectional view of a surface cleaning apparatus, in accordance with another embodiment;

FIG. 8 is a perspective view of the cross-section of FIG. 2 showing a main body in an open position;

FIG. 9B is a perspective view of a cross-section taken along line 9B-9B in FIG. 9A;

FIG. 10A is a perspective view of a surface cleaning apparatus in accordance with another embodiment;

FIG. 11B is a perspective view of the surface cleaning apparatus of FIG. 11A with a front portion of the main body separated from a rear portion of the main body;

FIG. 13 is a cross-sectional view of a surface cleaning apparatus, in accordance with another embodiment;

DESCRIPTION OF VARIOUS EMBODIMENTS

Figure 1:
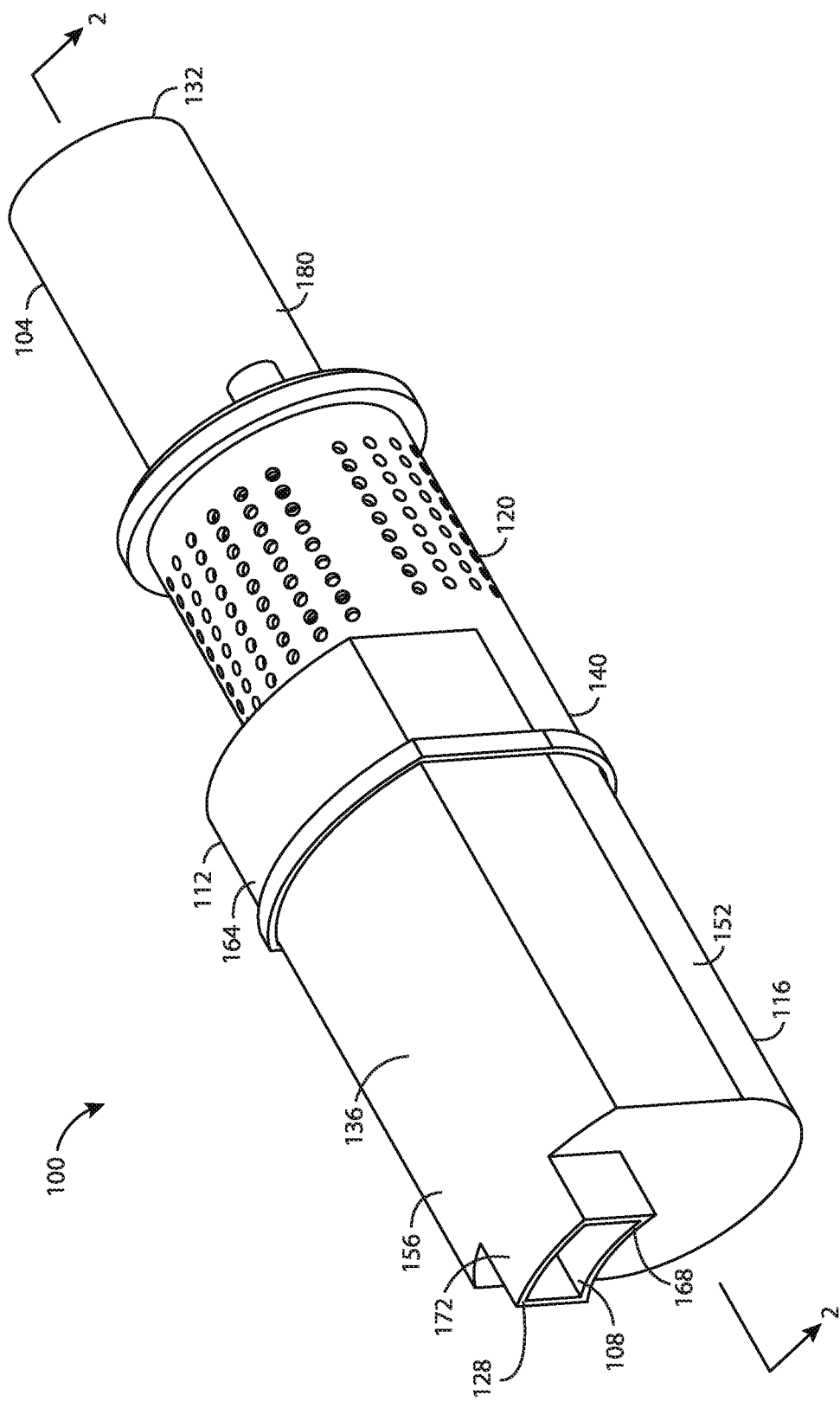
FIG. 1 is a front perspective view of a surface cleaning apparatus in accordance with an embodiment.

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Hand Vacuum Cleaner

Figure 2:
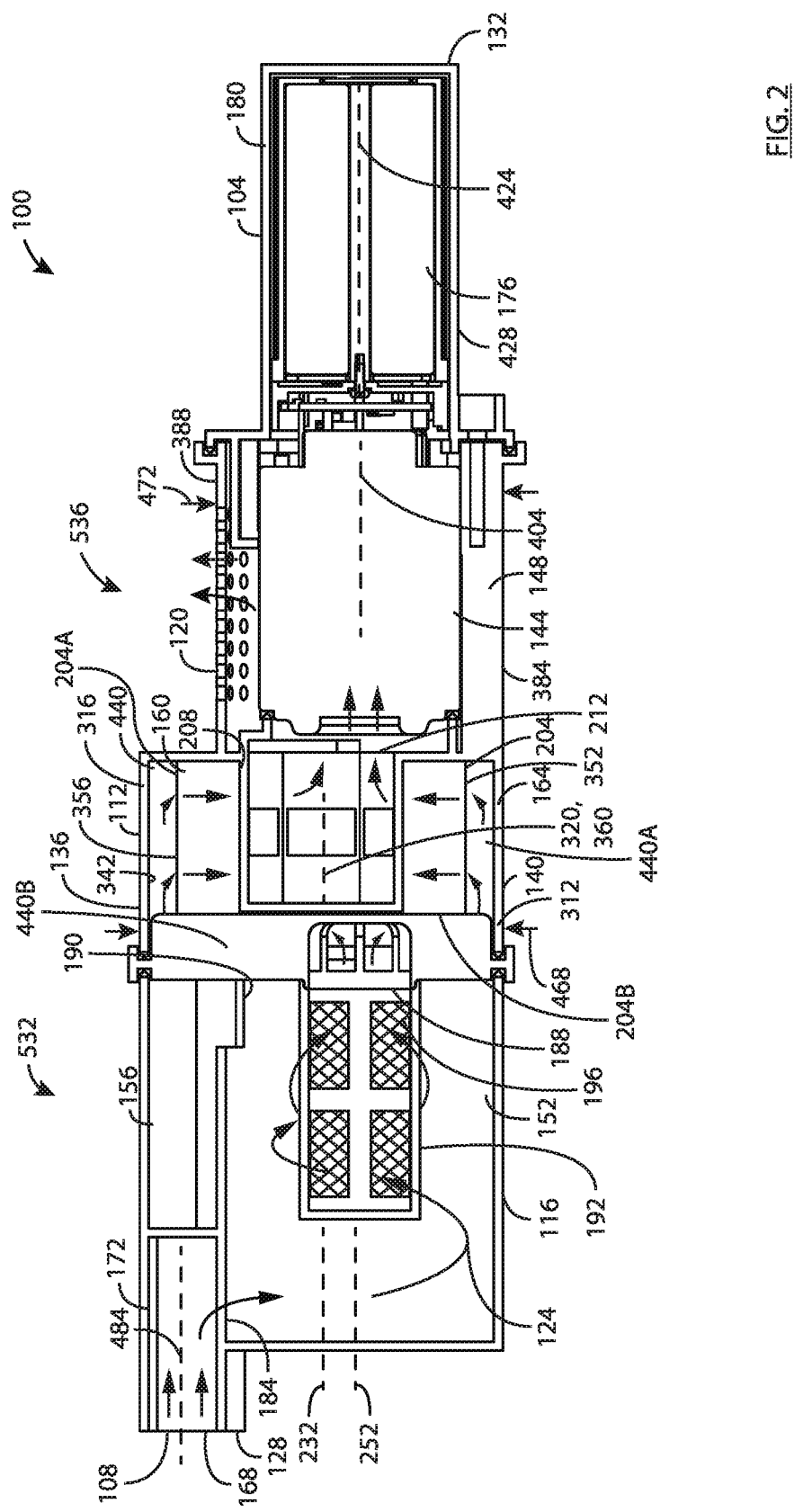
FIG. 2 is a cross-sectional view taken along line 2-2 in FIG. 1.

Referring to FIGS. 1-2, an exemplary embodiment of a surface cleaning apparatus is shown generally as 100. The following is a general discussion of apparatus 100 which provides a basis for understanding several of the features which are discussed herein. As discussed subsequently, each of the features may be used individually or in any particular combination or sub-combination in this or in other embodiments disclosed herein.

In the illustrated embodiment, surface cleaning apparatus 100 is a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together such as by an adhesive or welding, so as to move as one while maintaining a constant orientation relative to each other. This is to be contrasted with canister and upright vacuum cleaners, whose weight is typically supported by a surface (e.g. a floor) during use, and that if operable in a 'lift-away' configuration typically require a second hand to direct the dirty air inlet at the end of a flexible hose.

Still referring to FIGS. 1-2, surface cleaning apparatus 100 includes a main body 112 having an air treatment member 116, a dirty air inlet 108, a clean air outlet 120, and an air flow path 124 extending between the dirty air inlet 108 and the clean air outlet 120.

Surface cleaning apparatus 100 has a front end 128, a rear end 132, an upper end (also referred to as the top) 136, and a lower end (also referred to as the bottom) 140. In the embodiment shown, dirty air inlet 108 is at an upper portion of apparatus front end 128 and clean air outlet 120 is at a rearward portion of apparatus 100 proximate rear end 132. It will be appreciated that dirty air inlet 108 and clean air outlet 120 may be positioned in different locations of apparatus 100.

A suction motor 144 is provided to generate vacuum suction through air flow path 124, and is positioned within a motor housing 148. Suction motor 144 may be a fan-motor assembly including an electric motor and impeller blade(s). In the illustrated embodiment, suction motor 144 is positioned in the air flow path 124 downstream of air treatment member 116. In this configuration, suction motor 144 may be referred to as a "clean air motor". Alternatively, suction motor 144 may be positioned upstream of air treatment member 116, and referred to as a "dirty air motor".

Air treatment member 116 is configured to remove particles of dirt and other debris from the air flow. In the illustrated example, air treatment member 116 includes a cyclone assembly (also referred to as a "cyclone bin assembly") having a single cyclonic cleaning stage with a single cyclone chamber 152 and a dirt collection chamber 156 external to the cyclone chamber 152 (i.e. having a discrete volume from that of cyclone chamber 152). Cyclone chamber 152 and dirt collection chamber 156 may be of any configuration suitable for separating dirt from an air stream and collecting the separated dirt, respectively. Dirt collection chamber 156 may also be referred to as a "dirt collection bin".

In alternate embodiments, air treatment member 116 may include a cyclone assembly having two or more cyclonic cleaning stages arranged in series with each other. Each cyclonic cleaning stage may include one or more cyclone chambers arranged in parallel with each other and one or more dirt collection chambers, of any suitable configuration. The dirt collection chamber(s) may be external to the cyclone chambers. Alternatively, one or more (or all) of the dirt collection chamber(s) may be internal to one or more (or all) of the cyclone chambers. For example, the internal dirt collection chamber(s) may be configured as a dirt collection area (also referred to as a dirt collection region) within the cyclone chamber. In other alternative embodiments, air treatment member 116 may not include a cyclonic cleaning stage. For example, air treatment member 116 may include a bag, a porous physical filter media (such as, for example foam or felt), or other air treating means.

Still referring to FIGS. 1-2, hand vacuum cleaner 100 may include a pre-motor filter 160 provided in the air flow path 124 downstream of air treatment member 116 and upstream of suction motor 144. Pre-motor filter 160 may be formed from any suitable physical, porous filter media. For example, pre-motor filter 160 may be one or more of a foam filter, felt filter, HEPA filter, or other physical filter media. In some embodiments, pre-motor filter 160 may include an electrostatic filter, or the like. As shown, pre-motor filter 160 may be located in a pre-motor filter housing 164 that is external to the air treatment member 116.

In the illustrated embodiment, dirty air inlet 108 is the inlet end 168 of an air inlet conduit 172. Optionally, inlet end 168 of air inlet conduit 172 can be used as a nozzle to directly clean a surface. Alternatively, or in addition to functioning as a nozzle, air inlet conduit 172 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may be positioned forward of air treatment member 116, although this need not be the case.

As exemplified, inlet conduit 172 is located above chamber 152. Alternately, inlet conduit 172 may be positioned at a front end of chamber 152 and may have an outlet that is provided in the front wall of chamber 152.

As exemplified, power may be supplied to the suction motor 144 and other electrical components of the hand vacuum cleaner 100 from one or more batteries 176. As used herein, a 'battery' may be any electrical energy storage member suitable to supply power stored therein to power one or more electrical components of apparatus 100. As shown, battery 176 may be positioned in a battery compartment 180. Battery 176 may be permanently installed within battery compartment 180 and non-removable (e.g. rechargeable in-situ), or removable (e.g. for recharging, repair, and/or replacement). In alternative embodiments, apparatus 100 may not include a battery 176, and instead power may be supplied to apparatus 100 by an electrical cord (not shown) connected to an external source of electrical power (e.g. mains power such as a household AC outlet).

In the embodiment of FIG. 2, the air treatment member comprises a cyclone chamber 152 and the air treatment air inlet is a cyclone chamber air inlet 184 and the air treatment member air outlet is a cyclone chamber air outlet 188. The dirt collection occurs in an external dirt collection chamber 156. Accordingly, in operation, after activating suction motor 144, dirty air enters apparatus 100 through dirty air inlet 108 and is directed along air inlet conduit 172 to the cyclone chamber air inlet 184. As shown, cyclone chamber air inlet 184 may direct the dirty air flow to enter cyclone chamber 152 in a tangential direction so as to promote cyclonic action. Dirt particles and other debris may be disentrained (i.e. separated) from the dirty air flow as the dirty air flow travels from cyclone chamber air inlet 184 to cyclone chamber air outlet 188. The disentrained dirt particles and debris may discharge from cyclone chamber 152 through a dirt outlet 190 into dirt collection chamber 156 external to the cyclone chamber 152, where the dirt particles and debris may collect until dirt collection chamber 156 is emptied.

Air exiting cyclone chamber 152 may pass through an outlet passage 192 located upstream of cyclone chamber air outlet 188. Cyclone chamber outlet passage 192, may also act as a vortex finder to promote cyclonic flow within cyclone chamber 152. In some embodiments, cyclone chamber outlet passage 192 may include a screen 196 (e.g. a fine mesh screen) in the air flow path 124 to remove large dirt particles and debris, such as hair, remaining in the exiting air flow.

Accordingly, as exemplified, the cyclone chamber 152 is a uniflow cyclone chamber with the air inlet at a front end and the air outlet at a rear end.

From cyclone chamber air outlet 188, the air flow may be directed into pre-motor filter housing 164 at an upstream side 204 of pre-motor filter 160. The air flow may pass through pre-motor filter 160 to pre-motor filter downstream side 208, and then exit through pre-motor filter chamber air outlet 212 into motor housing 148. At motor housing 148, the clean air flow may be drawn into suction motor 144 and then discharged from apparatus 100 through clean air outlet 120.

FIG. 13 shows another exemplary embodiment of a surface cleaning apparatus shown generally as 1300. It will be appreciated that any of the features of the embodiments of surface cleaning apparatus 100 may be used in this embodiment and vice versa. As exemplified, surface cleaning apparatus 1300 includes a main body 1302 having an air treatment member 1316, a dirty air inlet 1308, a clean air outlet 1320, and an air flow path 1324 extending between the dirty air inlet 1308 and the clean air outlet 1320.

Surface cleaning apparatus 1300 has a front end 1328, a rear end 1332, an upper end (also referred to as the top)

1336, and a lower end (also referred to as the bottom) 1340. In the embodiment shown, dirty air inlet 1308 is at an upper portion of apparatus front end 1328 and clean air outlet 1320 is at a rearward portion of apparatus 1300 proximate rear end 1332. It will be appreciated that dirty air inlet 1308 and clean air outlet 1320 may be positioned in different locations of apparatus 1300. For example, as in the embodiment of FIG. 1, the dirty air inlet may be located above non-cyclonic chamber 1310. Alternately, it may be provided at any elevation of the front end such that the axis 1484 of the inlet passes through chamber 1310.

A suction motor 1344 is provided to generate vacuum suction through air flow path 1324, and is positioned within a motor housing 1348. Suction motor 1344 may be a fan-motor assembly including an electric motor and impeller blade(s). In the illustrated embodiment, suction motor 1344 is positioned in the air flow path 1324 downstream of air treatment member 1316. In this configuration, suction motor 1344 may be referred to as a "clean air motor". Alternatively, suction motor 1344 may be positioned upstream of air treatment member 1316, and referred to as a "dirty air motor".

Annular Pre-Motor Filter in a Filter Housing Having an Increased Height

In accordance with this aspect, an annular filter having an increased height is provided. Generally, an annular filter is a filter having a hollow internal portion, which may be centrally positioned and which defines an interior air flow passage for filtered air. Accordingly, the filter has an outer upstream surface and an inner downstream surface. It will be appreciated that, in perpendicular section, the annular filter may have a circular outer perimeter or profile and that, in perpendicular section, the interior flow passage may also have a circular inner perimeter or profile. However, it will be appreciated that any other profile may be used.

The features in this section may be used by themselves in any surface cleaning apparatus or in any combination or sub-combination with any other feature or features described herein. For example, any of the air treatment member features described herein may be used with any of the features of a dirt collection chamber, parallel arrangement of components, openable main body, and other features described herein.

In some embodiments, the pre-motor filter may include a central longitudinal axis that is vertically spaced from axes of the air treatment member and/or suction motor. For example, the pre-motor filter may be sized and positioned in accordance with a pre-motor filter chamber having dimensions which correspond to an adjacent air treatment member and inlet passage and/or a suction motor housing. This may permit the hand vacuum cleaner to accommodate a relatively larger pre-motor filter while maintaining a relatively compact form factor, all else being equal (i.e., the outer dimension of the hand vacuum cleaner need not be increased to provide a larger upstream filter area). A relatively larger pre-motor filter may provide less backpressure for the same particle separation efficiency as compared with a smaller pre-motor filter, all else being equal. This may permit the handvac to use a smaller, lighter, less expensive, and less powerful suction motor.

Figure 3:
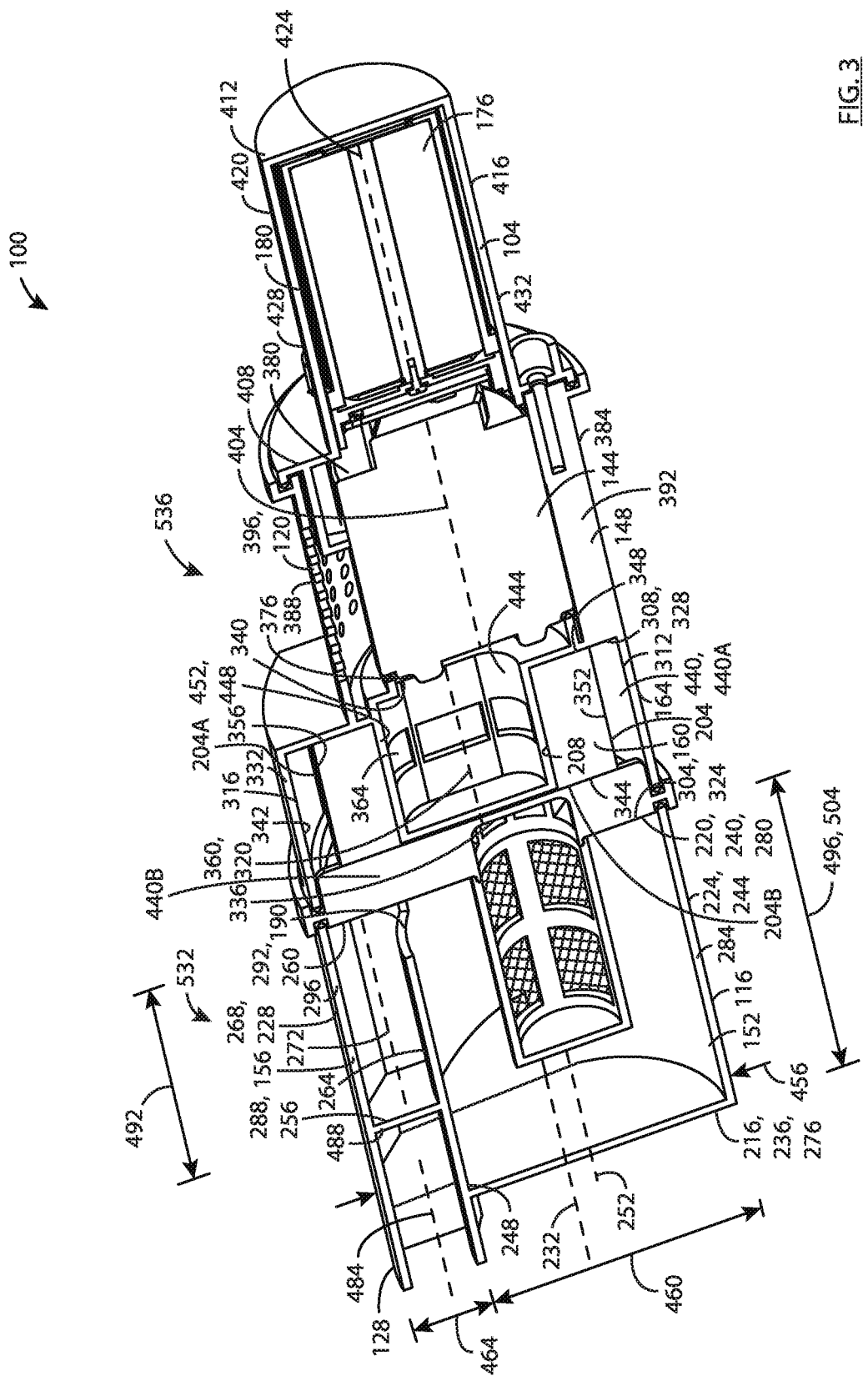
FIG. 3 is a perspective view of the cross-section of FIG. 2.

FIG. 3 exemplifies an embodiment wherein the dirt collection chamber is above the air treatment member. As exemplified, an enlarged filter housing is provided by selecting a height of the pre-motor filter housing that is the same as the height of the air treatment member chamber and the dirt collection chamber. This enables the use of an annular pre-motor filter that has a larger height (diameter) and/or a larger upstream pre-motor filter header in a direction radially outwardly and facing the longitudinally extending upstream surface of the pre-motor filter. An advantage of increasing the diameter of the pre-motor filter is that the upstream (outer) surface area may be increased. Also, the cross-sectional area perpendicular to the axis of the pre-motor filter of the inner flow conduit of the pre-motor filter (e.g., central cavity 364) may be increased while still having a thickness of the pre-motor filter in a direction perpendicular to the axis of the pre-motor filter that is sufficient to filter the air exiting the air treatment member chamber.

Referring to FIG. 3, apparatus 100 may include an air treatment member 116 proximate apparatus front end 128, a pre-motor filter housing 164 with a pre-motor filter 160 positioned rearward of air treatment member 116, and a suction motor housing 148 with suction motor 144 positioned rearward of pre-motor filter housing 164. A handle 104 may extend rearward of suction motor housing 148.

Air treatment member 116 extends longitudinally from a front end 216 to a rear end 220, and vertically from a lower end 224 to an upper end 228. As shown, air treatment member 116 may have a central longitudinal axis 232 that extends between, and intersects, the front and rear ends 216 and 220.

In FIG. 3, air treatment member 116 is exemplified as a cyclone chamber 152. Cyclone chamber 152 may have an internal dirt collection region and/or, as exemplified, an external dirt collection chamber 156. Cyclone chamber 152 may extend longitudinally from a front end 236 to a rear end 240, and vertically from a lower end 244 to an upper end 248. As shown, cyclone chamber 152 may have a central longitudinal axis 252 (which is an axis of rotation of the cyclone chamber 152) that extends between, and intersects, the front and rear ends 236 and 240. Dirt collection chamber may extend longitudinal from a front end 256 to a rear end 260, and vertically from a lower end 264 to an upper end 268. As shown, dirt collection chamber may have a longitudinal axis 272 that extends between and intersects the front and rear ends 256 and 260, and which may be parallel to the cyclone axis of rotation and, as exemplified, may be displaced therefrom in a direction perpendicular to the axis 252.

Cyclone chamber 152 may include a front end wall 276 at front end 236, a rear end wall 280 at rear end 240, and a sidewall 284 that defines lower and upper ends 244 and 248. As shown, cyclone chamber sidewall 284 may extend longitudinally between front end 236 and rear end 240. Dirt collection chamber 156 may include a front end wall 288 at front end 256, a rear end wall 292 at rear end 260, and a sidewall 296 that defines lower and upper ends 264 and 268. As shown, dirt collection chamber sidewall 284 may extend longitudinally between front end 256 and rear end 260. Cyclone chamber 152 may include a dirt outlet 190 that is formed as an opening in cyclone chamber sidewall 284, and may be in an upper portion of cyclone chamber sidewall 284.

Pre-motor filter housing 164 may extend longitudinally from a front end 304 to a rear end 308, and vertically from a lower end 312 to an upper end 316. As shown, pre-motor filter housing 164 may have a central longitudinal axis 320 that extends between the front and rear ends 304 and 308. Pre-motor filter housing 164 may include a front end wall 324 at front end 308, a rear end wall 328 at rear end 308, and a sidewall 332 that defines the lower and upper ends 312 and 316. As shown, pre-motor filter housing sidewall 332 may extend longitudinally between front end 304 and rear end 308. Pre-motor filter housing 304 may include an air inlet 336 at front end 304 and an air outlet 340 at rear end 308.

Pre-motor filter housing sidewall 332 may include an inside surface 342 that surrounds and faces pre-motor filter 160. Pre-motor filter 160 may extend longitudinally from a front end 344 to a rear end 348, and vertically from a lower end 352 to an upper end 356. Pre-motor filter 160 may have a longitudinal axis 360 that extends between the front and rear ends 344 and 348.

Pre-motor filter 160 may have an annular shape including a central cavity 364, which is an interior air flow passage for filtered air. As shown, pre-motor filter 160 may include an upstream side 204 (also referred to as the 'upstream surface') that faces outwardly away from longitudinal axis 360, and a downstream side 208 (also referred to as the 'downstream surface') that faces inwardly towards longitudinal axis 360. Pre-motor filter central cavity 364 may be bounded by downstream side 208. Longitudinal axis 360 may extend centrally through filter cavity 364. It will be appreciated that a porous support member may be provided in cavity 364.

As exemplified in FIG. 3, the pre-motor filter housing may be positioned rearward of the cyclone. Therefore, front end 304 of the pre-motor filter housing may be the rear end 240 of the cyclone chamber and, in particular, they may share a common wall (e.g., the wall 324 at the front end 344 of the pre-motor filter housing may abut the wall at the rear end 240 of the cyclone chamber).

Motor housing 148 may extend longitudinally from a front end 376 to a rear end 380, and vertically from a lower end 384 to an upper end 388. As shown, motor housing 148 may have a sidewall 392 that defines the lower and upper ends 384 and 388, and that extends between the front and rear ends 376 and 380. In the illustrated example, clean air outlet 120 is provided by apertures 396 formed in motor housing sidewall 392. Suction motor 144 may be positioned within motor housing 148. As shown, suction motor 144 may include an axis of rotation 404.

As exemplified in FIG. 3, the motor housing may be positioned rearward of the pre-motor filter housing. Therefore, the front end of the motor housing may be the rear end of the pre-motor filter housing and, in particular, they may share a common wall (e.g., the wall at the front end of the motor housing may abut the wall at the rear end of the pre-motor filter housing).

Handle 104 may extend longitudinally from a front end 408 to a rear end 412, and vertically from a lower end 416 to an upper end 420. As shown, handle 104 may include a longitudinal axis 424 that extends between the front and rear ends 408 and 412. Handle 104 may include a hand grip portion 428, which may include a portion or all of an exterior surface 432 of handle 104. In some embodiments, handle 104 may define a battery compartment 180 that houses at least one battery 176. Accordingly, hand grip portion 428 may surround at least a portion (or all) of battery 176.

As exemplified in FIG. 3, the handle 104 may be positioned rearward of the motor housing and may abut the motor housing.

Pre-motor filter housing 164 may have an upstream portion 440 (also referred to as an "upstream header" or an "upstream volume") and a downstream portion 444 (also referred to as a "downstream header" or a "downstream volume") which are separated by pre-motor filter 160. As exemplified in FIG. 3, the upstream portion may comprise an area 204A that is radially outward of and faces the longitudinally extending upstream side 357. In addition, the upstream portion may also comprise an area 440B between front end wall 324 and the front side 204B of the pre-motor filter (which extends, e.g., perpendicular to the filter axis). Pre-motor filter upstream side 204 may border housing upstream portion 440, and pre-motor filter downstream side 208 may border housing downstream portion 444. As shown, at least a portion (or all) of filter upstream side 204A may be spaced apart from housing sidewall inner surface 342 to define at least a portion (or all) of housing upstream header 440. Air flow must pass through pre-motor filter 160 to move from housing air inlet 336 to housing air outlet 340, whereby the pre-motor filter 160 may remove fine particulates remaining in the air flow that has exited the air treatment member 116.

Within upstream header 440, the air flow distributes over pre-motor filter upstream side 204 before passing through pre-motor filter 160. Downstream header 444 may include an outlet passage 448, which guides the air flow to exit the pre-motor filter housing 164 through housing air outlet 340 toward suction motor 144. In some embodiments, outlet passage 448 may include a filter support 452 that holds pre-motor filter 160 in position by contact with pre-motor filter downstream side 208.

Pre-motor filter housing 164 may be larger in cross-sectional area (e.g. taken at a cross-sectional plane perpendicular to housing longitudinal axis 320) than the cross-sectional area (e.g. taken at a cross-sectional plane perpendicular to cyclone chamber axis 252) of cyclone chamber 152. This may permit pre-motor filter housing 164 to accommodate a relatively larger pre-motor filter 160. In the illustrated example, pre-motor filter 160 has larger cross-sectional dimension (e.g. height taken in a cross-sectional plane perpendicular to filter axis 360) than cyclone chamber 152. A larger pre-motor filter 160 may provide a filter upstream side 204 with greater surface area, which in turn may reduce backpressure caused by pre-motor filter 160 at equal particle separation efficiency, all else being equal. With lower backpressure, apparatus 100 may use a smaller motor 144 that consumes less power, thus allows for a smaller battery 176, resulting in a lighter, less expensive, and more compact overall construction.

In some embodiments, at least a portion of filter housing sidewall 332 may be co-planar with air treatment member 116. For example, one or both of filter housing lower and upper ends 312 and 316 may be coplanar with one or both of air treatment member lower and upper ends 224 and 228, respectively. In the illustrated example, both of filter housing lower and upper ends 312 and 316 are coplanar with air treatment member lower and upper ends 224 and 228, respectively. Thus, air treatment member 116 and pre-motor filter housing 164 may have the same vertical height, which may contribute to a compact overall form factor for apparatus 100.

In the example shown, vertical height 456 of air treatment member 116 is a summation of cyclone chamber vertical height 460 and dirt collection chamber vertical height 464. Cyclone chamber 152 may extend from air treatment member lower end 224. As shown, pre-motor filter housing upper end 316 may be spaced above cyclone chamber upper end 248 and filter housing axis 320 may be spaced above cyclone chamber axis 252. In the illustrated example, pre-motor filter upper end 356 is also spaced above cyclone chamber upper end 248, and pre-motor filter axis 360 is spaced above cyclone chamber axis 252. Accordingly, positioning the dirt collection chamber above the cyclone chamber and reward of the inlet passage permits a larger pre-motor filter housing without increasing the diameter of the hand vacuum cleaner.

It will be appreciated that a larger pre-motor filter and/or pre-motor filter header may be obtained even if the height of the pre-motor filter housing is less than the height of the cyclone chamber and the dirt collection chamber.

Figure 4:
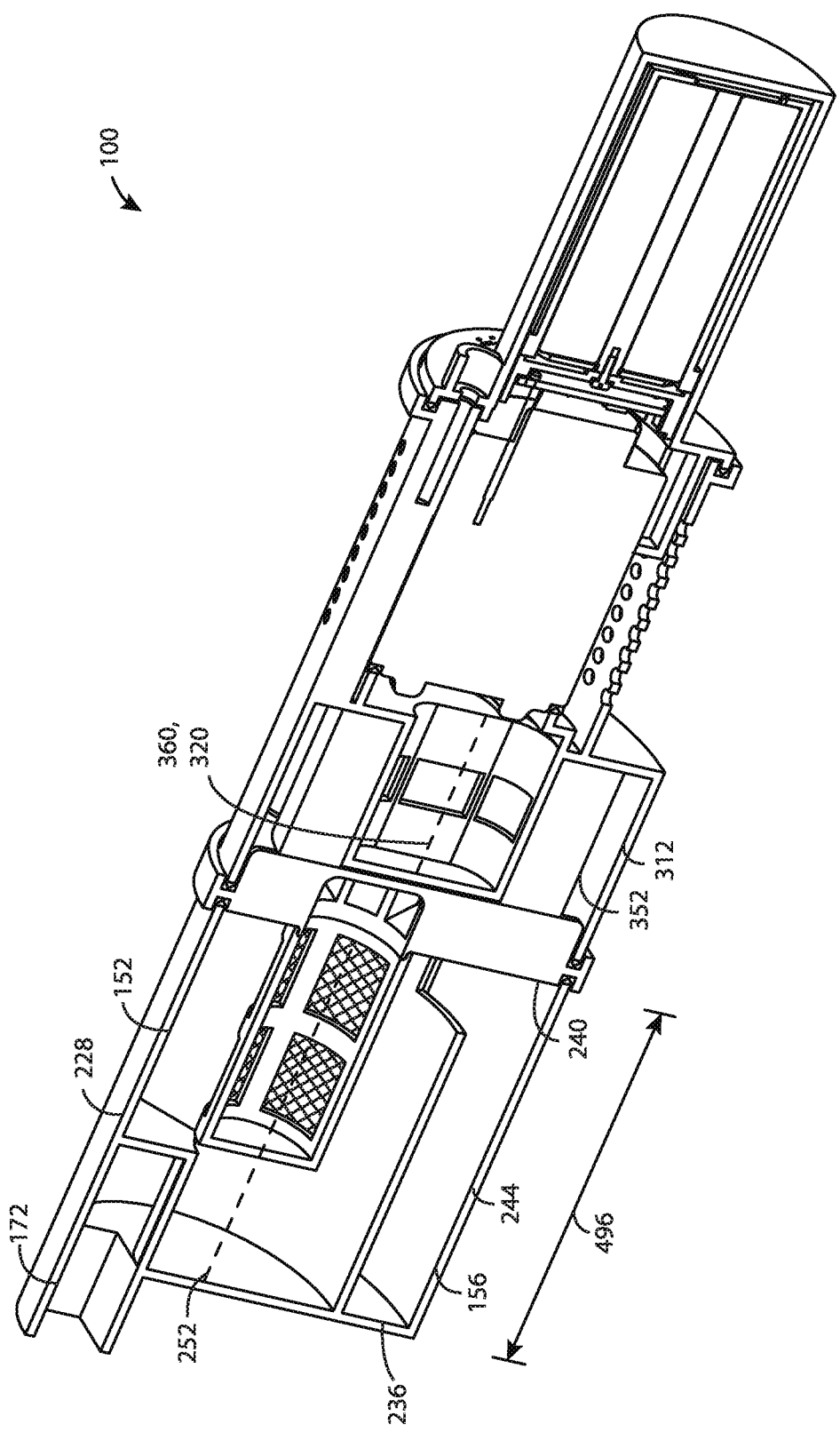
FIG. 4 is a cross-sectional view taken along line 2-2 in FIG. 1, in accordance with another embodiment.

FIG. 4 shows an alternative embodiment in which the dirt collection chamber is positioned below the cyclone chamber 152. As exemplified, the cyclone chamber 152 extends from air treatment member upper end 228. In this example, pre-motor filter housing lower end 312 may be spaced below cyclone chamber lower end 244 and housing axis 320 may be spaced below cyclone chamber axis 252. As shown, pre-motor filter lower end 352 may be spaced below cyclone chamber lower end 244, and pre-motor filter axis 360 may be spaced below cyclone chamber axis 252.

Figure 5A:
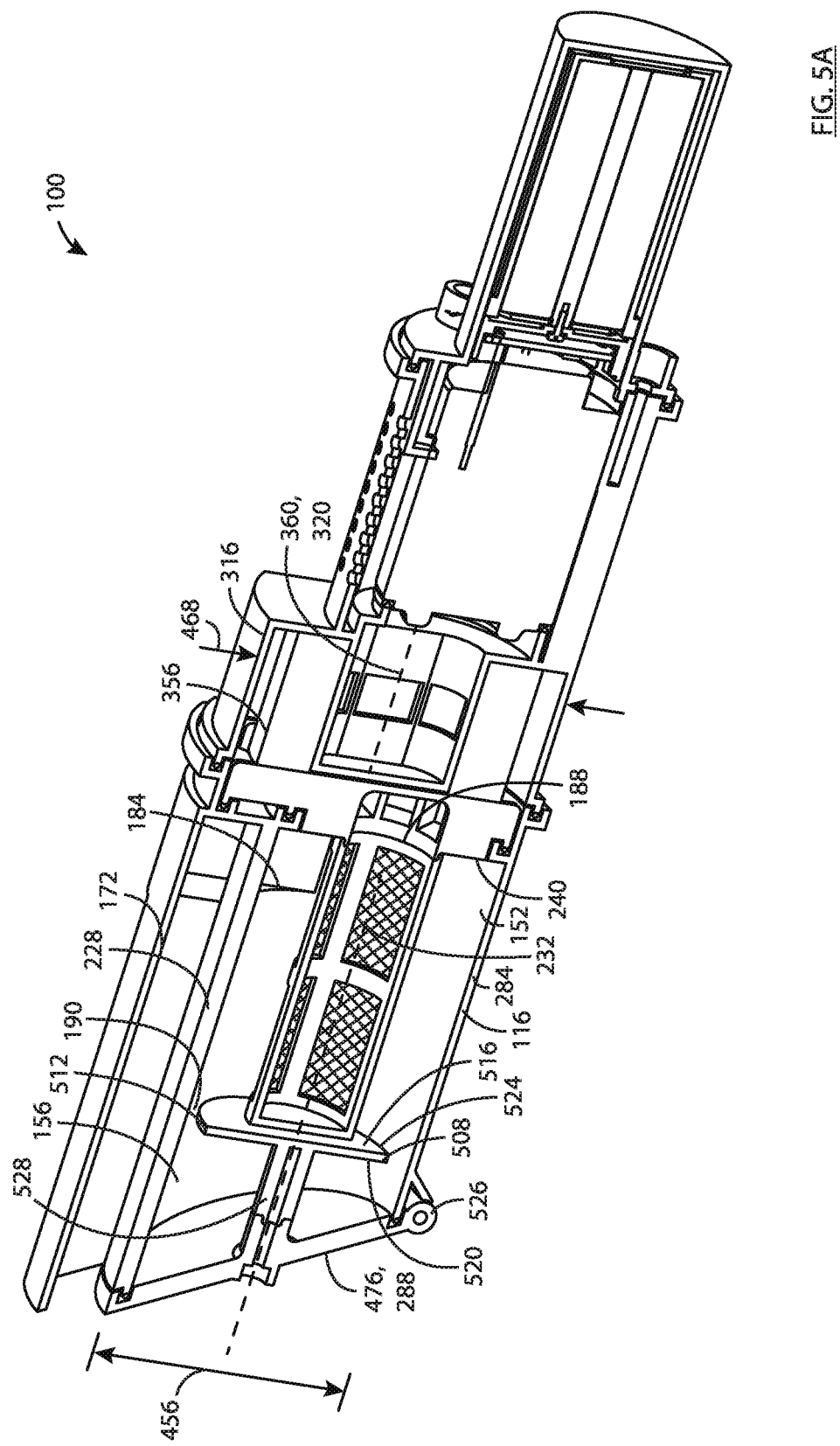
FIG. 5A is a cross-sectional view of a surface cleaning apparatus with a door in a closed position, in accordance with another embodiment.

FIGS. 5A-5B exemplifies another alternative embodiment in which the dirt collection chamber 156 is positioned in front of the air separation member (e.g., the cyclone chamber 152). In this example, the air inlet extends to a rear end of the cyclone chamber so that the cyclone air inlet and the cyclone air outlet are at the same (rear) end of the cyclone chamber.

As exemplified, dirt collection chamber 156 may be separated from cyclone chamber 152 by an plate 508. Plate 508 may have any design suitable to divide dirt collection chamber 156 from cyclone chamber 152 while permitting disentrained dirt to exit cyclone chamber 152 and collect in dirt collection chamber 156. In the illustrated example, plate 508 includes a flat plate 512 having a cyclone chamber side 516, which faces into cyclone chamber 152, opposite a dirt collection chamber side 520, which faces into dirt collection chamber 156. As shown, cyclone chamber dirt outlet 190 may be formed by an annular gap between arrester plate periphery 524 and cyclone chamber sidewall 284.

In the illustrated example, air treatment member 116 includes an openable wall 476. As shown, wall 476 may define dirt collection chamber front end wall 288. In use, openable wall 476 may be moved (e.g. pivoted by a hinge 526 as shown, or removed) between a closed position (FIG. 5A) and an open position (FIG. 5B). This opens dirt collection chamber 156 so that it can be emptied of collected dirt and debris.

In the example shown, plate 508 is connected to openable wall 476, whereby plate 508 moves to open cyclone chamber 152 when openable wall 476 is moved to the open position (FIG. 5B). This may provide access to clean and empty cyclone chamber 152 of dirt and debris. As shown, a support member 528 (e.g. a post) may connect arrester plate 508 to openable wall 476 and maintain longitudinal separation between arrester plate 508 and openable wall 476.

As amplified, cyclone chamber air inlet 184 may be positioned at cyclone chamber rear end 240. For example, both cyclone chamber air inlet and outlet 184 and 188 may be positioned at cyclone chamber rear end 240. This may define an airflow path through cyclone chamber 152 that reverses direction sharply at plate 508, which may provide enhanced dirt particle separation efficiency. As shown, dirty air inlet conduit 172 may overlap the entire length 496 of air treatment member 116. In the illustrated example, dirty air inlet conduit 172 overlies the entire longitudinal length of cyclone chamber 152 so as to guide the air flow to enter cyclone chamber 152 through cyclone chamber air inlet 184 located at cyclone chamber rear end 240.

As exemplified, air treatment member 116 has a height 456 less than pre-motor filter chamber height 468. As shown, pre-motor filter housing upper end 316 may be spaced above air treatment member upper end 228 and filter housing axis 320 may be spaced above air treatment member axis 232. In the illustrated example, pre-motor filter upper end 356 is also spaced above air treatment member upper end 228, and pre-motor filter axis 360 is spaced above air treatment member axis 232. Therefore, as exemplified, the height of the pre-motor filter housing may be increased, without increasing the height of the hand vacuum cleaner by using some or all of the height of the dirty air inlet conduit 172.

Referring to FIG. 2, pre-motor filter 160 may be laterally centered (e.g. in one or more (or all) directions normal to filter housing axis 320) within pre-motor filter housing 164. This may permit the filter housing upstream portion 440A to be more evenly distributed around pre-motor filter upstream side 204, whereby the air entering pre-motor filter housing 164 may more evenly distribute around the filter upstream side 204A. This may result in less backpressure, all else being equal. In the illustrated example, pre-motor filter 160 is equally spaced from filter housing inner surface 342 at filter housing lower and upper ends 312 and 316. As shown, pre-motor filter lower end 352 may be coplanar with filter housing inner surface 342 at housing lower end 312, and pre-motor filter upper end 356 may be coplanar with filter housing inner surface 342 at housing upper end 316. Filter housing axis 320 may be parallel to pre-motor filter axis 360. In the illustrated example, axes 320 and 360 are collinear.

Still referring to FIG. 2, motor housing 148 is sized to accommodate suction motor 144. In some embodiments, motor housing 148 may have a cross-sectional size (e.g. measured in a plane perpendicular to motor axis 404) that is different from that of pre-motor filter housing 164. For example, motor housing 148 may have one or more cross-sectional dimensions that are smaller or larger than those of pre-motor filter housing 164. In the illustrated embodiment, motor housing height 472 is shorter than pre-motor filter housing height 468. Thus, pre-motor filter housing 164 is relatively large as compared with motor housing 148, which as described above allows pre-motor filter housing 164 to accommodate a relatively larger pre-motor filter 160.

Motor housing lower end 384 may be aligned with filter housing lower end 312. For example, motor housing lower end 384 may be coplanar with filter housing lower end 312 as shown. This may provide apparatus 100 with a more uniform profile for apparatus lower end 140, which may be easier for users to handle and store and may contribute to a compact form factor for apparatus 100. As shown, motor housing upper end 388 may be vertically spaced from filter housing upper end 316, and pre-motor filter axis 360 may be vertically spaced from suction motor axis 404. In the illustrated example, motor housing upper end 388 is shown vertically spaced below filter housing upper end 316, and suction motor axis 404 is shown vertically spaced below pre-motor filter axis 360.

Annular Pre-Motor Filter in an Air Treatment Member Air Outlet Conduit

In accordance with this aspect, an annular filter which is in an air treatment member air outlet conduit is provided. The features in this section may be used by themselves in any surface cleaning apparatus or in any combination or sub-combination with any other feature or features described herein. For example, any of the air treatment member features described herein may be used with any of the features of a dirt collection chamber, parallel arrangement of components, openable main body, and other features described herein.

Figure 6A:
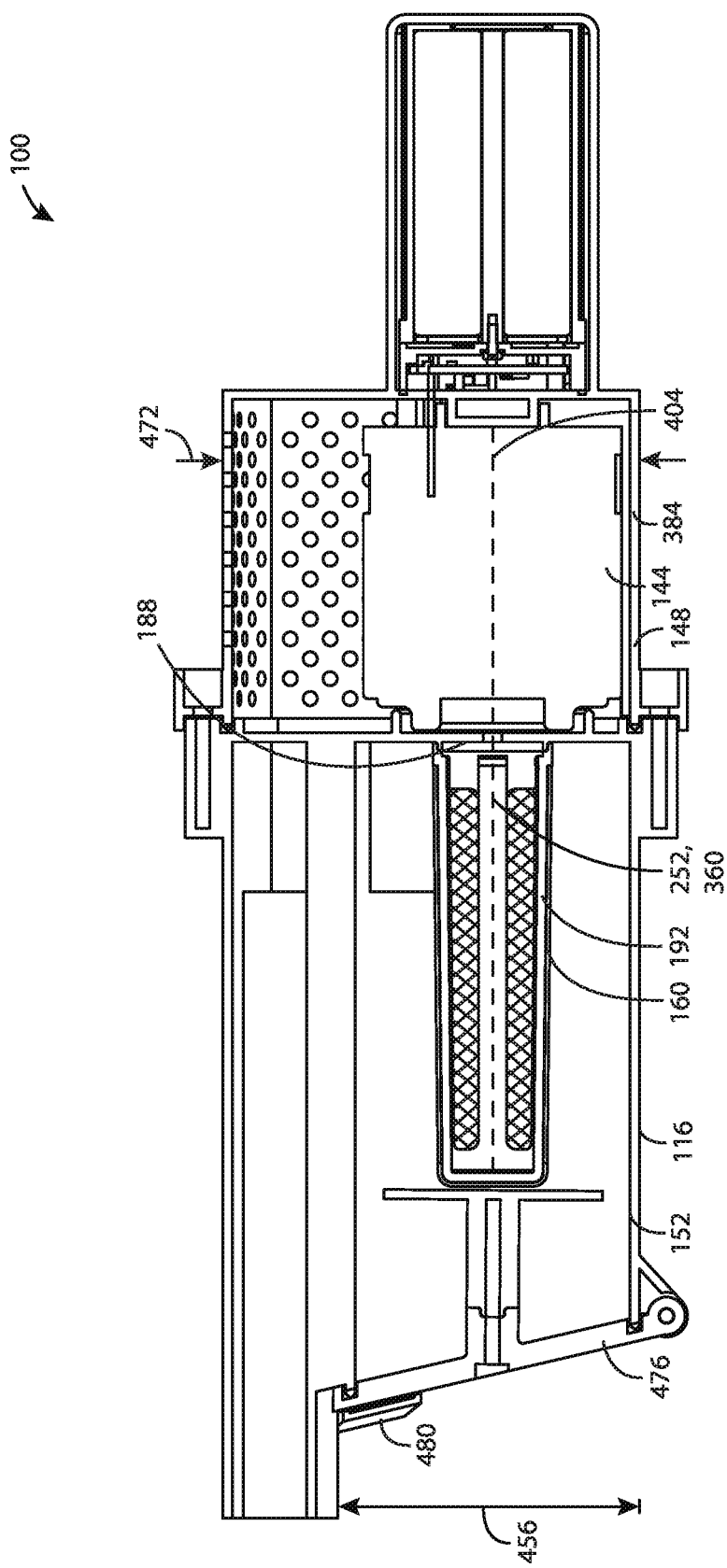
FIG. 6A is a cross-sectional view of a surface cleaning apparatus with a door in a closed position, in accordance with an embodiment.

Reference is now made to FIGS. 6A-6B, which show surface cleaning apparatus 100 in accordance with another embodiment. As shown, pre-motor filter 160 may be positioned within air treatment member 116. This may provide a more compact configuration for surface cleaning apparatus 100 as compared with an embodiment that holds pre-motor filter 160 within a separate pre-motor filter housing. In the illustrated example, pre-motor filter 160 is positioned within cyclone chamber 152, upstream of cyclone chamber air outlet 188 and exterior to a screen which defines the entrance to the vortex finder. For example, pre-motor filter 160 may cover at least a portion (or all) of cyclone chamber outlet passage 192. In the illustrated example, pre-motor filter 160 is shown formed as a sheath that overlies cyclone chamber outlet passage 192, whereby air entering outlet passage 192 must first pass through pre-motor filter 160. In this example, cyclone chamber air outlet 188 may guide the air flow directly towards suction motor 144. It will be appreciated that the pre-motor filter may be positioned internal of the screen.

As shown in FIG. 6B, air treatment member 116 may include an openable wall 476 (also referred to herein as a 'door') which is movable (e.g. pivotally as shown, or removable) to provide access to pre-motor filter 160 for cleaning, removal, and/or replacement. Door 476 may be movable from a closed position (FIG. 6A) to an open position (FIG. 6B), and releasably secured in the closed position by a locking member 480. In the illustrated example, locking member 480 is a releasable latch.

Referring to FIG. 6A, suction motor housing 148 may have a height 472 greater than air treatment member height 456. As shown, suction motor 144 may be asymmetrically positioned within motor housing 148. In the illustrated example, suction motor 144 is positioned towards motor housing lower end 384, and has a motor axis 404 that is collinear with cyclone chamber axis 252 and pre-motor filter axis 360. This may provide greater linearity to the air flow path through apparatus 100, and thereby reduce backpressure. In turn, a smaller, lighter, less expensive, and less powerful suction motor 144 may be used, which may contribute to a more compact and lighter construction of apparatus 100.

Dirt Collection Chamber Above an Air Treatment Chamber

In accordance with this aspect, a dirt collection chamber may be provided above an air treatment chamber, and optionally rearward of an inlet conduit. In some embodiments, the dirt collection chamber may be positioned above a cyclone chamber when the hand vacuum cleaner is oriented with the upper end above the lower end. For example, the dirt collection chamber may be aligned rearward of an inlet passage, and the inlet passage and dirt collection chamber may overlie at least a portion, or all, of the cyclone chamber. The upper end positioning of the inlet passage may make for easy user operation of the hand vacuum, and the rearward alignment of the dirt collection chamber over the cyclone chamber may provide a compact configuration overall. The features in this section may be used by themselves in any surface cleaning apparatus or in any combination or sub-combination with any other feature or features described herein. For example, any of the dirt collection chamber features described herein may be used with any of the features of a pre-motor filter, parallel arrangement of components, openable main body, and other features described herein.

As exemplified in FIG. 3, dirty air inlet conduit 172 may be positioned at apparatus upper end 136. This may provide a familiar and comfortable arrangement for users when manipulating hand vacuum 100 to point dirty air inlet 108 at surfaces to be cleaned. For example, the elevated position may permit hand vacuum 100 to be operated at a steeper pitch angle, which may reduce the torque exerted upon users' hands and wrists, all else being equal.

As shown, cyclone chamber 152 may be substantially cylindrical. For example, cyclone chamber sidewall 284 may have a round cross-sectional shape (on a cross-sectional plane perpendicular to cyclone chamber axis 252) along its longitudinal length. In the illustrated example, cyclone chamber sidewall 284 has a substantially oval cross-sectional shape. In other embodiments, cyclone chamber sidewall 284 may have a circular cross-sectional shape. Cyclone chamber sidewall 284 may have a substantially constant cross-sectional size (e.g. width and height) along its longitudinal length as shown, or may flare or taper in size between the cyclone chamber front and rear ends 236 and 240.

In some embodiments, at least a portion of dirty air inlet conduit 172 may longitudinally overlap with air treatment member 116, such as with cyclone chamber 152 as shown. As used herein, two elements are said to 'longitudinally overlap' if there is a cross-sectional plane, perpendicular to the longitudinal axis, which intersects both of those two elements. Dirty air inlet conduit 172 may be positioned external to cyclone chamber 152 so as not to disrupt the cyclonic air flow within cyclone chamber 152. As shown, dirty air inlet conduit 172 may protrude radially outwardly of cyclone chamber 152. Dirt collection chamber 156 may extend rearward from dirty air inlet conduit 172. This may promote a compact arrangement to the extent that dirt collection chamber 156 occupies space external to cyclone chamber 152 which does not increase the overall dimensions of hand vacuum 100. As shown, dirt collection chamber 156 may be positioned external to cyclone chamber 152 in the space available between air inlet conduit 172 and pre-motor filter housing 164 without increasing the overall height of hand vacuum 100. As shown, dirt collection chamber extends forward of cyclone chamber air outlet 188, and is positioned above and overlaps at least a portion of cyclone chamber 152. In the illustrated embodiment, dirt collection chamber upper end 268 is substantially coplanar with filter housing upper end 316 and dirty air inlet conduit 172. In other embodiments, dirt collection chamber upper end 268 may be spaced above or below one or both of filter housing upper end 316 and dirty air inlet conduit 172. It will be appreciated that, if a greater volume of the dirt collection chamber is required, then the dirt collection chamber may extend radially outwardly beyond the upper end of the dirty air inlet conduit 172.

Still referring to FIG. 3, dirty air inlet conduit 172 may include a central longitudinal axis 484 that extends through dirt collection chamber 156, and that overlies at least a portion of air treatment member axis 232. In the illustrated example, inlet conduit axis 484 also overlies cyclone chamber axis 252.

Dirt collection chamber front end 256 may be proximate (e.g. abut) inlet conduit rear end 488. In the illustrated example, a common wall 288 defines both dirt collection chamber front end 256 and inlet conduit rear end 488. Dirt collection chamber rear end 260 may be proximate (e.g. abut) filter housing front end 304. For example, dirt collection chamber rear end wall 292 may define a portion of filter housing front end wall 324.

Dirt collection chamber 156 may have any dimensions suitable to provide a reasonable storage volume for collected dirt and debris. In the illustrated example, dirt collection chamber 156 may have a longitudinal length 492 that is larger than cyclone chamber height 460. This may provide dirt collection chamber 156 with a storage capacity for dirt that allows surface cleaning apparatus 100 to be used for a prolonged period before dirt collection chamber 156 needs to be emptied. As shown, dirt collection chamber longitudinal length 492 may be less than air treatment member length 496 (e.g. less than cyclone chamber length 504). This may provide longitudinal space for dirty air inlet conduit 172, and thereby promote a compact form factor for surface cleaning apparatus 100. In the illustrated embodiment, cyclone chamber dirt outlet 190 is positioned at cyclone chamber rear end 240, and formed as an opening in cyclone chamber sidewall 284.

It will be appreciated that the dirty air inlet conduit 172 may be positioned elsewhere so as to allow an increased length of the dirt collection chamber. For example, the dirty air inlet conduit 172 may be positioned axially forwardly of the cyclone chamber and may be part of the front end wall of the cyclone chamber. In some embodiments, at least a portion of dirty air inlet conduit 172 may be positioned internal to air treatment member 116. For example, at least a portion of dirty air inlet conduit 172 may extend into cyclone chamber 152. This may permit dirt collection chamber 156 to have a greater storage capacity by extending further forwards, as shown. As exemplified in FIG. 7, dirt collection chamber 156 may extend to cyclone chamber front end 236. As shown, dirt collection chamber 156 may extend the full length 496 of cyclone chamber 152 from cyclone chamber front end 236 to cyclone chamber rear end 240.

In the illustrated embodiment, dirty air inlet conduit 172 is positioned at an elevation between cyclone chamber lower and upper ends 264 and 268. As shown, dirt air inlet axis 484 may be collinear with cyclone chamber axis 252. In other embodiments, dirty air inlet axis 484 may be parallel but not collinear with cyclone chamber axis 252.

Parallel Arrangement of Components

In accordance with this aspect, a plurality of the components of the hand vacuum cleaner are arranged sequentially, e.g., along the axis of the air treatment member. In some embodiments, the hand vacuum cleaner may be configured as a slender, elongated wand. In this configuration, the hand vacuum cleaner may be referred to as a 'wand vacuum' or simply a 'wandvac'. This may provide a conveniently compact form factor that is easy for users to handle, and store away. The components of the wandvac may be arranged along a longitudinal axis and oriented parallel to the longitudinal axis. This may provide the wandvac with a slender wand-like overall shape, and an efficient air flow path with few or no conduits having or providing direction reversals and sharp turns. The efficiency of the air flow path may reduce backpressure, and therefore allow the wandvac to use a smaller, lighter suction motor, and a smaller, lighter battery, all else being equal. The features in this section may be used by themselves in any surface cleaning apparatus or in any combination or sub-combination with any other feature or features described herein. For example, any of the dirt collection chamber features described herein may be used with any of the feature of a pre-motor filter, dirt collection chamber, openable main body, and other features described herein.

As exemplified in FIG. 2, air treatment member 116, pre-motor filter 160, suction motor 144, and handle 104 may be longitudinally arranged (e.g., a longitudinal axis may extend through each element, although it need not be centrally located in each element). As shown, handle 104 may be positioned rearward of suction motor 144, which may be positioned rearward of pre-motor filter 160, which may be positioned rearward of air treatment member 116. In other embodiments, two more of these components may longitudinally overlap.

Two or more, three or more, four or more or all of air treatment member axis 232, cyclone chamber axis 252, pre-motor filter axis 360, suction motor axis 404, and handle axis 424 may be parallel. As used herein, two axes are said to be 'parallel' if they are co-linear or everywhere spaced apart by a constant or generally constant distance. In the example shown, all of these axes 232, 252, 360, 404, and 424 are parallel. As shown, these axes 232, 252, 360, 404, and 424 may also be generally horizontal when apparatus 100 is oriented horizontally with apparatus upper end 136 above apparatus lower end 140 as depicted. In some embodiments, hand grip portion 428 may also be parallel to one or more (or all) of axes 232, 252, 360, 404, and 424. Further, battery compartment 180 and the battery 176 inside may extend parallel to one or more (or all) of axes 232, 252, 360, 404, and 424. As shown, inlet conduit axis 484 may extend parallel to one or more (or all) of axes 232, 252, 360, 404, and 424.

One or more, two or more, three or more, four or more or all of axes 232, 252, 360, 404, and 424 may be collinear. In the illustrated example, cyclone chamber axis 252 is collinear with suction motor axis 404. This may enhance the linearity of air flow path 124, which may reduce backpressure, and allow wandvac 100 to use a smaller, lighter, less powerful suction motor 144, all else being equal, for better portability. As exemplified, suction motor axis 404 may be collinearly aligned with handle 104, hand grip portion 428, battery compartment 180, and battery 176.

As shown, inlet conduit axis 484 and pre-motor filter axis 360 may be spaced vertically from cyclone chamber axis 252. For example, each of inlet conduit axis 484 and pre-motor filter axis 360 may be spaced above or below cyclone chamber axis 252. FIG. 7 shows an alternative embodiment in which inlet conduit axis 484 is collinear with cyclone chamber axis 252.

Openable Main Body

In accordance with this aspect, a the hand vacuum cleaner may have an openable main body. In some embodiments, the main body of the hand vacuum cleaner may be openable to provide access to the pre-motor filter (e.g. for cleaning, removal, or replacement), and/or the cyclone chamber (e.g. for cleaning). For example, the main body may be openable proximate a threshold of the pre-motor filter housing and the cyclone chamber. The features in this section may be used by themselves in any surface cleaning apparatus or in any combination or sub-combination with any other feature or features described herein. For example, any of the dirt collection chamber features described herein may be used with any of the features of a pre-motor filter, dirt collection chamber, parallel arrangement of components, and other features described herein.

Referring to FIG. 2, main body 112 may include a front portion 532 and a rear portion 536. Front portion 532 may include air treatment member 116, and rear portion 536 may include pre-motor filter housing 164. In the illustrated embodiment, front portion 532 includes air treatment member 116 and dirty air inlet conduit 172, and rear portion 536 includes pre-motor filter housing 164, motor housing 148, and handle 104. Turning to FIG. 8, front portion 532 may be movable (e.g., longitudinally along the cyclone axis) relative to rear portion 536 between a closed position (FIG. 1) and an open position (FIG. 8). The open position of main body 112 may provide user access to empty/clean air treatment member 116 and/or pre-motor filter 160.

Figure 9A:
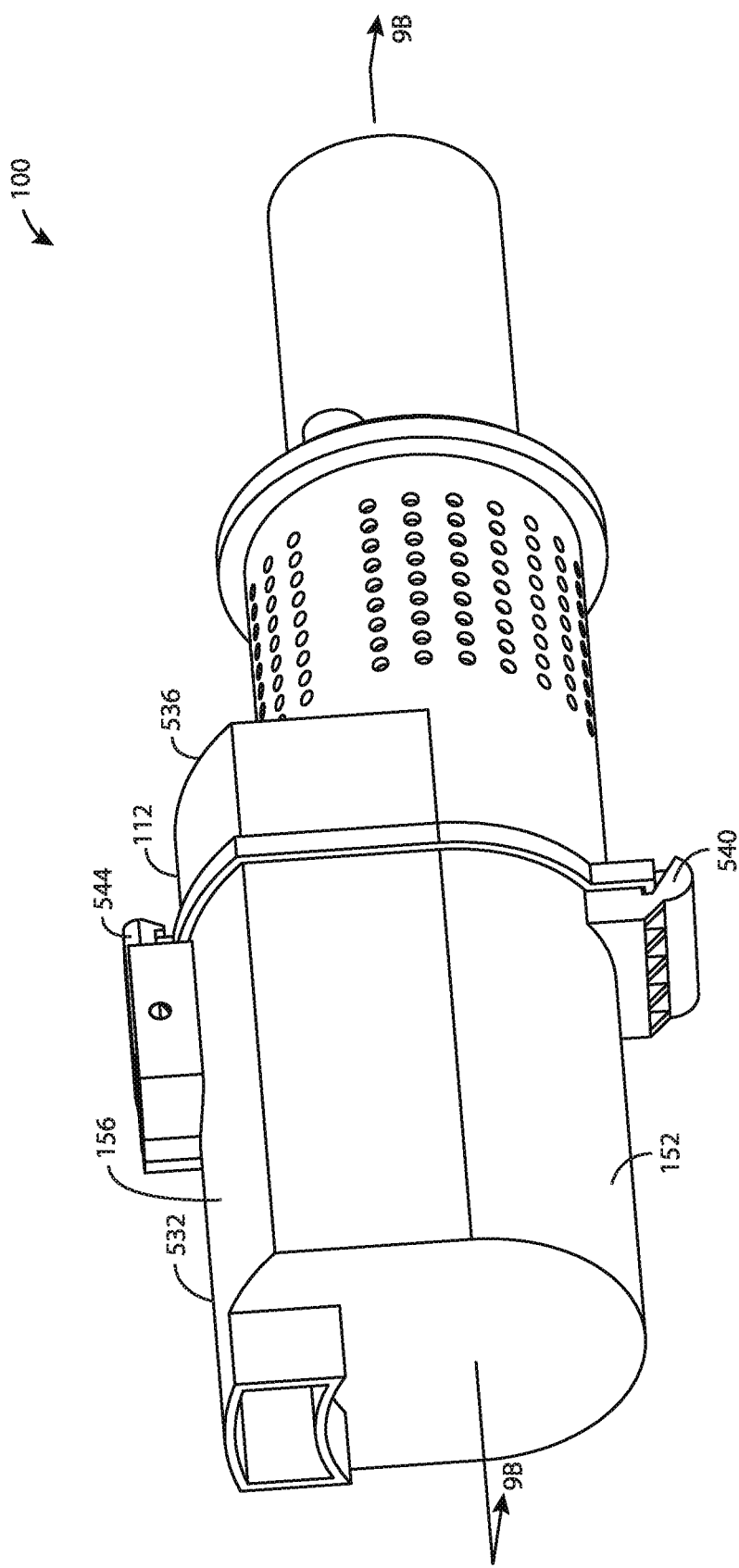
FIG. 9A is a perspective view of a surface cleaning apparatus in accordance with another embodiment.

Front portion 532 may be movable relative to rear portion 536 in any manner. FIG. 8 shows an example in which front portion 532 is removable in translation from rear portion 536. FIGS. 9A-9B show an example in which front portion 532 is pivotally movable relative to rear portion 536 by a hinge 540.

Figure 10B:
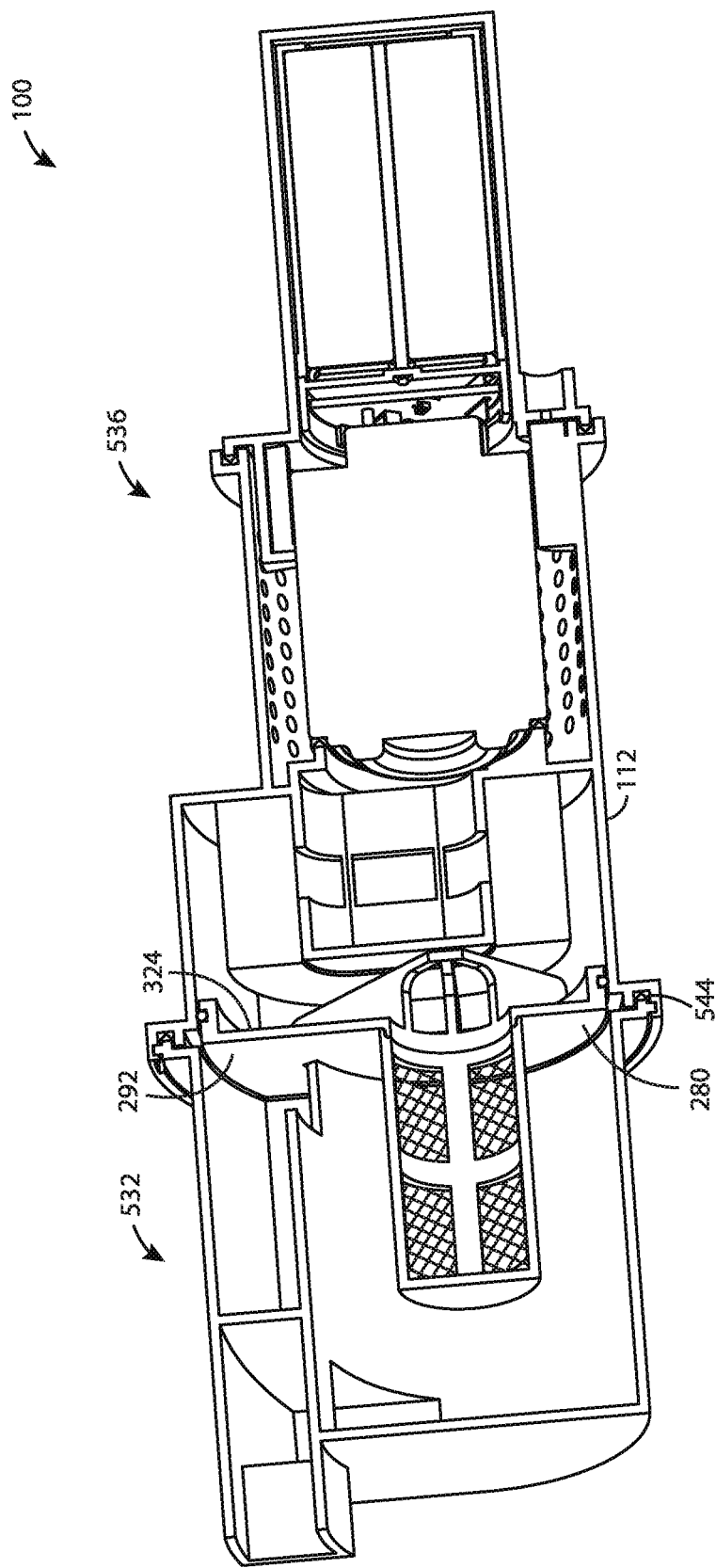
FIG. 10B is a perspective view of a cross-section taken along line 10B-10B in FIG. 10A.
Figure 10C:
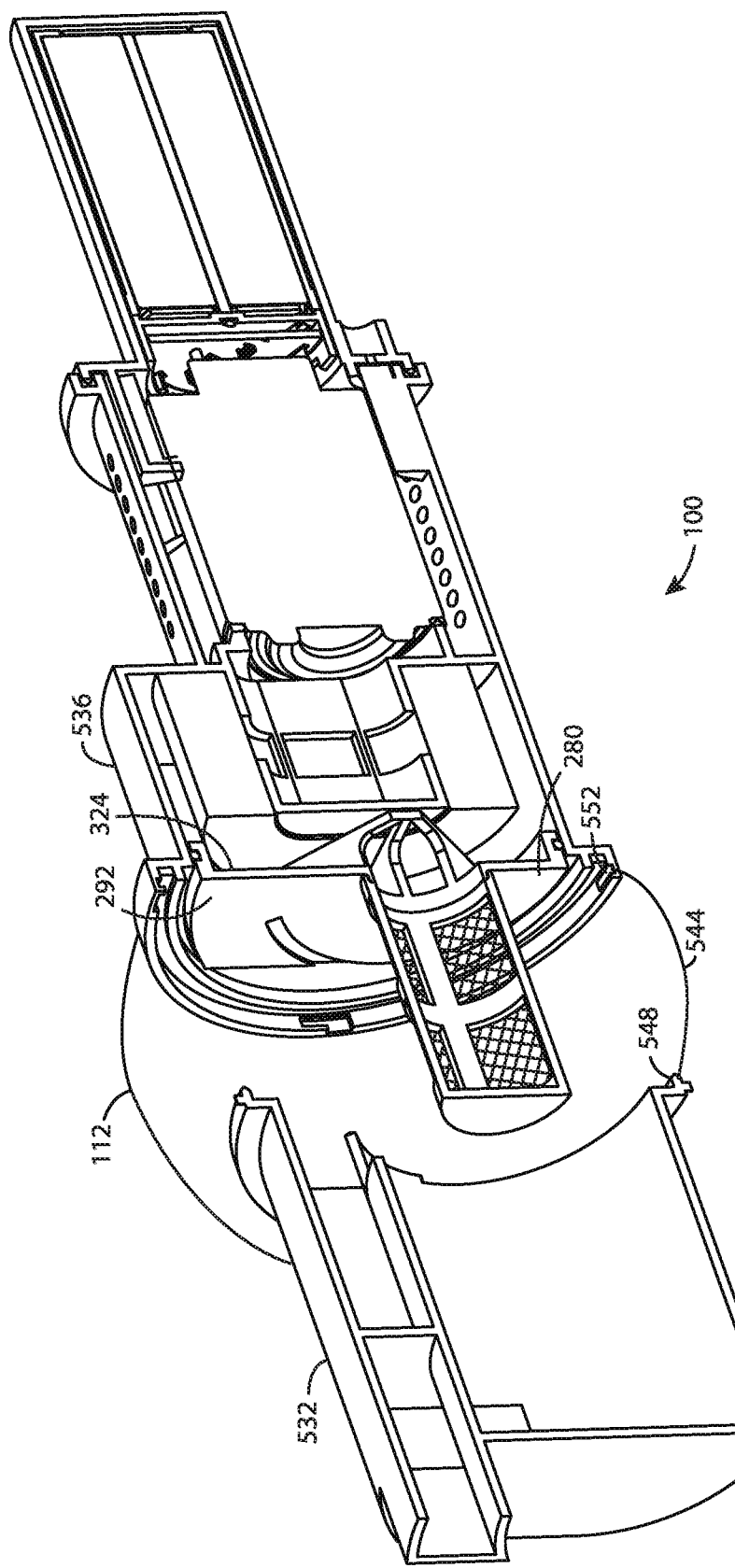
FIG. 10C is a perspective view of the cross-section of FIG. 10A with the main body in an open position.

Front portion 532 may be connected to rear portion 536 in any manner. FIG. 3 shows an example in which front and rear portion 532 and 536 are connected by a press-fit. FIGS. 9A-9B show an example in which front and rear portions 532 and 536 are connected by a hinge 540 and a locking member 544 (e.g. a latch as shown). FIGS. 10A-10C show an example in which front and rear portions 532 and 536 are connected by a locking member 544. In this example, locking member 544 is a bayonet lock including at least one male part 548 and female slot 552.

In some embodiments, cyclone chamber rear end wall 280 may be openably connected (e.g. removably or pivotally connected) to one of the front and rear main body portions 532 and 536. Similarly, filter chamber front end wall 324 may be openably connected (e.g. removably or pivotally connected) to one of the front and rear main body portions 532 and 536. Further, dirt collection chamber rear end wall 292 may be openably connected (e.g. removably or pivotally connected) to one of the front and rear main body portions 532 and 536.

Figure 11A:
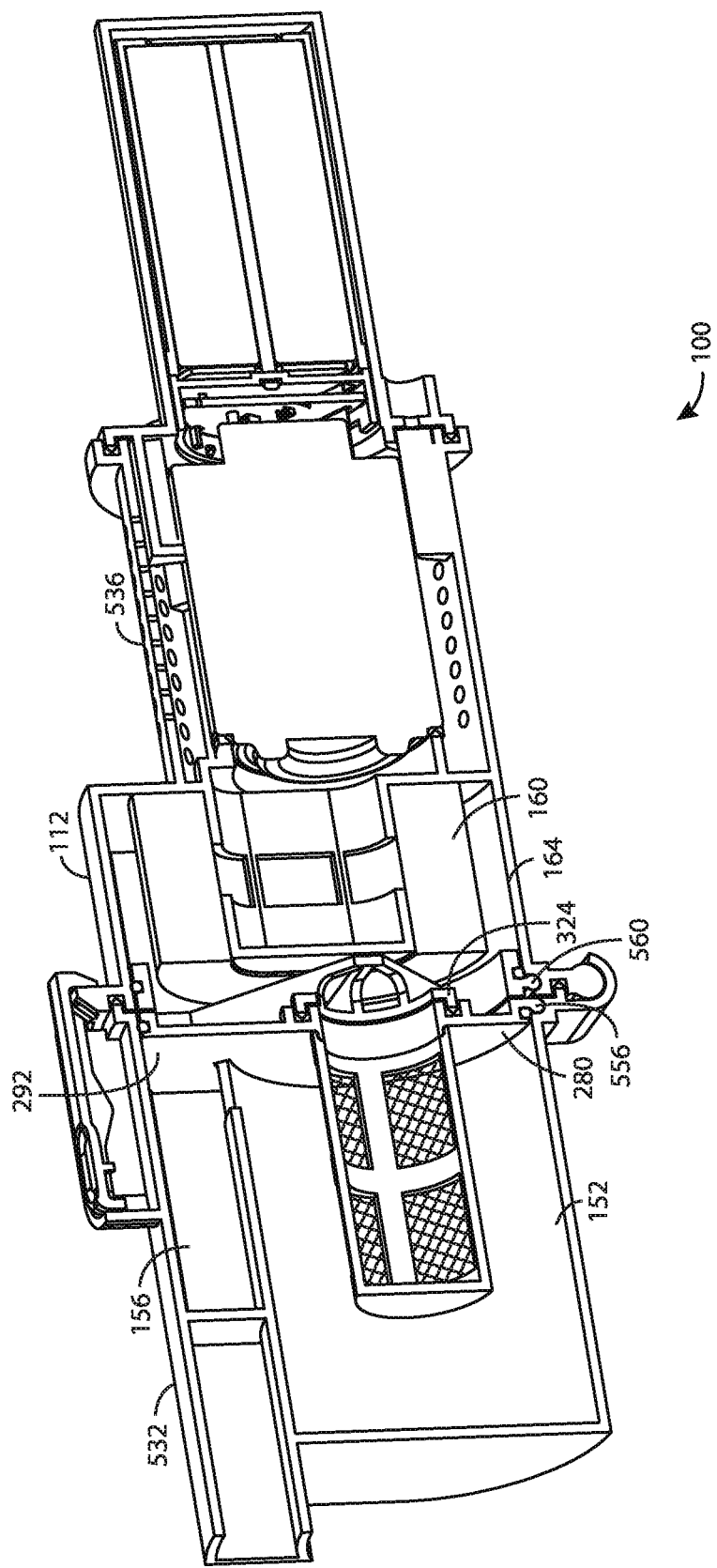
FIG. 11A is a cross-sectional view of a surface cleaning apparatus, in accordance with another embodiment.

FIGS. 11A-11B show an example in which, when main body 112 is moved from the closed position to the open position, cyclone chamber rear end wall 280 and dirt collection chamber rear end wall 292 remain openably connected to front portion 532, and filter chamber front end wall 324 remains openably connected to rear portion 536. This may help prevent dirt and debris from spilling out from cyclone chamber 152 and dirt collection chamber 156 and pre-motor filter 160 from falling out, upon opening main body 112. From the open position, end walls 280 and 292 may be opened (e.g. pivotally or removed) to empty/clean chambers 152 and 156, and remove/clean pre-motor filter 160. In the example shown, end walls 280 and 292 are pivotally connected to front portion 532 by a hinge 556, and end wall 324 is pivotally connected to rear portion 536 by a hinge 560.

Figure 9C:
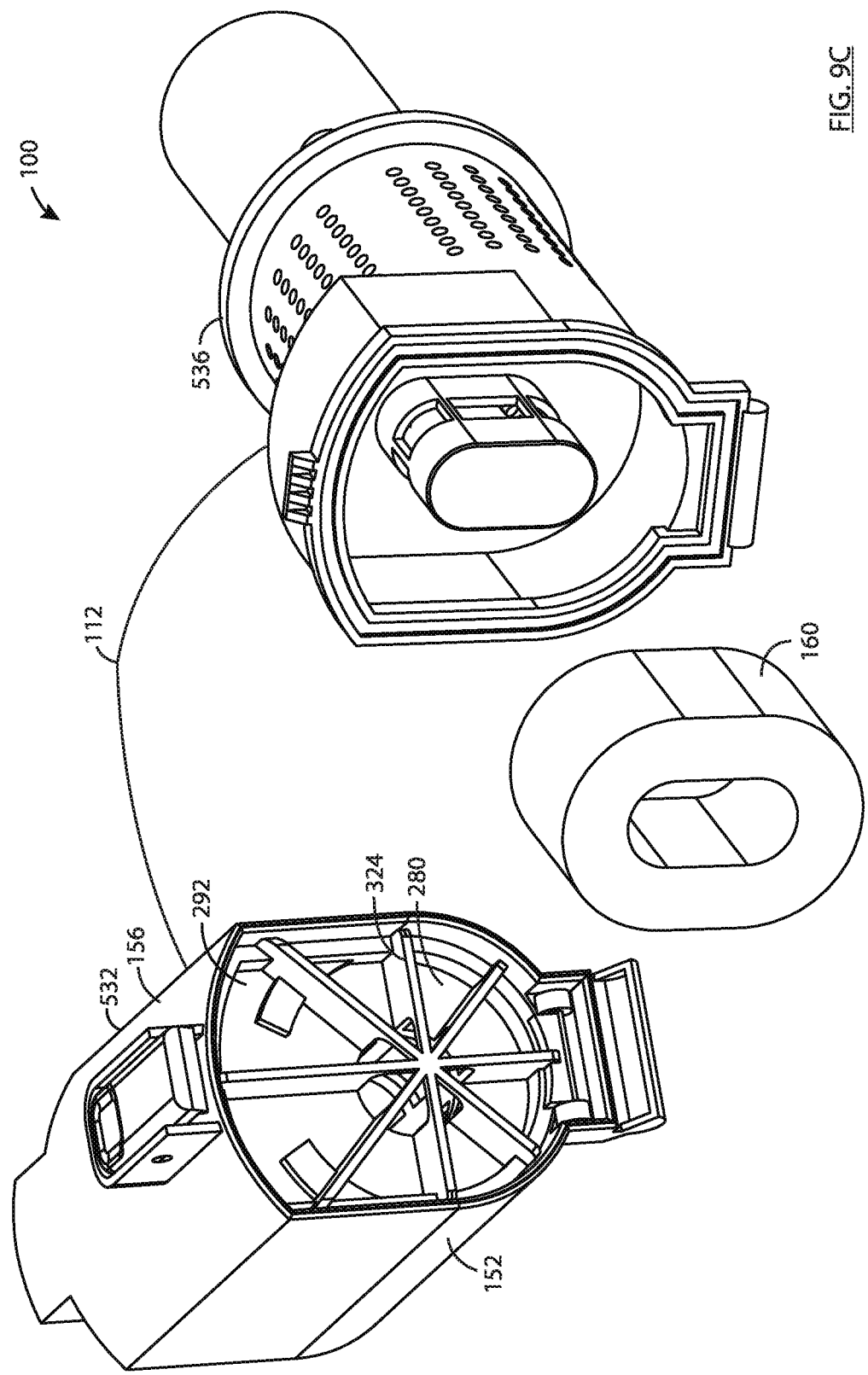
FIG. 9C is an exploded view of the surface cleaning apparatus of FIG. 9A.

FIGS. 9A-9C show an example in which, when main body 112 is moved from the closed position to the open position, cyclone chamber rear end wall 280, dirt collection chamber rear end wall 292, and filter chamber front end wall 324 all remain openably connected to front portion 532. This may provide immediate access to pre-motor filter 160 and help prevent dirt and debris from spilling out of cyclone chamber 152 and dirt collection chamber 156 upon moving main body 112 to the open position.

Figure 12A:
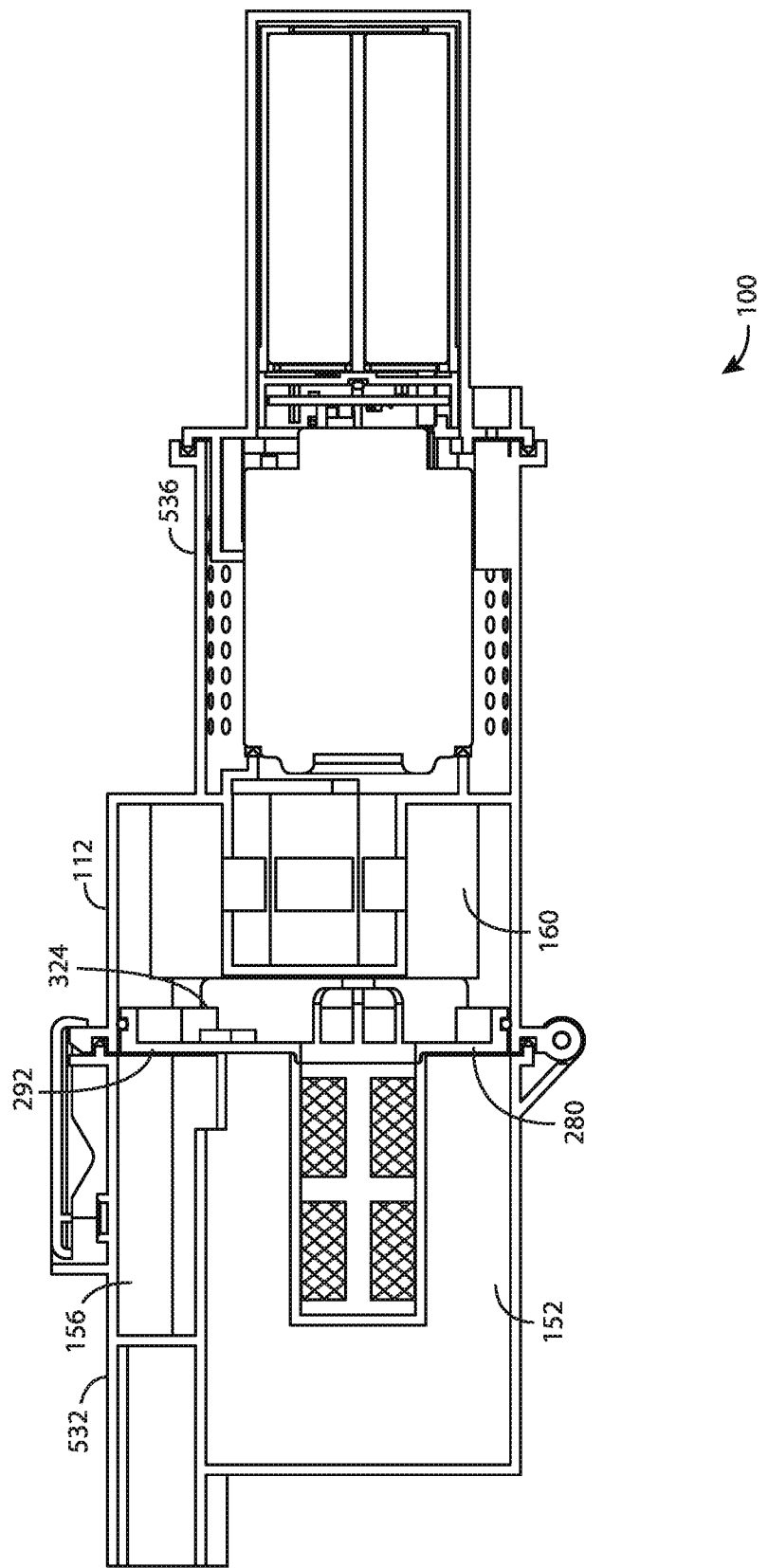
FIG. 12A is a cross-sectional view of a surface cleaning apparatus in accordance with another embodiment.
Figure 12B:
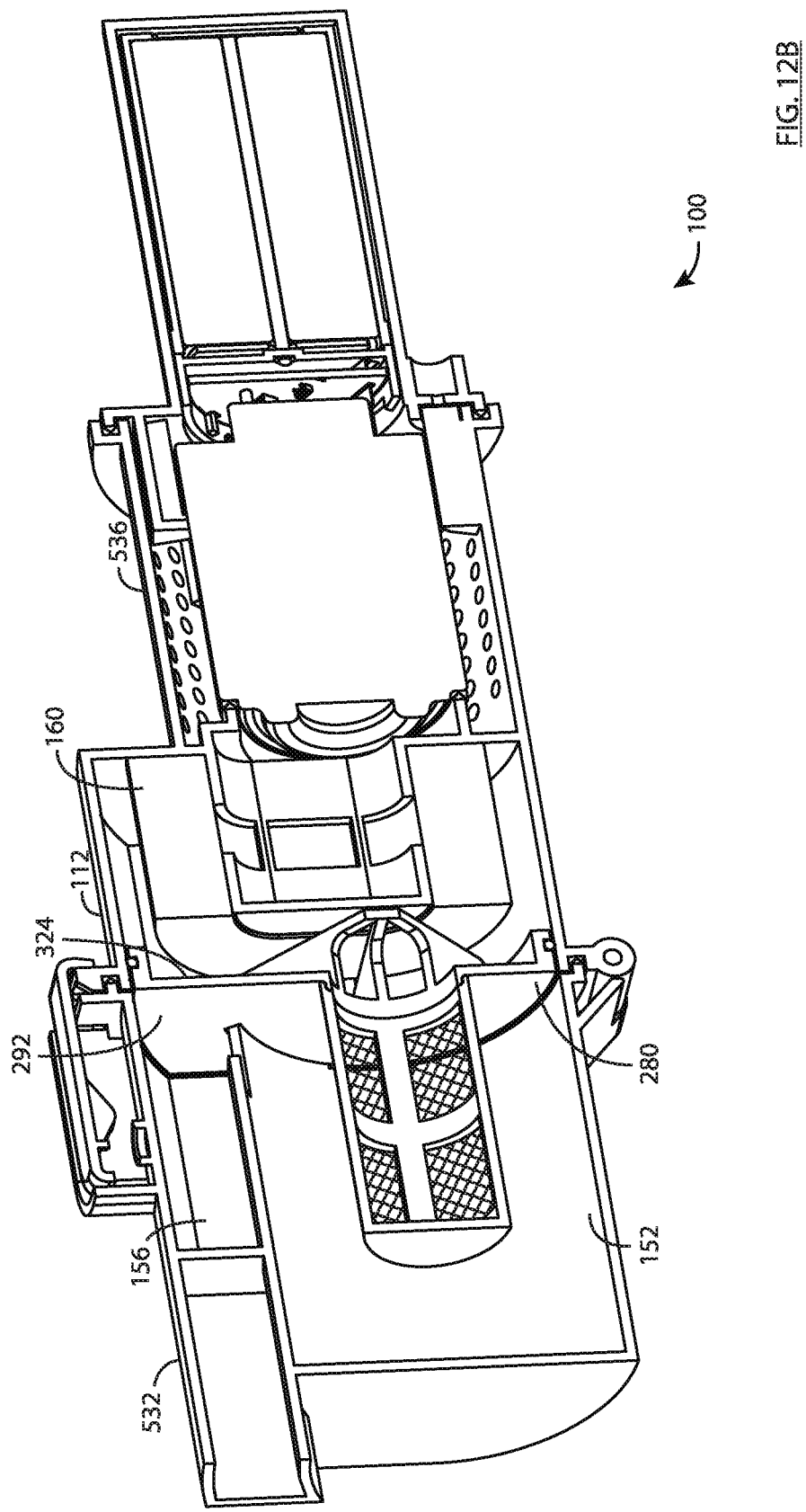
FIG. 12B is a perspective view of the cross-section of FIG. 12A.

FIGS. 12A-12B show an example in which, when main body 112 is moved from the closed position to the open position, cyclone chamber rear end wall 280, dirt collection chamber rear end wall 292, and filter chamber front end wall 324 all remain openably connected to rear portion 536. This may provide immediate access to empty/clean chambers 152 and 156, while helping prevent pre-motor filter 160 from falling out upon opening main body 112. In this example, end walls 280, 292, and 324 are removably connected to rear portion 536 by a press-fit.

Upstream Screen Chamber

In accordance with this aspect, a non-cyclonic stage which uses physical filtration is provided upstream from the downstream air treatment member. The upstream stage may use a screen to separate larger particulate matter and/or hair from the air entering a vacuum cleaner. The downstream air treatment member may comprise one or more additional treatment stages and may comprise a single cyclonic stage or a plurality of cyclonic stages. As larger particulate matter and/or hair is removed in the upstream stage, then a cyclonic stage immediately downstream of the upstream stage need not be configured to remove hair and the like. Accordingly, the downstream cyclonic stage may be designed to remove finer particulate matter. Further, as hair and the like is removed upstream, the downstream cyclonic stage is less likely to get clogged and require cleaning. Therefore, it may be opened less frequently. The features in this section may be used by themselves in any surface cleaning apparatus or in any combination or sub-combination with any other feature or features described herein. For example, any of the dirt collection chamber features described herein may be used with any of the feature of a pre-motor filter, dirt collection chamber, openable main body, and other features described herein.

In accordance with this aspect, a non-cyclonic chamber 1310 is provided to collect and remove large and/or elongate pieces of debris (e.g. hair) that enters apparatus 1300 through dirty air inlet 1308 before they enter the air treatment member 1316. Accordingly, non-cyclonic chamber 1310 is positioned downstream of dirty air inlet 1308 and upstream of air treatment member 1316.

Non-cyclonic chamber 1310 has a front end 1311, a rear end 1312 and a sidewall 1313 extending between the front and rear ends. Non-cyclonic chamber 1310 may be any appropriate shape and some or all of it may be porous to provide filtration. Accordingly, at least a portion of the rear end 1312 and/or at least a portion of the sidewall 1313 may be porous to provide for air to pass through the sidewall 1313 and the rear end 1312 while inhibiting large pieces of debris from passing through the rear end 1312 and sidewall 1313. In some embodiments, the sidewall 1313 and the rear end 1312 may be entirely porous to provide for air to pass through the sidewall 1313 and the rear end 1312 while inhibiting large pieces of debris from passing through the rear end 1312 and sidewall 1313. If the sidewall is porous, then it will be appreciated that an air gap may be provided between the sidewall 1313 and the body of the hand vac in which chamber 1310 is positioned such that filtered air may exit through the sidewall 1313.

For example, as shown in FIGS. 13-17, non-cyclonic chamber 1310 may be formed by a cylindrical longitudinally extending basket 1309 having a longitudinally extending axis 1317. Accordingly, sidewall 1313 is cylindrical and rear end 1312 may be a wall extending generally transverse to axis 1317. It will be appreciated that rear end 1312 need not be planar and may extend at any angle to axis 1317. As exemplified, all of sidewall 1313 and rear end 1312 are porous. Accordingly, the chamber may be defined by a basket having an open front end. The sidewall and the rear end wall may be integrally molded from plastic and all or a portion of the sidewall and/or the rear end may have a plurality of openings. The opening may be formed when the basket is molded. Alternately, as exemplified, the basket may have a plurality of side ribs 1319a and a plurality of rear end ribs 1319b and a screen material 1321 (e.g., a metal mesh), may be secured to the bids to define a porous basket.

Alternately, as shown in FIGS. 18-22, non-cyclonic chamber 1310 may be in the form of a longitudinally extending basket 1309 that has a semi-circular shape in a direction transverse to the axis of dirty air inlet 1308. Accordingly, sidewall 1313 has a semicircular portion 1313a and a planar lower portion 1313b. In this embodiment, the basket has an open front and is integrally molded with openings 1323 provided on all of the sidewall and the rear end. As discussed previously, only a portion of the basket may be porous so as to provide filtration. For example, as exemplified in FIGS. 23-27, the sidewalls 1313a and 1313b of basket 1309 are solid and only rear end 1312 has openings 1323.

A further alternate embodiment is shown in FIGS. 28-32. As shown therein, chamber 1310 is formed by the body of the hand vac and the rear end 1312 comprises a porous screen having openings 1323. As exemplified, the rear end 1312 may be removable, such as by a screen handle 1329.

In each of these exemplified embodiments, the axis of dirty air inlet 1308 extends through chamber 1310 and therefore, the front end 1311 of the non-cyclonic chamber 1310 may be generally open to provide for large pieces of debris to travel from the dirty air inlet 1308 into the non-cyclonic chamber 1310. It will be appreciated that the front end of chamber 1310 may have a wall that has an opening aligned with the dirty air inlet. Alternately, the dirty air inlet may enter through the sidewall 1313 (e.g., if the dirty air inlet is provided above chamber 1310 in a similar manner as shown for inlet 108 in FIG. 1).

As with the embodiments of FIGS. 1-12B, surface cleaning apparatus 1300 may also include an inlet passage 1330 extending between the dirty air inlet 1308 and the non-cyclonic chamber 1310. In some embodiments, a rear end 1331 of the inlet passage 1330 is positioned proximate to front end 1311 of the non-cyclonic chamber. In some embodiments, inlet passage 1330 has an inlet axis that intersects the non-cyclonic chamber 1310. When the surface cleaning apparatus 1300 is oriented with the upper end of the apparatus 1336 above the lower end of the apparatus 1340, the inlet passage 1330 is positioned above at least a portion of the non-cyclonic chamber 1310.

In operation, air enters chamber 1310 and the porous wall(s) filter larger particulate matter and/or hair from the air stream. The filtered airstream then travels to a downstream air treatment member 1316, which may include one or more treatment stages. Air may exit the chamber 1310 by the rear end and enter air plenum 1333, which is upstream from the downstream air treatment member 1316. If some or all of the sidewalls are porous and spaced from, e.g., inner walls 1334 of the hand vac (see for example FIG. 18), then a side air plenum 1335, which is upstream of rear air plenum 1333 and/or downstream air treatment member 1316.

Air treatment member 1316 is configured to remove smaller particles of dirt and other debris from the air flow which pass through chamber 1310. As exemplified, the downstream air treatment member 1316 may comprise a cyclone assembly (also referred to as a "cyclone bin assembly") having a single cyclonic cleaning stage with a single cyclone chamber 1352 and a dirt collection chamber 1356 external to the cyclone chamber 1352 (i.e. having a discrete volume from that of cyclone chamber 1352). Dirt collection chamber 1356 may also be referred to as a "dirt collection bin". Cyclone chamber 1352 and dirt collection chamber 1356 may be of any configuration suitable for separating dirt from an air stream and collecting the separated dirt, respectively. For example, they may use any of the features discussed with respect to FIGS. 1-12B.

As exemplified in FIG. 13, passage 1337 extends from plenum 1333 to one or cyclone air inlets 1338. It will be appreciated that cyclone chamber 1352 may have only a single air inlet 1338.

Dirt collection chamber 1356 may be positioned at any location. In FIGS. 13-32, the dirt collection chamber 1356 is exemplified as being below at least a portion of the air treatment chamber 1316 when the surface cleaning apparatus 1300 is oriented with the upper end of the surface cleaning apparatus 1336 above the lower end of the surface cleaning apparatus 1340 (similar to the position exemplified in FIG. 4). Alternately, or in addition, dirt collection chamber 1356 may be positioned below the non-cyclonic chamber 1310 when the surface cleaning apparatus 1300 is oriented with the upper end of the surface cleaning apparatus 1336 above the lower end of the surface cleaning apparatus 1340.

An openable door may be provided to enable chamber 1310 to be emptied and, optionally, removed to enable the structure defining chamber 1310 to be cleaned (such as by passing water through the porous parts of the basket). Alternately, in a similar manner as shown in FIG. 9C, the portion of the hand vac having chamber 1310 may be removably mounted so that the rear end of chamber 1310 may be opened or the basket removed through the rear end.

Figure 14:
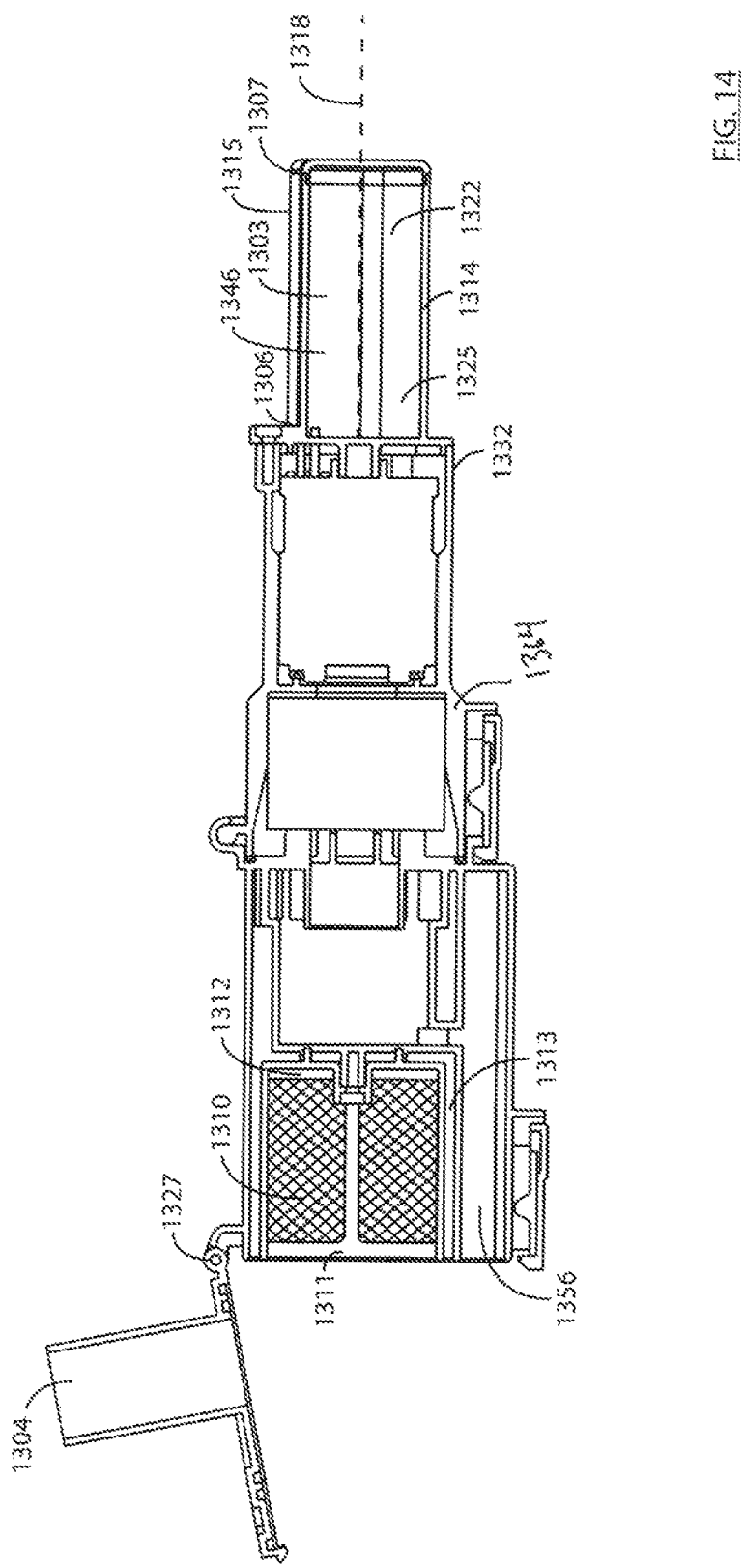
FIG. 14 is the cross-sectional view of FIG. 13 with the door in an open position.
Figure 15:
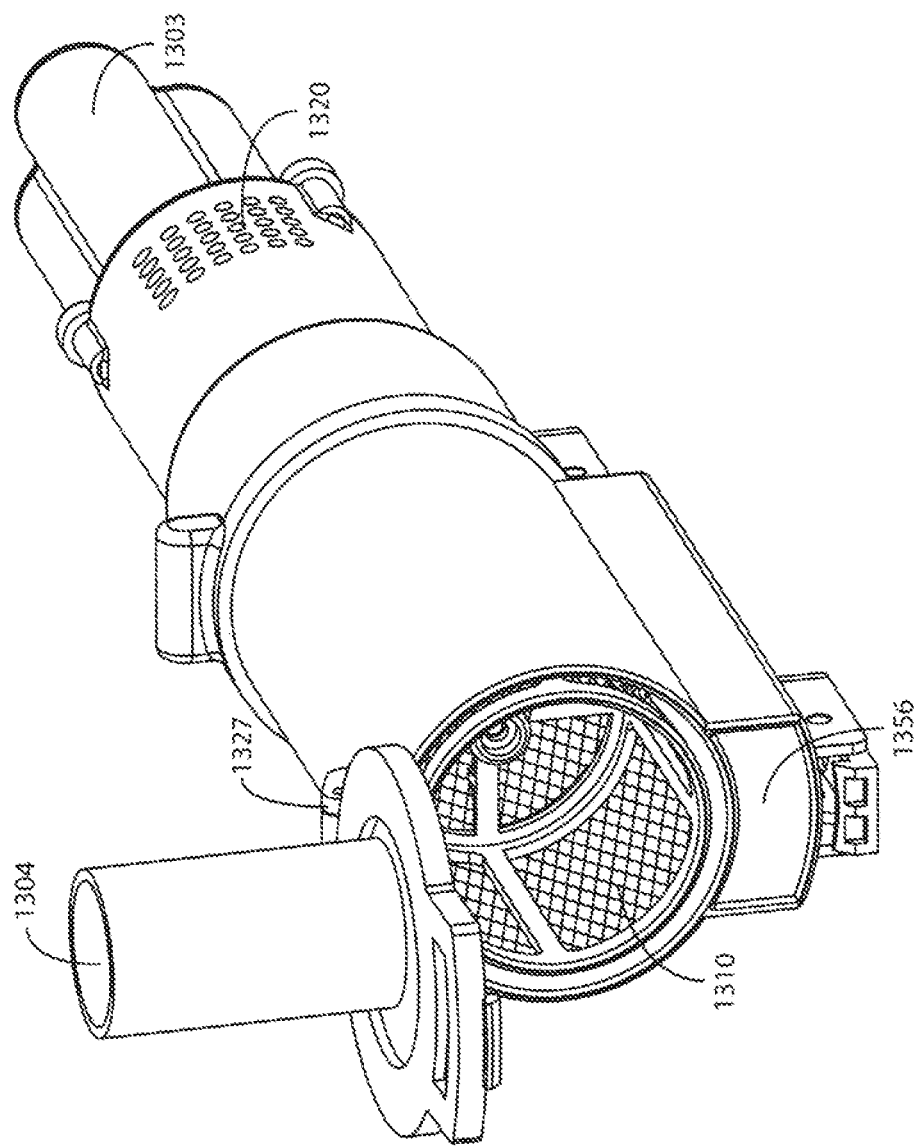
FIG. 15 is a front perspective view of the cross-sectional view of FIG. 14.
Figure 16:
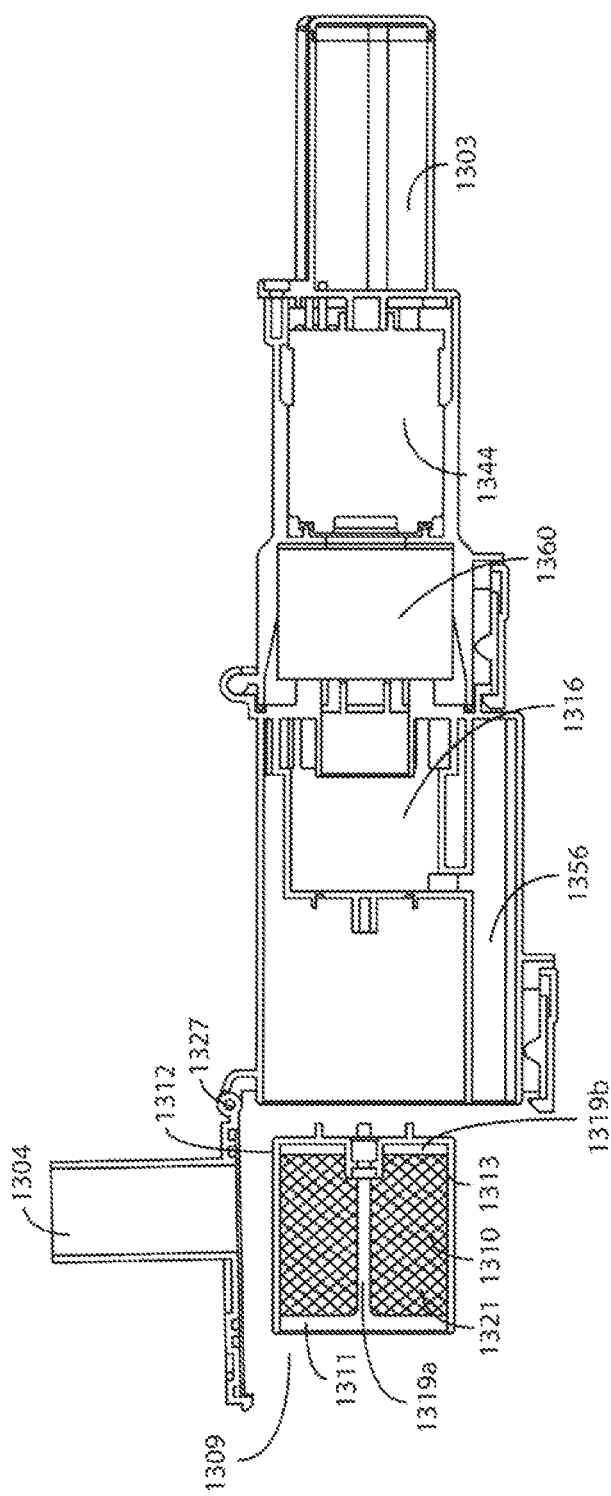
FIG. 16 is the cross-sectional view of FIG. 14 with the screen removed from the main body.
Figure 17:
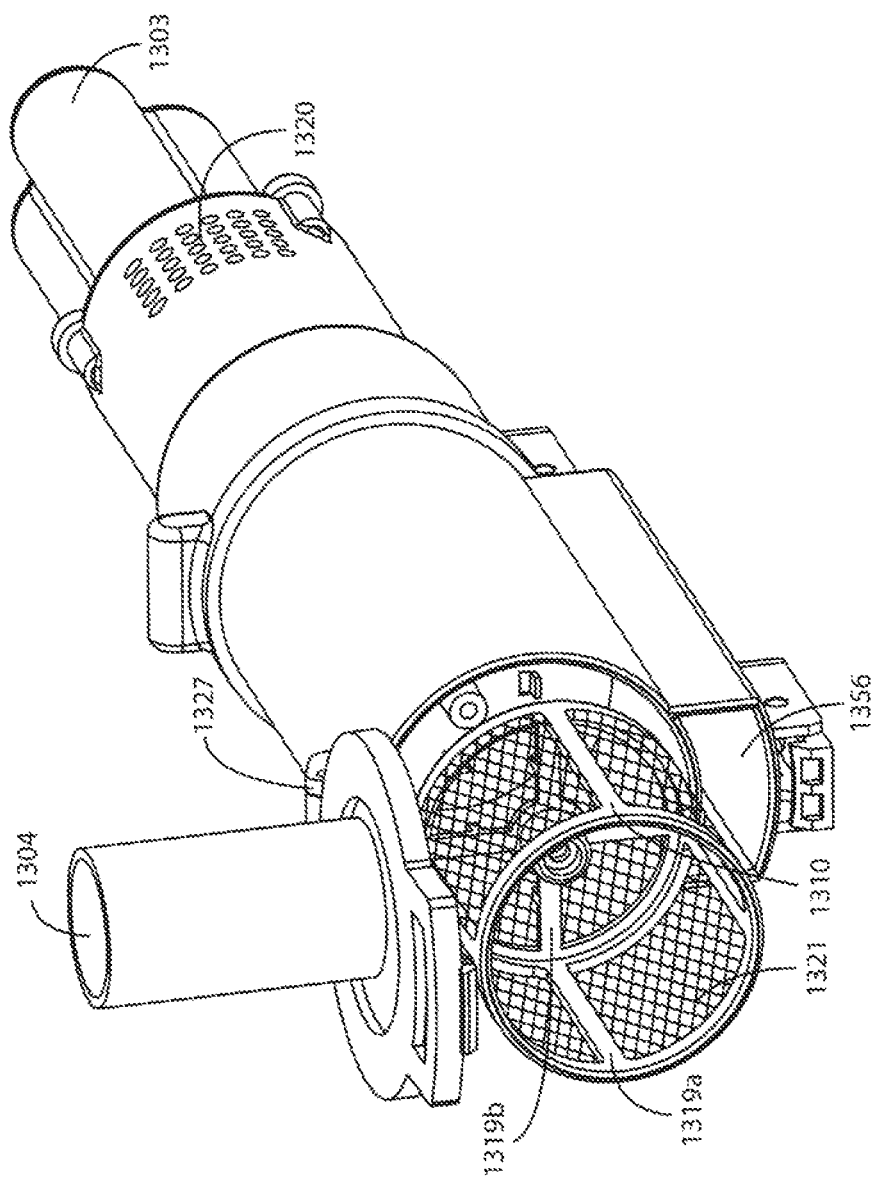
FIG. 17 is a front perspective view of the cross-sectional view of FIG. 16.
Figure 18:
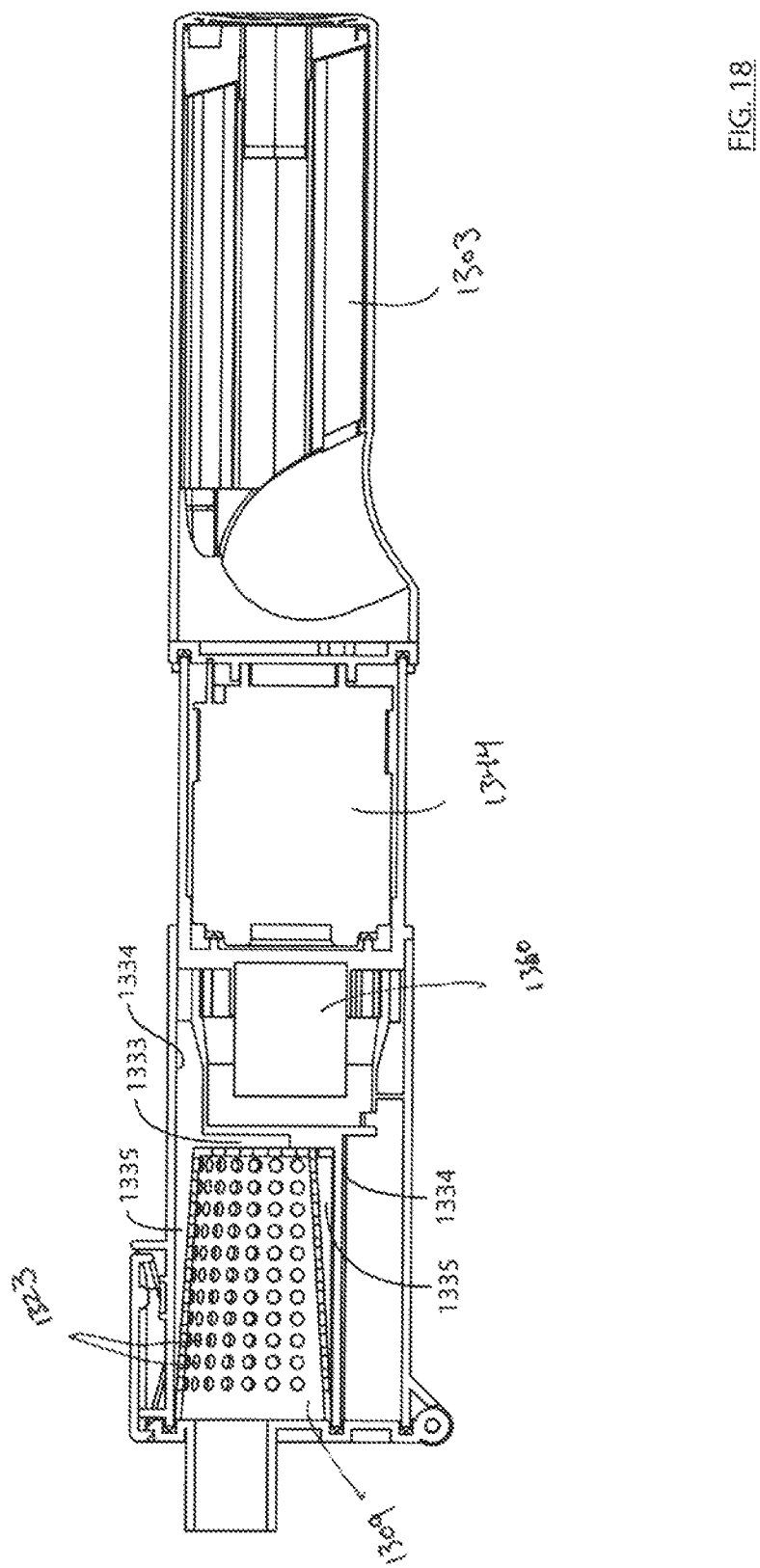
FIG. 18 is a cross-sectional view of a surface cleaning apparatus, in accordance with another embodiment.
Figure 19:
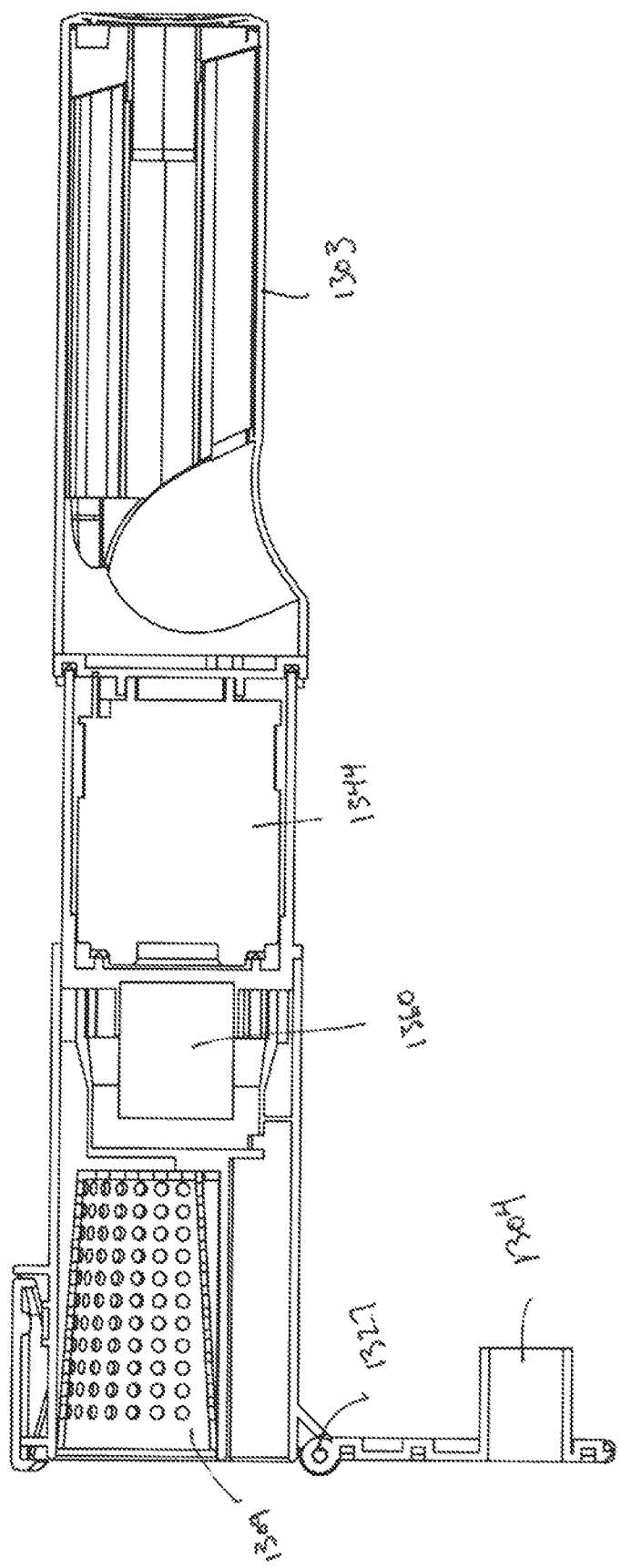
FIG. 19 is the cross-sectional view of FIG. 18 with the door in an open position.
Figure 20:
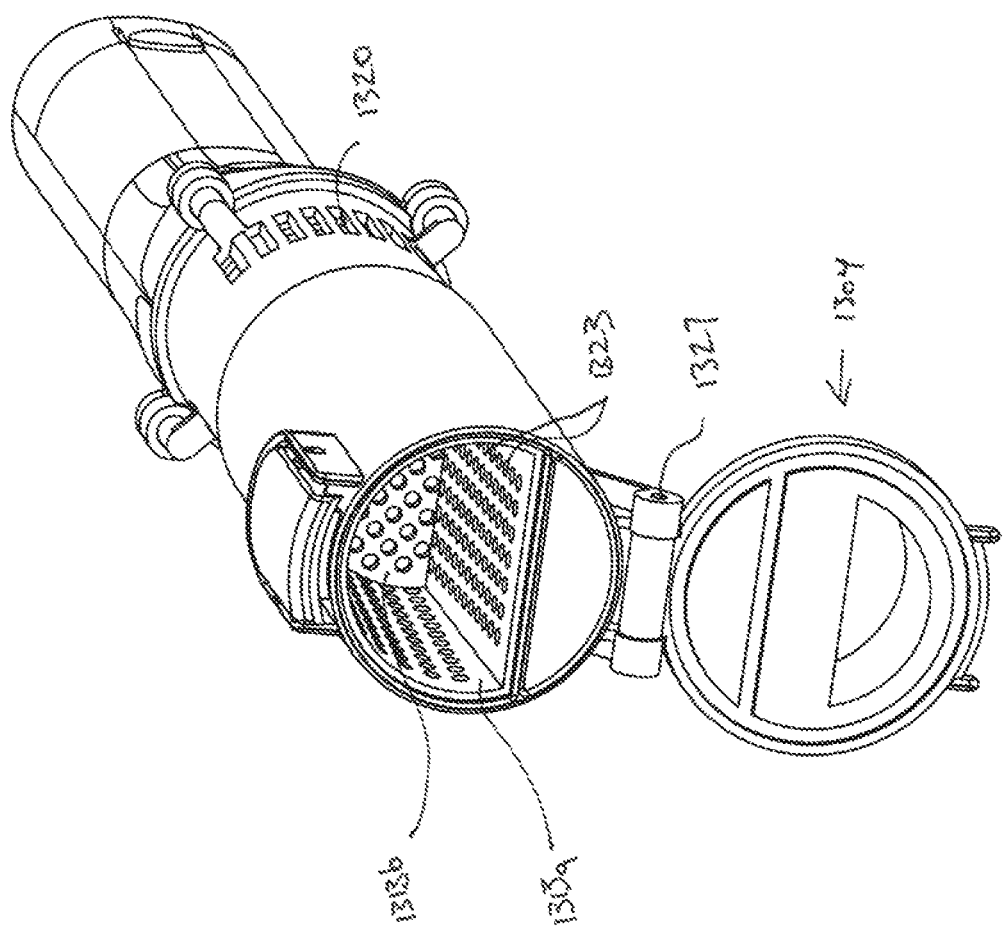
FIG. 20 is a front perspective view of the cross-sectional view of FIG. 19.
Figure 21:
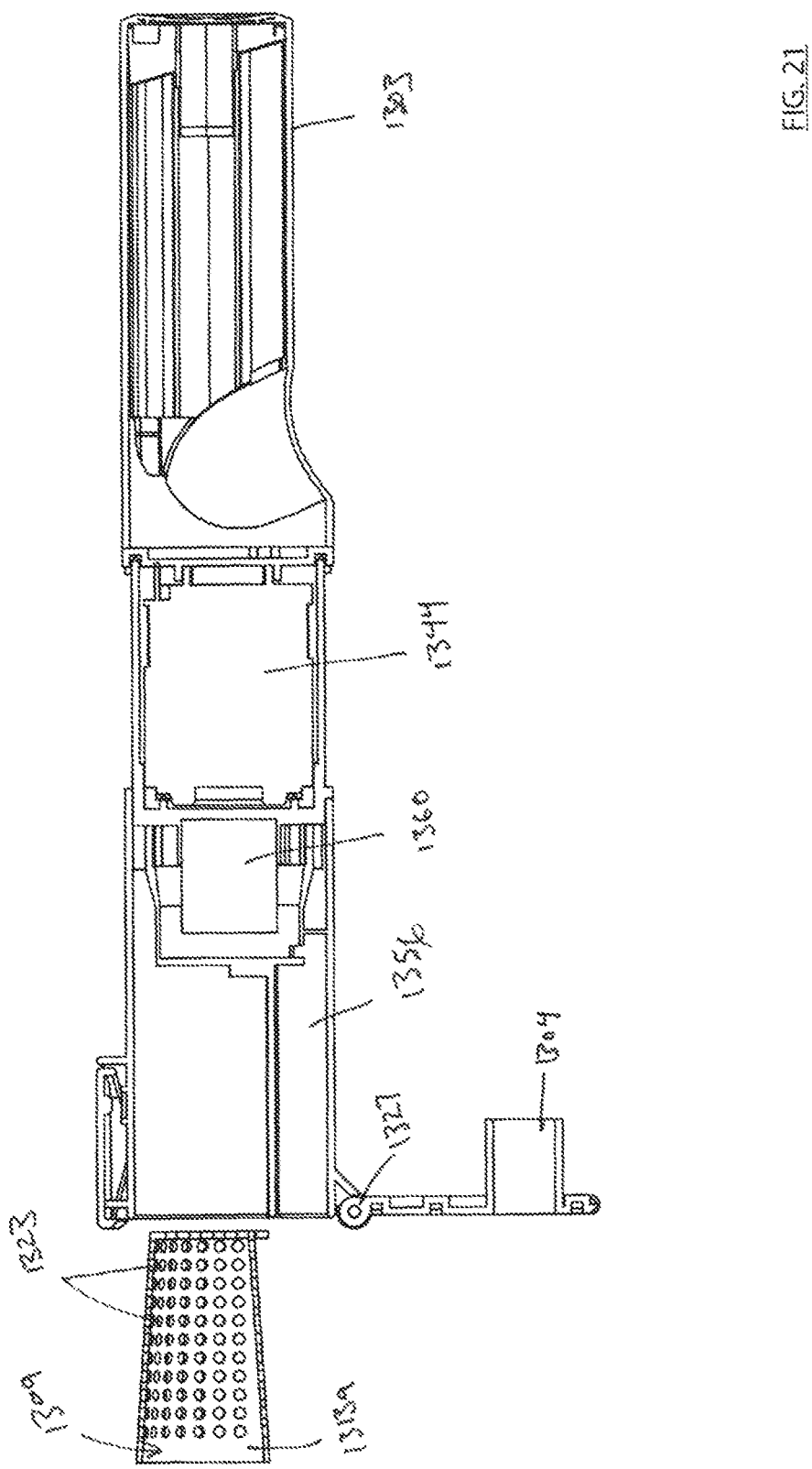
FIG. 21 is the cross-sectional view of FIG. 19 with the screen removed from the main body.
Figure 22:
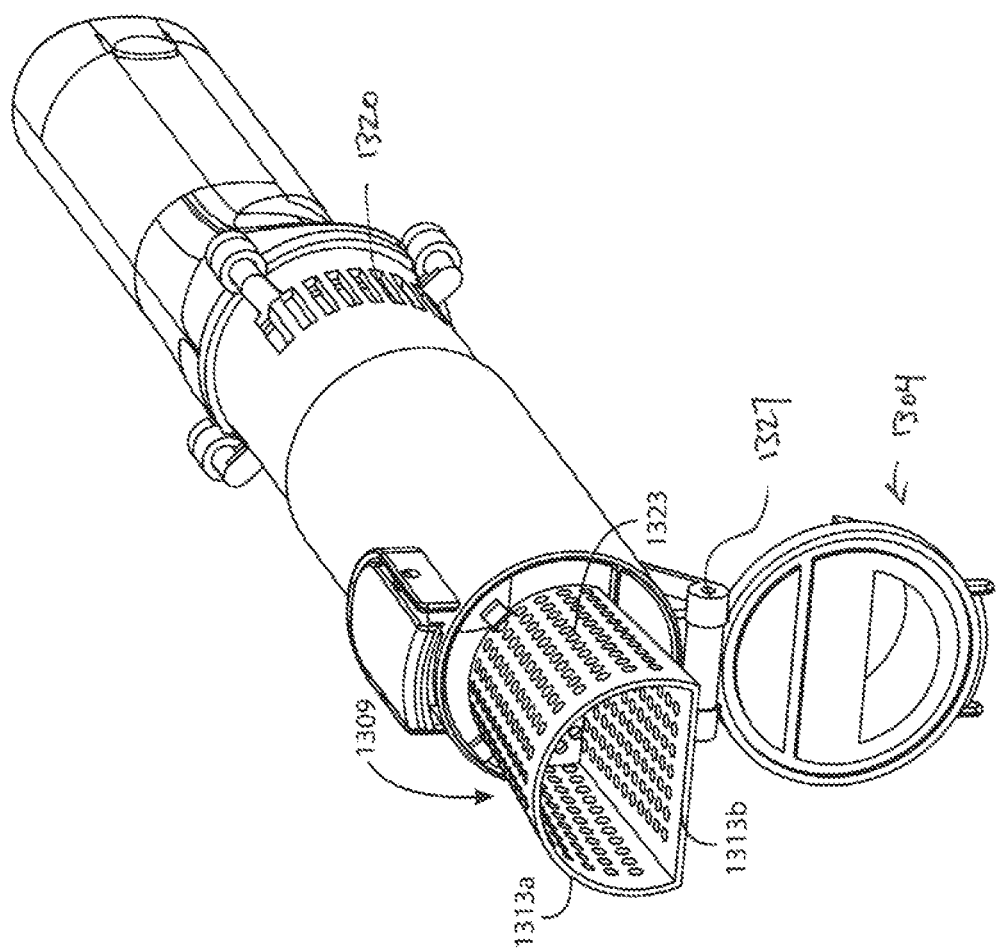
FIG. 22 is a front perspective view of the cross-sectional view of FIG. 21.
Figure 23:
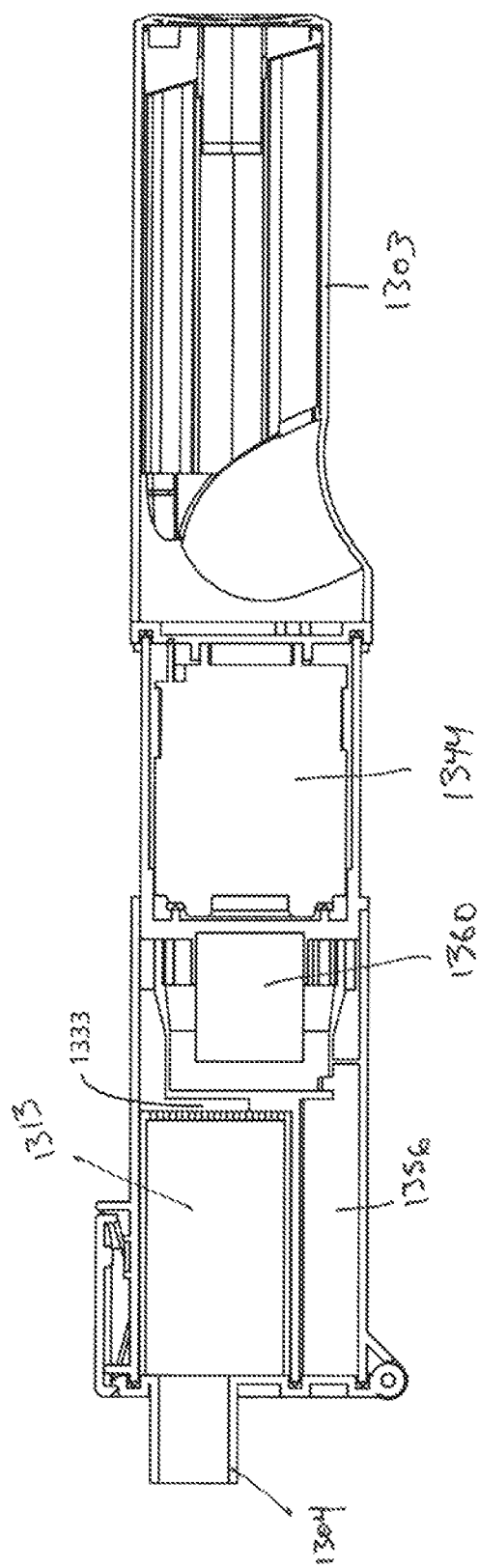
FIG. 23 is a cross-sectional view of a surface cleaning apparatus, in accordance with another embodiment.
Figure 24:
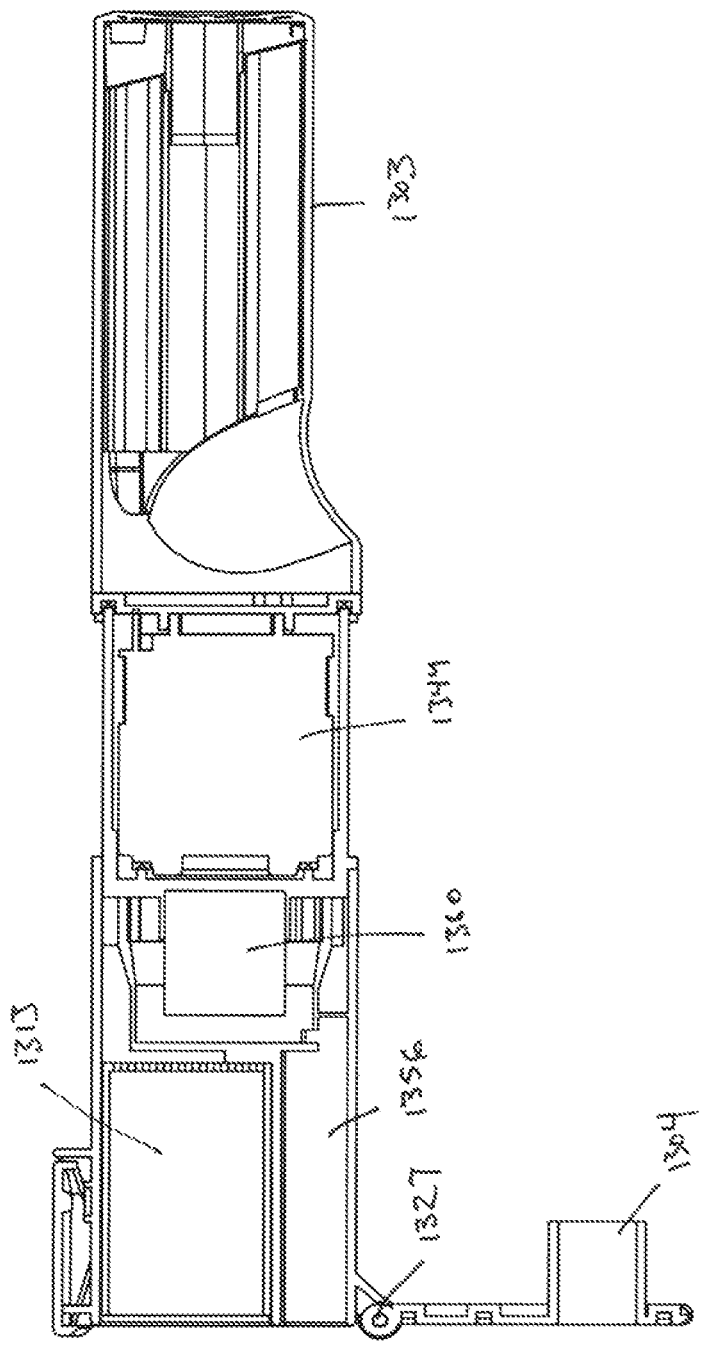
FIG. 24 is the cross-sectional view of FIG. 23 with the door in an open position.
Figure 25:
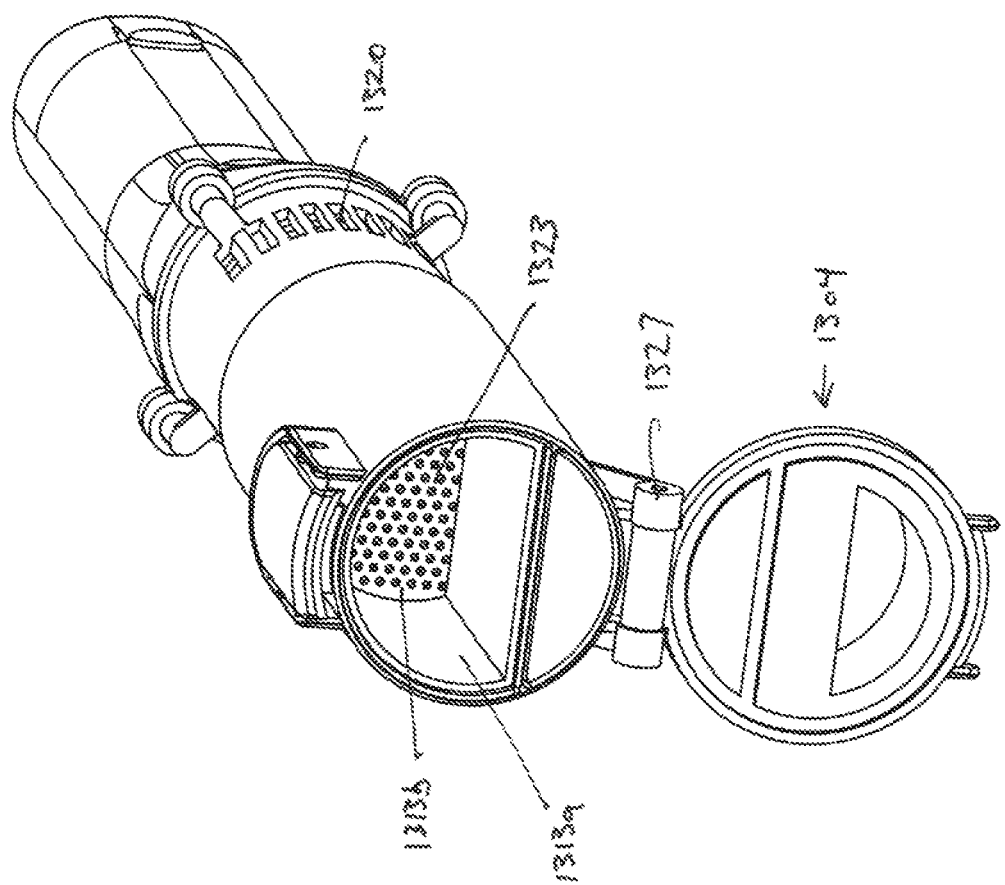
FIG. 25 is a front perspective view of the cross-sectional view of FIG. 24.
Figure 26:
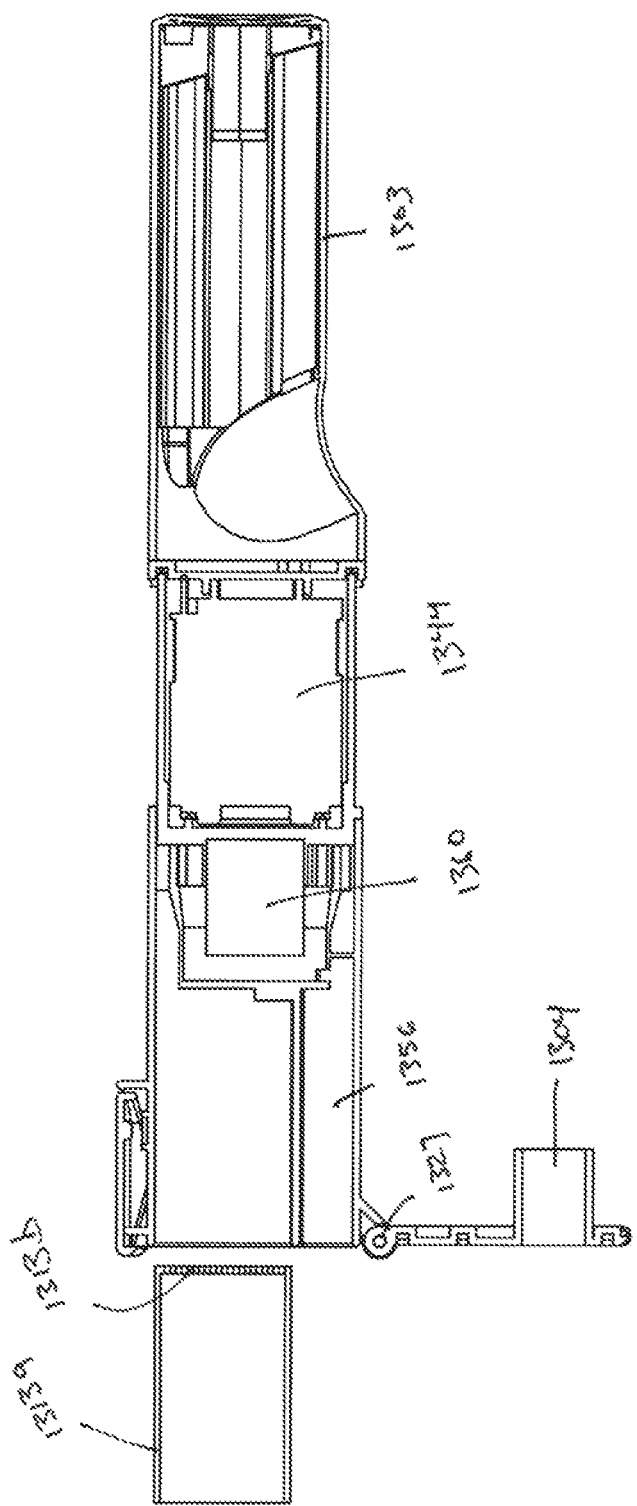
FIG. 26 is the cross-sectional view of FIG. 24 with the screen removed from the main body.
Figure 27:
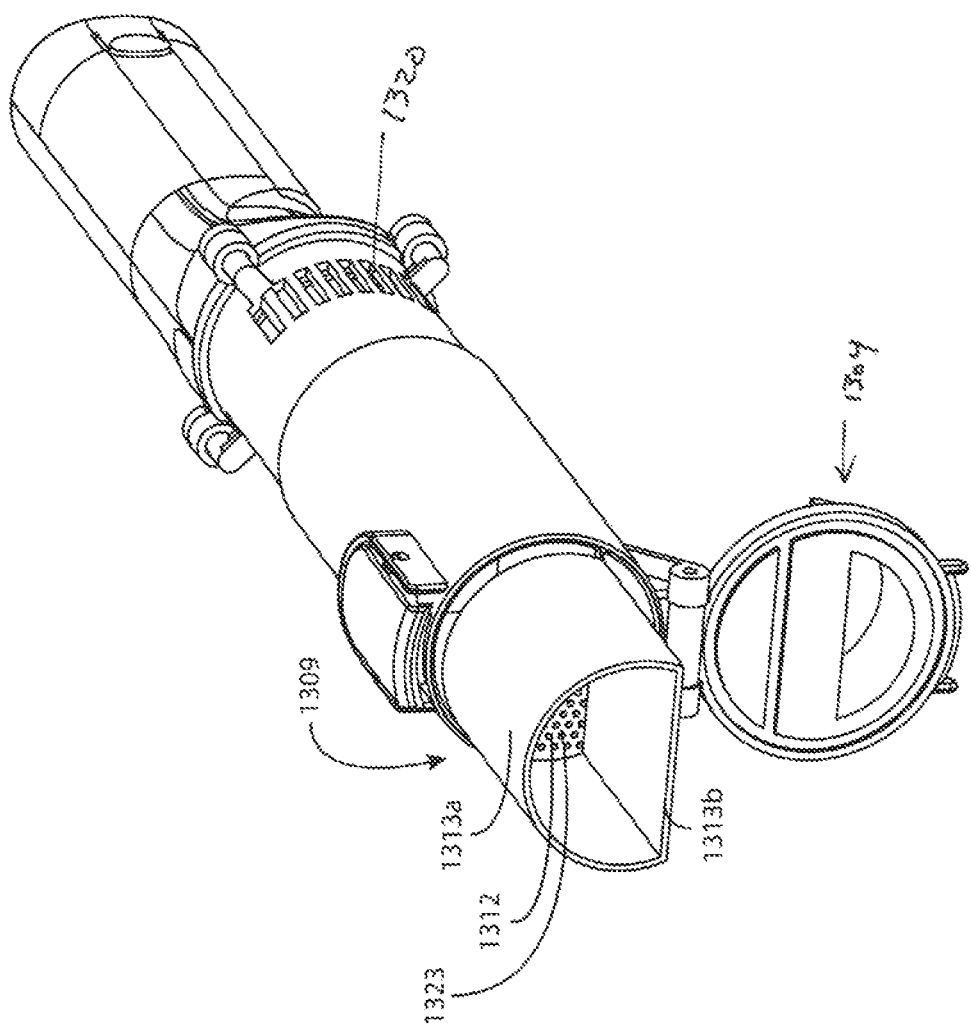
FIG. 27 is a front perspective view of the cross-sectional view of FIG. 26.
Figure 28:
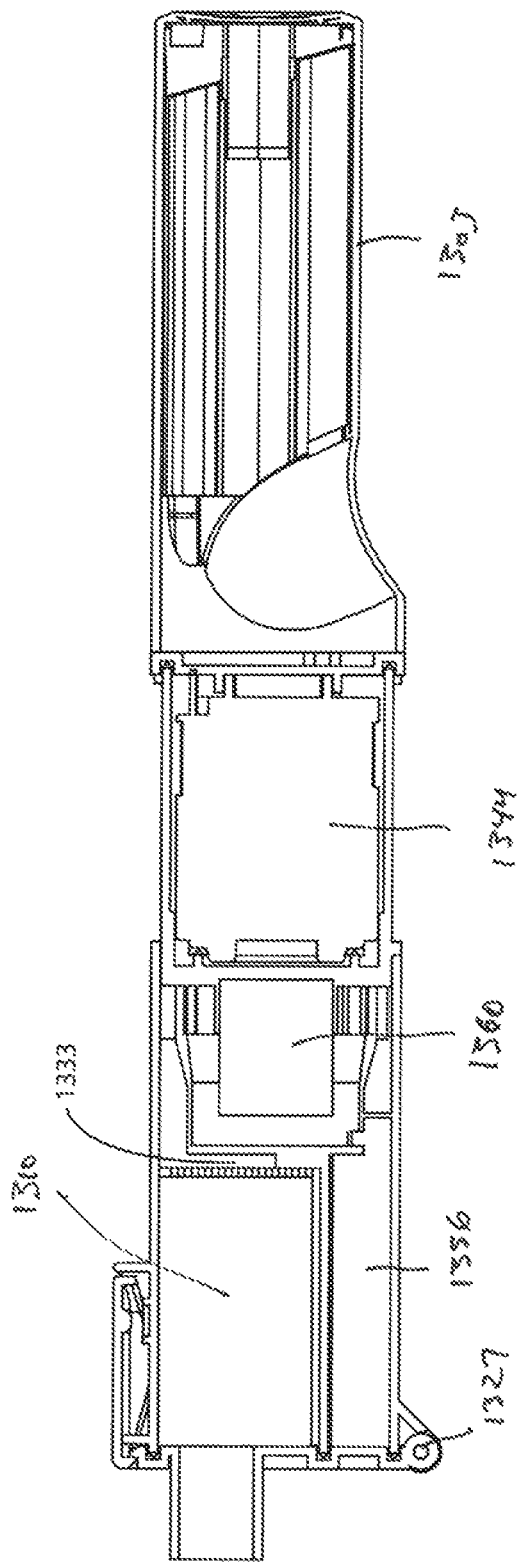
FIG. 28 is a cross-sectional view of a surface cleaning apparatus, in accordance with another embodiment.
Figure 29:
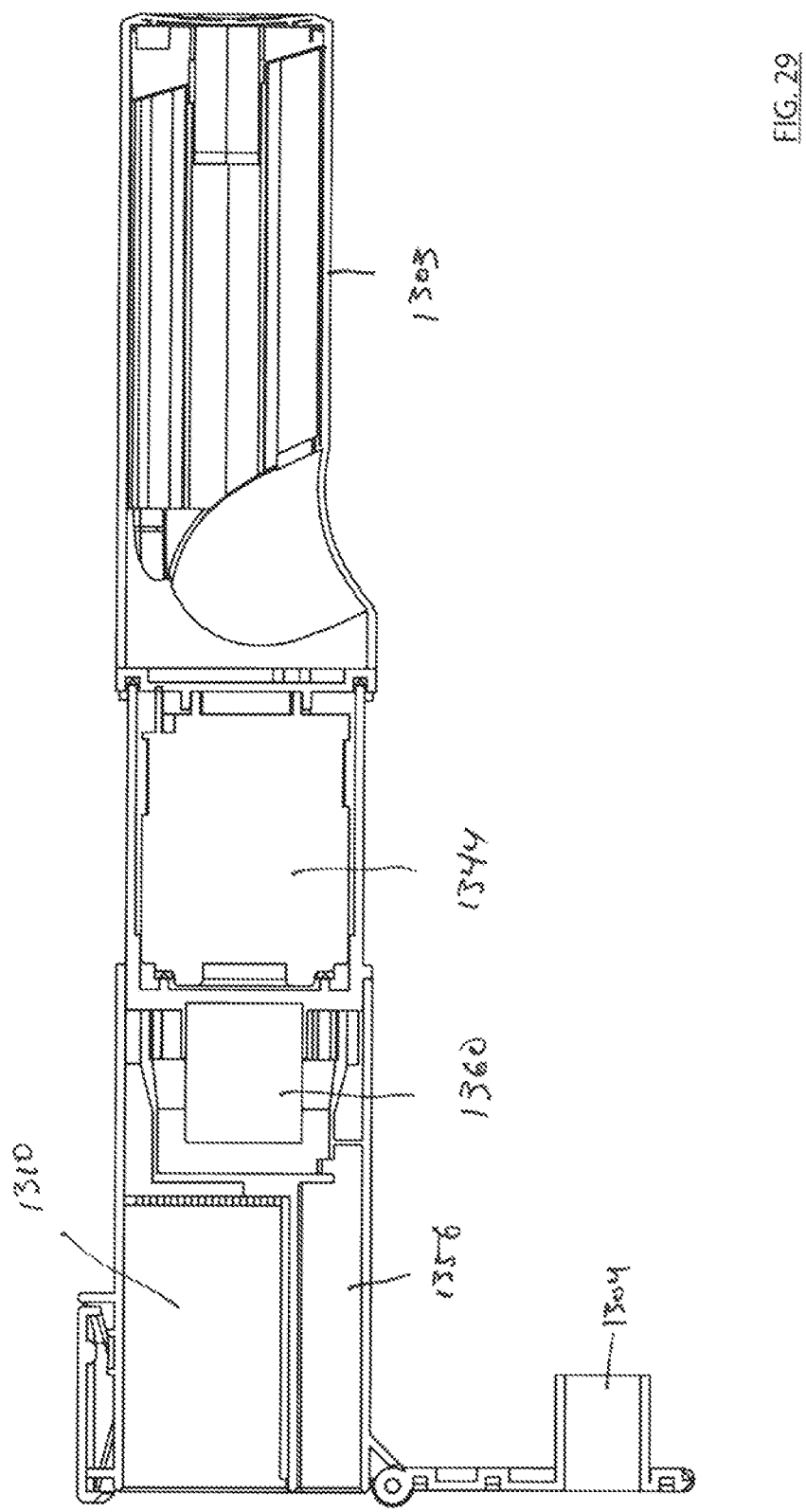
FIG. 29 is the cross-sectional view of FIG. 28 with the door in an open position.
Figure 30:
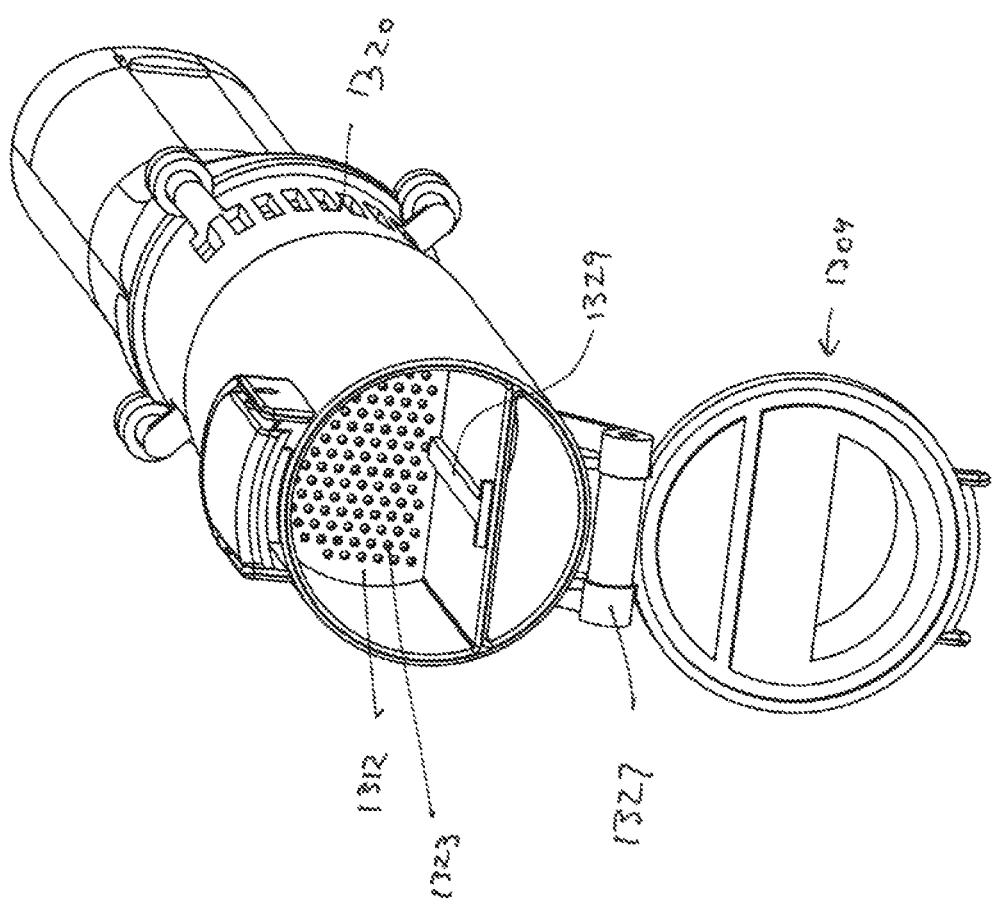
FIG. 30 is a front perspective view of the cross-sectional view of FIG. 28.
Figure 31:
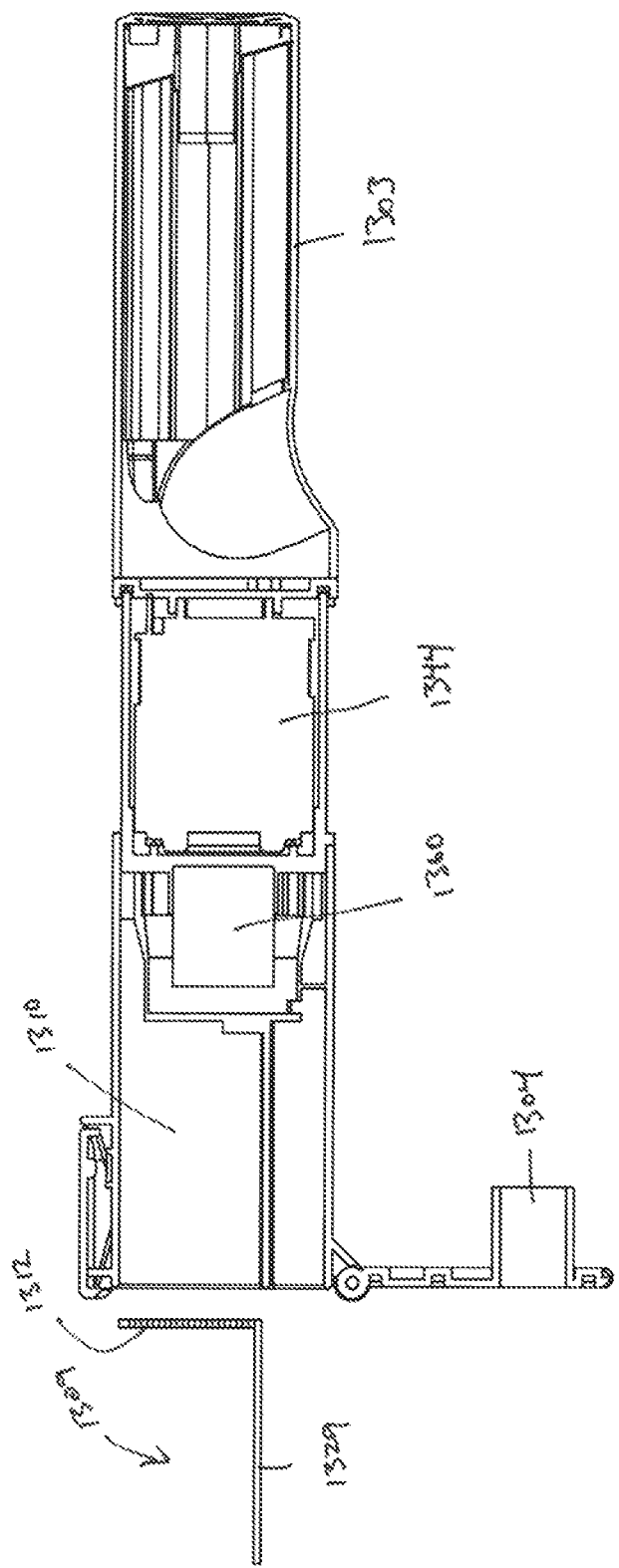
FIG. 31 is the cross-sectional view of FIG. 29 with the screen removed from the main body.
Figure 32:
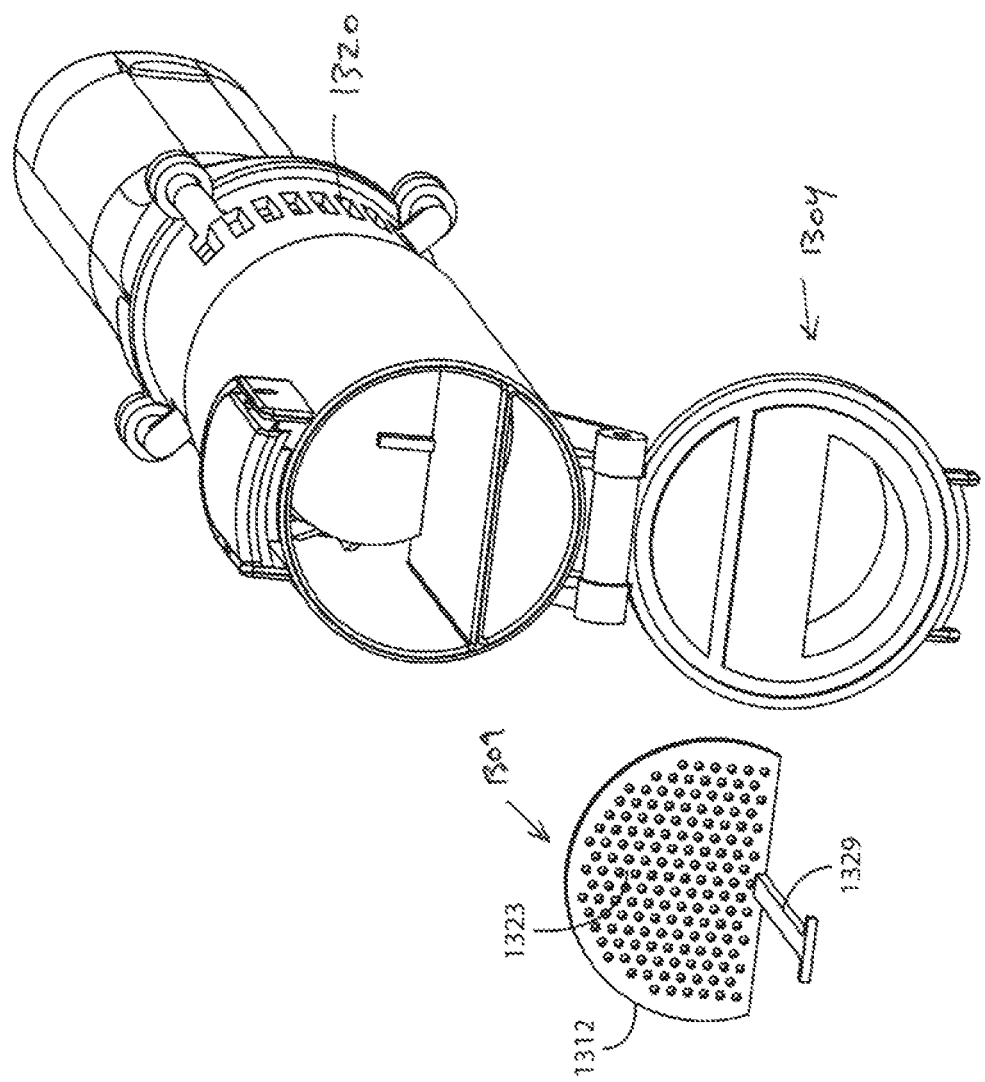
FIG. 32 is a front perspective view of the cross-sectional view of FIG. 31.
Figure 33:
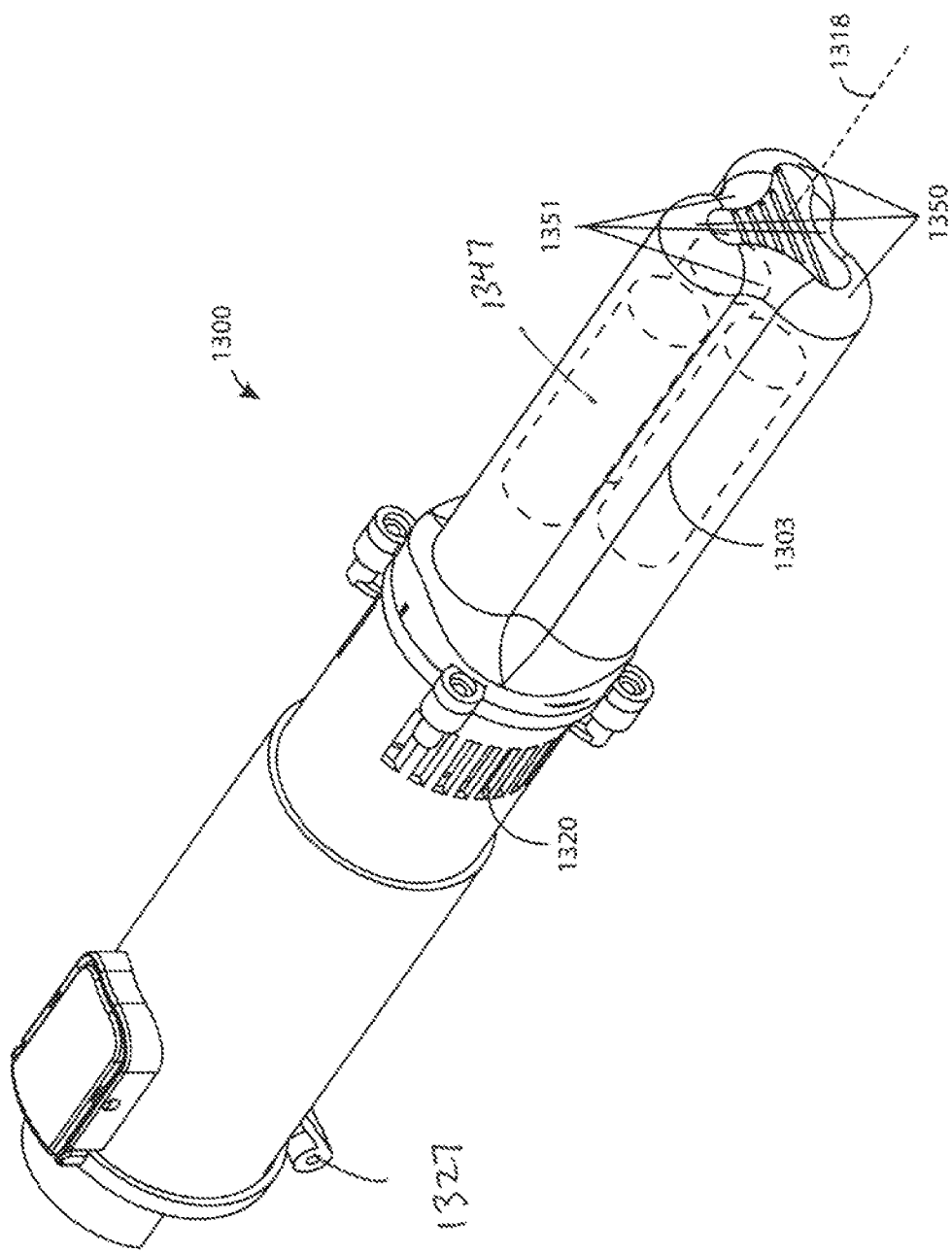
FIG. 33 is a front perspective view from above of a surface cleaning apparatus in accordance with another embodiment.
Figure 34:
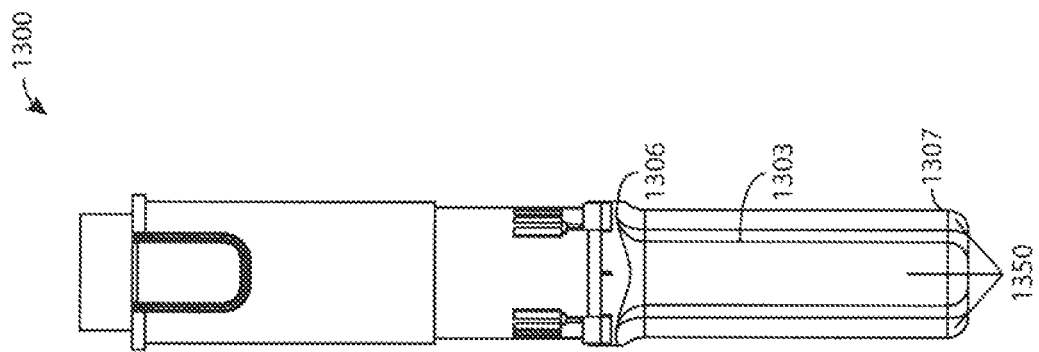
FIG. 34 is a top view of the surface cleaning apparatus of FIG. 33.
Figure 35:
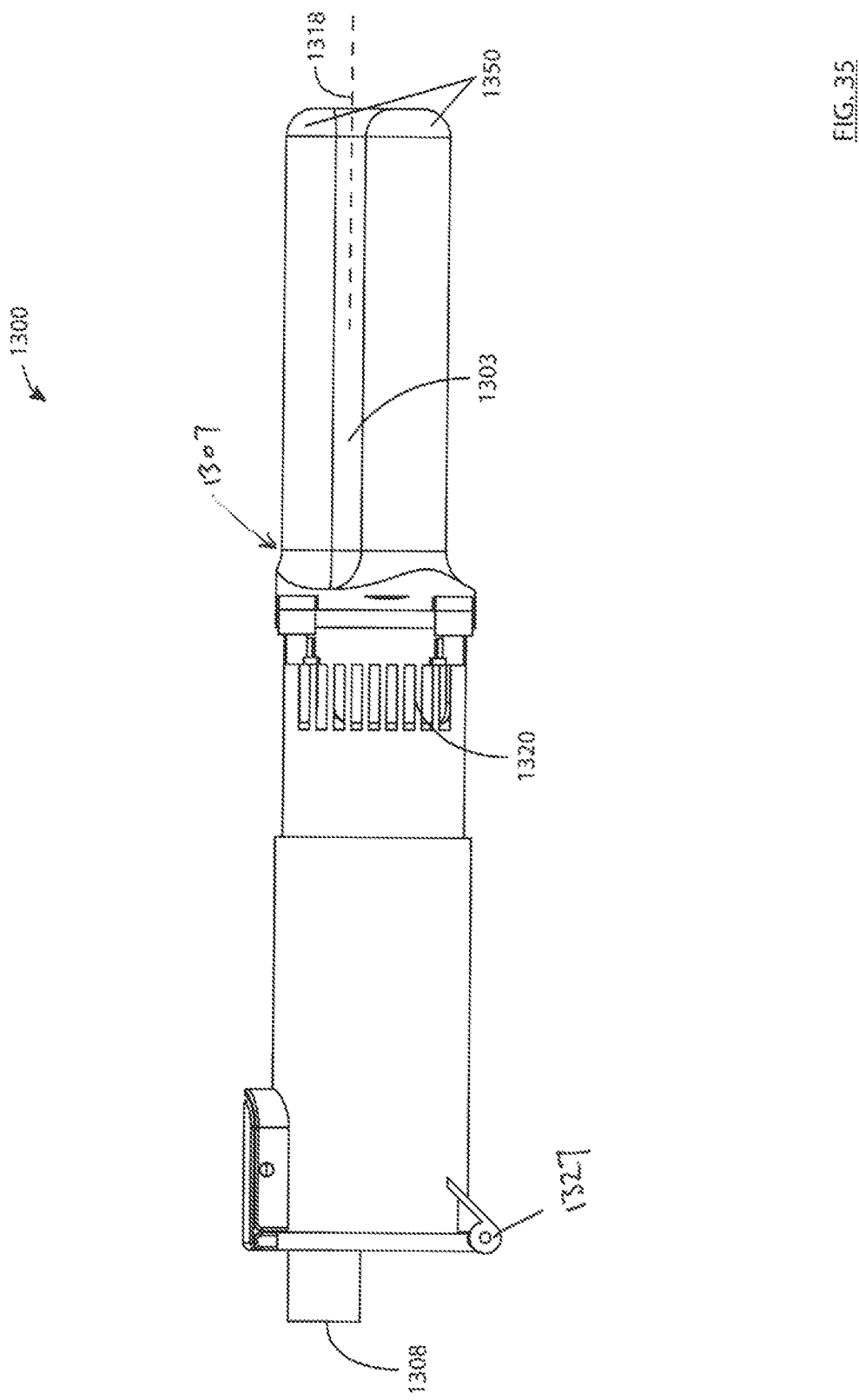
FIG. 35 is side view of the surface cleaning apparatus of FIG. 33.
Figure 36:
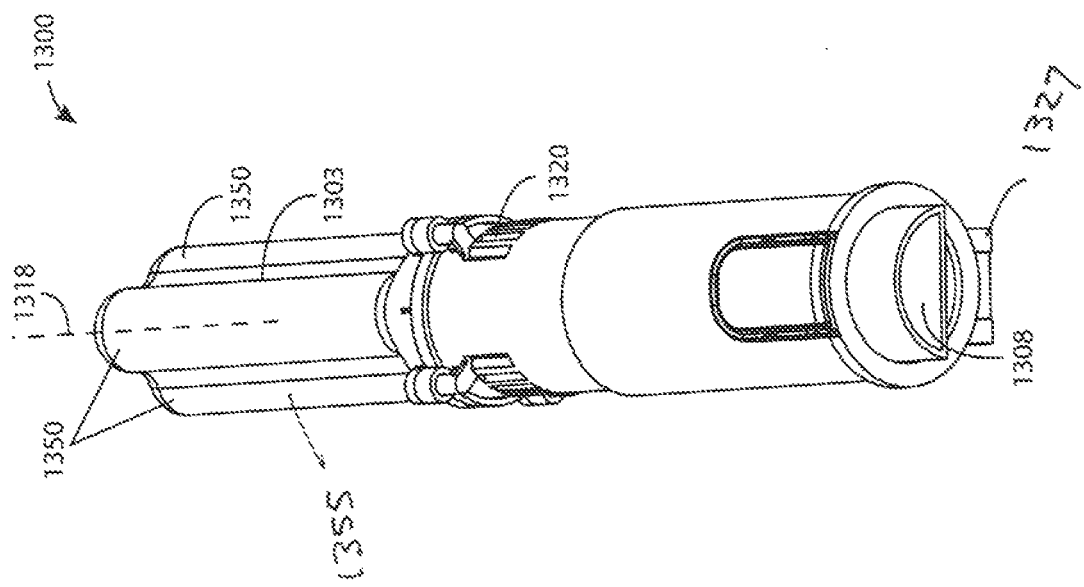
FIG. 36 is top perspective view from above of the surface cleaning apparatus of FIG. 33.
Figure 37:
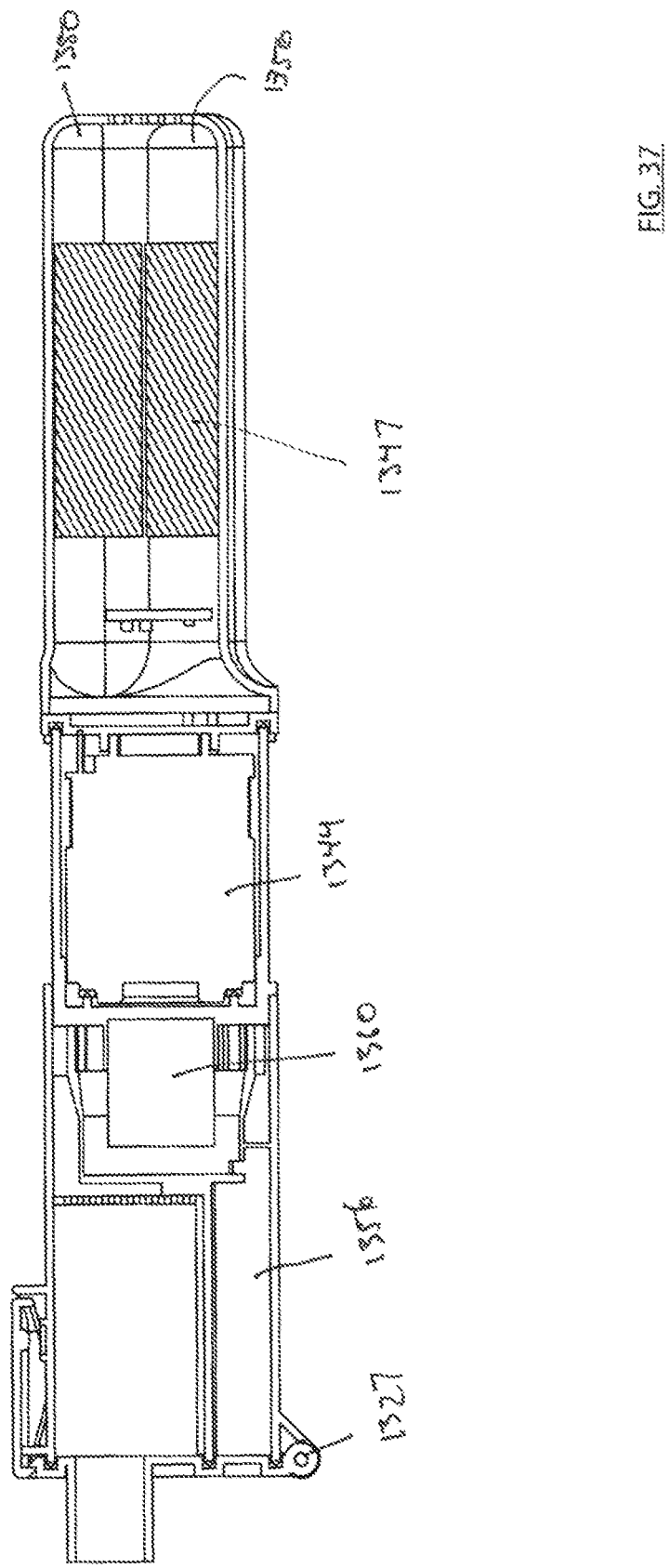
FIG. 37 is a cross-sectional view of the surface cleaning apparatus of FIG. 33.

As exemplified in FIG. 14, an openable door 1304 having the dirty air inlet 1308 may be provided. When opened, access to the non-cyclonic chamber 1310 and optionally the dirt collection chamber 1356 may be provided. In some embodiments, openable door 1304 may front end wall 1326 of the apparatus 1300. In use, openable door 1304 may be moved (e.g. pivoted by a hinge 1327 as shown in FIGS. 14 to 17, or removed) between a closed position (FIG. 13) and an open position (FIGS. 14 to 17). Moving openable door 1304 to the open position may open both non-cyclonic chamber 1304 and dirt collection chamber 1356 so that either or both can be emptied of collected dirt and debris. Hinge or pivot 1327 may be provided at an upper end of the apparatus 1300 (see FIG. 13) or a lower end (see FIG. 19).

In some embodiments, non-cyclonic chamber 1310 can be removed from the main body 1302 of the apparatus 1300. In use, non-cyclonic chamber 1310 can be removed to access air treatment chamber 1316. In some embodiments, air treatment chamber 1316 is also removable to provide access to the pre-motor filter.

As with surface cleaning apparatus 100, surface cleaning apparatus 1300 may also include a pre-motor filter 1360 provided in the air flow path 1324 downstream of air treatment member 1316 and upstream of suction motor 1344. Pre-motor filter 1360 may be formed from any suitable physical, porous filter media. For example, pre-motor filter 1360 may be one or more of a foam filter, felt filter, HEPA filter, or other physical filter media. In some embodiments, pre-motor filter 1360 may include an electrostatic filter, or the like. As shown in FIGS. 13 to 32, pre-motor filter 1360 may be located in a pre-motor filter housing 1364 that is external to the air treatment member 1316.

Handle with Grip Portion

In accordance with this aspect, a surface cleaning apparatus, such as a hand vac, is provided with an axially extending handle which has axially extending recesses for receiving the fingers of a user. The handle may house a plurality of axially extending batteries and the recesses may be defined by a gap or space between adjacent batteries.

An advantage of this design is that, e.g., by conforming the handle to the shape of an array of batteries housed in the handle, the handle may be provided with finger receiving recesses, thereby improving the ergonomics of the handle. If the hand vac is arranged with the air treatment member or members, the suction motor and the handle arrayed linearly (one behind the other), then the finger grips may enable a user to easily hold and move the hand vac over a surface to be cleaned.

As with surface cleaning apparatus 100, surface cleaning apparatus 1300 may also include a handle 1303, which may be provided rearward of the suction motor 1344. Handle 1303 may extend longitudinally from a front end 1306 to a rear end 1307, and vertically from a lower end 1314 to an upper end 1315. As shown, handle 1303 may include a longitudinal axis 1318 that extends between the front and rear ends 1311 and 1312.

As exemplified in FIGS. 15-17 and 33-38, handle 1303 may include a hand grip portion 1322, which may include a portion or all of an exterior surface 1325 of handle 1303. In some embodiments, handle 1303 may define a battery compartment 1346 that houses at least one battery 1347. Accordingly, hand grip portion 1322 may surround at least a portion (or all) of the battery 1347.

Figure 38:
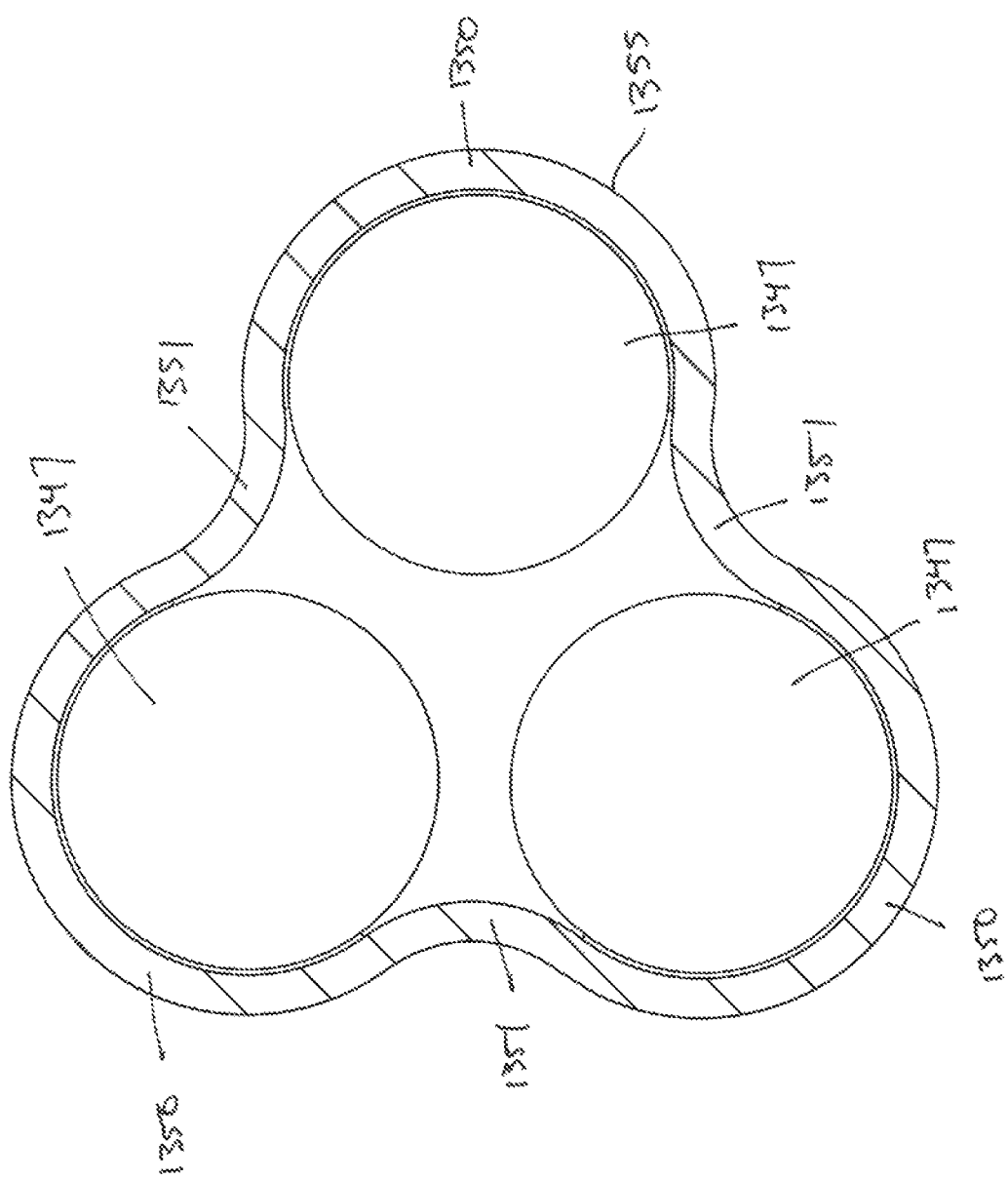
FIG. 38 is a cross-sectional view of the surface cleaning apparatus of FIG. 33 taken at the rear end of the handle looking rearwardly towards the batteries.

FIG. 38 is a cross-sectional view of surface cleaning apparatus 1300 taken at the rear end 1307 of the handle 1303 looking rearwardly. As exemplified therein, if the three batteries 1347 are arranged such that axes of the batteries 1347 are generally parallel and the batteries 1347 are stacked in a generally triangular formation, then the outer surface 1355 of the handle 1303 may conform to the generally triangular shape of the battery pack. In such a case, the sidewall 1309 of handle 1303 may have a trefoil shape having three rounded lobes 1350 separated by three rounded cusps 1351. In such an embodiment, each lobe 1350 of the trefoil shape forms a portion of a compartment for a battery 1347. It will be appreciated that each lobe 1350 of the trefoil shape of the sidewall 1309 may conform to a portion of the longitudinally extending sidewall of an outer surface 1355 of a battery 1347 housed in the handle 1303.

Each cusp 1351 defines a generally axially extending (in the direction of the handle axis 1318) recess. It will be appreciated that providing the recesses assists the user to grip handle 1303.

As exemplified in FIG. 14, the trefoil shape of the sidewall 1309 extends from the front end 1306 of the handle 1303 to the rear end 1307 of the handle 1303.

It will be appreciated that the handle 1303 may not have a transverse section that is generally triangular. For example, the handle 1303 may house more than three batteries 1347. In such a case, the space between adjacent batteries 1347 may still define a cusp 1351.

As exemplified, the longitudinal axis 1318 of the handle 1303 may intersect the air treatment member 1316. Alternately, or in addition, the longitudinal axis 1318 of the handle 1303 may intersect the suction motor 1344.

When the surface cleaning apparatus 1300 is oriented with the upper end of the surface cleaning apparatus 1300 above the lower end of the surface cleaning apparatus 1300, the handle may be positioned between the upper and lower ends of the air treatment chamber. Alternately, or in addition, when the surface cleaning apparatus 1300 is oriented with the upper end of the surface cleaning apparatus 1300 above the lower end of the surface cleaning apparatus 1300, the handle may be positioned between upper and lower ends of a suction motor housing.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hand vacuum cleaner having an upper end and a lower end, the hand vacuum cleaner comprising:
   a) an air flow path extending from a dirty air inlet to a clean air outlet with an air treatment member and a suction motor provided in the air flow path; and,
   b) a handle having a front end, a rear end, a central longitudinal axis extending between the front end and the rear end and a sidewall forming the external surface of the handle and extending between the front and the rear end, the handle defining a battery compartment configured to house a plurality of batteries positioned side by side, each of the batteries having a longitudinally extending battery axis with the battery axes being parallel to the central longitudinal axis, wherein at least a portion of the external sidewall has a plurality of longitudinally extending lobes, each lobe comprising an outer convex portion that is located radially outwardly from the central longitudinal axis and surrounds a radial outward portion of a respective one of the plurality of batteries and the external sidewall having a longitudinally extending recesses between respective lobes, each recess comprising an inner concave portion that is located closer to the central longitudinal axis than from the outer convex portion and is located at least partially between two adjacent batteries of the plurality of batteries.

2. The hand vacuum cleaner of claim 1, wherein each lobe defines a portion of a compartment for a battery, each battery having a perimeter that is radially outward of the longitudinally extending battery axis and the portion of the compartment surrounds approximately half of the perimeter.

3. The hand vacuum cleaner of claim 1, wherein each lobe conforms to the perimeter of the battery positioned in the lobe.

4. The hand vacuum cleaner of claim 1, wherein the dirty air inlet is provided at a front end of the hand vacuum cleaner, the suction motor is positioned rearward of the air treatment member and the handle is positioned rearward of the suction motor.

5. The hand vacuum cleaner of claim 4, wherein the air treatment member has a front end, a rear end and a central longitudinal axis extending between the front and rear ends of the air treatment member and the suction motor has a suction motor axis of rotation and the central longitudinal axis and the suction motor axis extend through the handle.

6. The hand vacuum cleaner of claim 5, wherein the central longitudinal axis and the suction motor axis are generally parallel to the battery axis.

7. The hand vacuum cleaner of claim 6, wherein the central longitudinal axis extends through the suction motor.

8. The hand vacuum cleaner of claim 4, wherein the air treatment member has a front end, a rear end and a central longitudinal axis extending between the front and rear ends of the air treatment member and the suction motor has a suction motor axis of rotation and the central longitudinal axis extends through the handle.

9. The hand vacuum cleaner of claim 8, wherein the central longitudinal axis is generally parallel to the battery axis.

10. The hand vacuum cleaner of claim 9, wherein the central longitudinal axis extends through the suction motor.

11. The hand vacuum cleaner of claim 4, wherein the air treatment member has a front end, a rear end and a central longitudinal axis extending between the front and rear ends of the air treatment member and the suction motor has a suction motor axis of rotation and the suction motor axis extends through the handle.

12. The hand vacuum cleaner of claim 11, wherein the suction motor axis is generally parallel to the battery axis.

13. The hand vacuum cleaner of claim 12, wherein the suction motor axis extends through the air treatment member.

14. The hand vacuum cleaner of claim 1, wherein the plurality of batteries positioned side by side comprises three batteries positioned side by side wherein the portion of the sidewall has a trefoil shape having three rounded lobes separated by three rounded recesses and the central longitudinal axis is located at a radially inner center of the lobes.

15. The hand vacuum cleaner of claim 14, wherein the trefoil shape of the sidewall extends from the front end of the handle to the rear end of the handle.

16. The hand vacuum cleaner of claim 1 wherein, when the hand vacuum cleaner is oriented with the upper end of the hand vacuum cleaner above the lower end of the hand vacuum cleaner, the handle is vertically positioned at a height between a vertical position of the upper end and a vertical position of the lower end of the air treatment chamber.

17. The hand vacuum cleaner of claim 1 wherein, when the hand vacuum cleaner is oriented with the upper end of the hand vacuum cleaner above the lower end of the hand vacuum cleaner, the handle is vertically positioned at a height between a vertical position of the upper end and a vertical position of the lower end of the suction motor housing.

* * * * *